United States Patent [19]
Heist

[11] Patent Number: 5,832,171
[45] Date of Patent: Nov. 3, 1998

[54] SYSTEM FOR CREATING VIDEO OF AN EVENT WITH A SYNCHRONIZED TRANSCRIPT

[75] Inventor: H. Daniel Heist, Bryn Mawr, Pa.

[73] Assignee: Juritech, Inc., New York, N.Y.

[21] Appl. No.: 658,405

[22] Filed: Jun. 5, 1996

[51] Int. Cl.[6] .............................. H04N 5/91; H04N 5/93; H04N 7/00
[52] U.S. Cl. ................... 386/46; 386/52; 386/54
[58] Field of Search ................... 386/46, 52, 54, 386/61, 65, 95, 96, 103, 104, 105, 4, 1; 364/419.01; H04N 5/91, 5/93, 7/00

[56] References Cited

U.S. PATENT DOCUMENTS

| | | |
|---|---|---|
| 4,924,387 | 5/1990 | Jeppesen . |
| 5,172,281 | 12/1992 | Ardis et al. . |
| 5,392,428 | 2/1995 | Robins ............................. 364/419.01 |

OTHER PUBLICATIONS

Legal Process™ product brochure, Legal Process, New Orleans,Louisiana, date unknown, 4 pages.
Re:Viewer™ Workstation product brochure, Visionary Information Systems Inc., Santa Ana, CA, 1995, 2 pages.
DataCoder™ Superstation product brochure, Visionary Information Systems Inc., Santa Ana, CA, 1995, 2 pages.
DiscoveryVideo[2x] product brochure, Discovery Products, Inc., San Ramon, CA, 1993, 2 pages.
DiscoveryVideo[2x]—Post Production product brochure, Discovery Products, Inc., Mt. Prospect, Illinois, 1993, 2 pages.
DiscoveryVideo[2x]—Reporter product brochure, Discovery Products, Inc., Mt. Prospect, Illinois, P/N 100–0031–00, 1994, 2 pages.
Quickstart to Discovery[2x] for Windows™ demonstration brochure, Discovery Products, Inc., P/N 100–0109–00, 1994, 6 pages.
ShowCase™ Multimedia Presentation System, Graphic Evidence, A Division of LSI Litigation Sciences, Culvar City, CA, date unknown, 1 page.

*Primary Examiner*—Robert Chevalier
*Attorney, Agent, or Firm*—Panitch Schwarze Jacobs & Nadel, P.C.

[57] ABSTRACT

Methods and apparatus are provided to create a video product with synchronized video and text of an event. The video product allows a user to play back a video of the event, while simultaneously viewing the corresponding transcript. If an original transcript was made of the event, the video product allows the user to play back the video while also viewing the page and line numbers of the original transcript.

66 Claims, 15 Drawing Sheets

Project Sheet

_____
(Name and Number of Project)

|  | Date |
|---|---|
| Shipment Received |  |
| Receipt Notification Sent Back To Client |  |
| All Original Tapes and Diskettes Sent Back To Client |  |
| All CD-ROMS and SYN Files Sent, Invoice Issued |  |

| Deposition Name | Dep Nm. | Nmr Tapes | ASCII File | Date Orig Received | Date Orig Sent Back | Date CD-ROM Sent |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

FIG. 9

| Deposition | | Name of Project | | | | | Sheet ___ of ___ | | | |
|---|---|---|---|---|---|---|---|---|---|---|
| Name | Nmbr | Orig ASC | Orig TXT | Cnvrtd TXT | Start Page | Lines/ Page | Col. Nmbr | Date Cnvrtd | Comments |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

ASCII Conversion Sheet

FIG. 10

Audio and Video-Settings Sheet

| Project | | | | | | | | | | |
|---|---|---|---|---|---|---|---|---|---|---|
| Deposition | T N | Audio Setting | | | | Video Settings | | | | |
| | | M | T | B | L | B | C | T | S | CP |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

FIG. 11

| Project | | | | | | Deposition | | | | Sheet ___ of ___ | | | | Writing CD-ROM, Checking and Purging | | | |
|---|---|---|---|---|---|---|---|---|---|---|---|---|---|---|---|---|---|
| Segment | Tape Deck | | Capture | | | | | | Compression | | | | | | | | |
| T N | Start | Stop | Mins. | Size MB | Frames | D R | Proc Used | Time To Comp | Size of File | CD-ROM Number | C H K | P R G | Date | Time |
| | | | | | | | | | | | | | | | | | |

FIG. 12

LIPSYNC Processing Sheet

| Project Name | | | | | |
|---|---|---|---|---|---|
| Deposition Name/Number | | | .TXT File | | |
| | | | .DEP File | | |
| | | | .SYN File | | |
| CD-ROM # | File # | Begin Pg:Ln | End Pg:Ln | Date & Time | Comments |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

FIG. 13

Quality Control Check Off Sheet

| Project Name | | Deposition Name | |
|---|---|---|---|
| Date Of QC | | Deposition Nmbr | |
| .TXT file imported into LiveNote | | | |
| .SYN file imported into VideNote | | | |
| Last line of transcript compared to last line of orig ASCII | | | |
| Performed random compare of lines to orig ASCII | | | |
| Played video randomly throughout deposition | | | |

Transition Checks

| CD ROM Nmbr | File Name | File Length (hh:mm:ss.dd) | Cumulative Length (hh:mm:ss.dd) | Played through this transition and everything appear OK. Enter a Check. |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

SYSTEM FOR CREATING VIDEO OF AN EVENT WITH A SYNCHRONIZED TRANSCRIPT

FIELD OF THE INVENTION

The present invention relates to a process and apparatus for creating a randomly accessible video product which includes video of an event and the associated transcript, the transcript being linked to and synchronized with the video for simultaneous viewing.

BACKGROUND OF THE INVENTION

Testimony is a proceeding in which an attorney asks oral questions of a witness. A word-for-word record of the questions asked and the answers given is called the testimony transcript. Testimony is normally taken during a deposition or a trial. Testimony is recorded by a court reporter using a special typewriter-like device normally referred to as a stenograph machine. The output of the stenograph machine is a long paper tape of printed phonetic characters capturing, in a form of short hand, the word-for-word record of the testimony. The court reporter uses the paper tape to create a text translation of the tape. This translation is created using a typewriter or a word processor. The translation is referred to as a transcript of the testimony and is created "off-line" from the actual testimony.

More recently, stenograph machines and computer software programs have been developed which translate the phonetic characters while the stenograph operator is typing. The output of this automated translation is a stream of ASCII characters which are stored on a cassette or in a personal computer attached directly to the stenograph machine by a serial communications link. These types of stenograph machines and the associated computer and software are referred to as Computer-Aided Transcription or CAT systems. The output of the CAT system is an ASCII text computer file of the testimony. The court reporter edits the ASCII file to create a final version of the transcript which can be viewed on a computer or can be printed. The lawyer uses the ASCII file for many purposes including research of the deposition, preparation for trial and research prior to cross examination during trial. A variety of software tools have been developed which, among other things, allow a lawyer to electronically search testimony text for key words, to annotate, to insert page marks, to associate certain portions of testimony with issues and to create printouts of testimony for insertion in pleadings and trial presentations.

Along with the development of CAT systems, another parallel development has taken place. In major and/or complex litigation cases, testimony from depositions and/or a trial have been videotaped in addition to having a transcript created. The person performing the videotaping is called a videographer. The videographer uses a standard, commercially available videotape recording system. Videotaping proceeds simultaneously with the creation of the written record of the testimony by the court reporter. After the testimony is complete, the lawyer will normally ask the court reporter for a copy of the ASCII text file of the testimony and will ask the videographer for a copy of the videotapes of the testimony.

During the discovery and research phase of a litigation, the attorney will search through testimony for key statements made by a witness. The attorney uses software tools for searching and annotating the ASCII testimony. In addition, during a trial the attorney will present to the court and jury a specific part of the testimony. When testimony has been videotaped, it is desirable to have the ability to use the video associated with key statements to impeach, or to expose an inconsistency between a witness' and earlier testimony or to show witness demeanor. Prior to the present invention, it has been difficult for attorneys to randomly search through testimony and then view the video information associated with key statements. To view the video, the attorney had to have access to a videotape player and either a TV screen or monitor. At the same time, it is difficult to show or review specific videotape segments during research or in trial because of the time consuming and inexact process of positioning the videotape to the correct location. In addition, some current systems require the attorney to select important video segments ahead of time so that a video editor can make a short videotape containing the segments of interest. It is difficult, if not impossible, to select new segments during trial if there is a change in testimony or theory.

While videotape retrieval systems are available and while some retrieval systems have been designed specifically for litigation, video depositions and court room presentations, all of these systems rely on videotape technology which is a linear video access technology. No matter how the videotape is indexed or linked with the text and no matter what type of system is used to control the location of the videotape and retrieval of video information, access to the tape is accomplished only by the time-consuming process of moving the tape linearly forward or backward.

One such videotape system is disclosed in U.S. Pat. No. 5,172,281 (Ardis et al.). The system in this patent uses analog video technology which is a linear technology and requires a tape deck and special PC card for viewing. Even though the videotape is indexed with information linking the video to the testimony, it is still necessary to linearly position the videotape. In addition, an end user must purchase both a PC and appropriate audio/video equipment.

Despite the numerous systems known for linking video to testimony, there is still a need for a system that stores video and written information on random access media (e.g., CD-ROM and diskette) to allow instantaneous access to any location in the video and that eliminates the need for a videotape deck and TV screen to view video. In addition, there is a need for a system which creates a product on random access media, and once created, can use existing software tools for researching and analyzing text and for instantaneously accessing the corresponding video information using only a single personal computer. There is also a need for a system which can create such a product from any type of event, legal or otherwise. The present invention fills this need.

SUMMARY OF THE INVENTION

The present invention is a method of creating a video product with synchronized video and text of an event. Before the method is performed, a first video record is made of the event and stored on a first storage medium, and an original transcript of the event is made and stored on a second storage medium, the second storage medium being a random access medium. The original transcript contains spoken word information and format information. The format information includes page and line numbers. The first step of the method is to generate a converted transcript which includes only the spoken word information, but which maintains the same lines of spoken word information as in the original transcript. The lines of the converted transcript are sequentially numbered and have a predetermined relationship to the page and line numbers of the original transcript. Next, a second video record is made on a third storage medium from the first video record. The second video record has sequentially numbered video frames. The third storage medium is a random access storage medium. Next, the converted transcript is displayed on a computer while the second video record is played on the same computer. A signal is sent to the computer at each line of the converted transcript when the second video record matches the current line of text of the converted transcript. The signals and the video frame information are used to create an index of the page and line numbers of the original transcript to the video frames of the second video record. The page and line numbers are recreated from the converted transcript lines and the predetermined relationship therebetween. Next, the index and the converted transcript are stored on a fourth storage medium. The fourth storage medium is a random access medium. Together, the third and fourth storage media are the video product. The video product is usable to simultaneously play back the second video record, the corresponding transcript, and the original page and line numbers by using the index on the fourth storage medium.

In one embodiment of the invention, the signalling is performed by an operator. In other embodiments of the invention, SMPTE or time information stored on one or both of the original transcript and first storage medium are used to automatically create the video product.

In another embodiment of the invention, a method is provided to automatically create the video product in a real-time manner at a live event, or while playing back a recording of a live event.

Additional embodiments of the invention provide apparatus for performing the methods above.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 also shows the operational steps used when there is no time or SMPTE code information on the ASCII disks or VHS tapes created in the process of FIG. 1;

FIGS. 9–14 are project log and processing sheets used to track projects, tapes, video files and ASCII files when performing the processes in FIG. 1.

DETAILED DESCRIPTION OF PREFERRED EMBODIMENT

Figure 1:
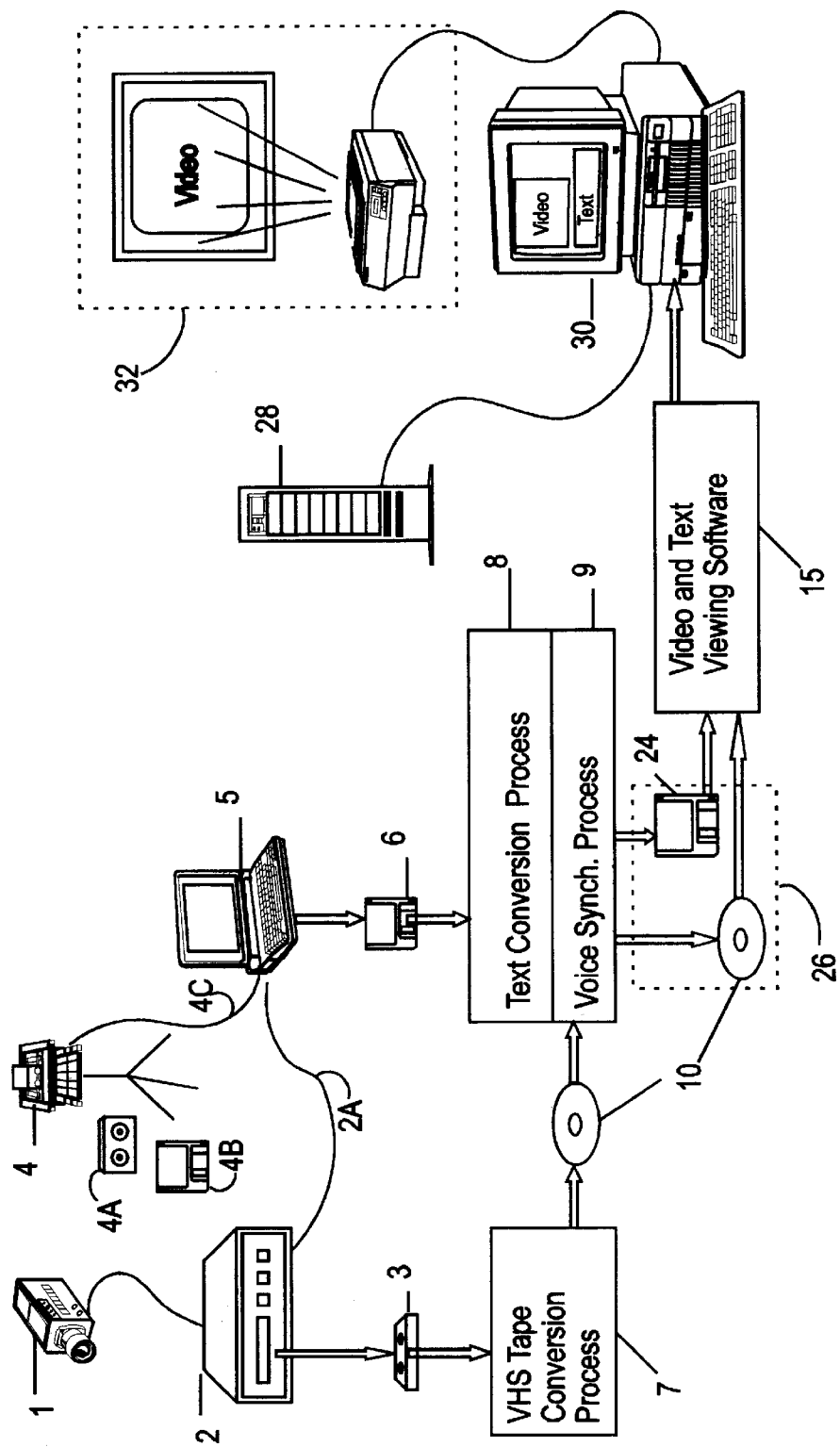
FIG. 1 is a system level schematic diagram showing the processes of a preferred embodiment of the present invention for creating a synchronized video product, the related video and text viewing software, and the manner in which these components interface with computer, videographic, stenographic and courtroom technologies.

Certain terminology is used herein for convenience only and is not be taken as a limitation on the present invention. The word "video" means either visual and audio data or just audio data. Viewing a "video" implies that the user is both seeing and hearing the video. However, certain disclosed and claimed steps of the present invention require only that the user "hear" the video. In the drawings, the same reference numerals are employed for designating the same elements throughout the several figures.

The present invention is explained in six sections. Section I is an overview of the present invention. Section II is a brief description of the software programs which were specifically developed to create and use a preferred inventive product. The software programs interface with existing software programs, identified below. Section III is a brief description of three overall processes which are required to create the preferred inventive product. Section IV is a detailed description of preferred embodiments for creating the inventive product, and are described in conjunction with FIGS. 1–8. Section V is an operations manual which provides a detailed description of the step-by-step tasks and related file structures for carrying out some of the preferred embodiments. Section V is described in conjunction with FIGS. 9–14. Section VI is a printout of the Form Text and graphical representation files for XCON (referred to as CONVERT below), LIPSYNC and VIDLINK for the preferred embodiments of the invention as described in Sections II–V. XCON is Part 1 of the printout, LIPSYNC is Part 2 of the printout, and VIDLINK is Part 3 of the printout.

The present invention is described in the context of capturing and synchronizing video and transcripts from a legal proceeding. However, the scope of the invention is much broader. The present invention may be used to capture and synchronize a recording of any event to a separately created transcript of the event. No video component may even exist for the event, such as in the case of a wiretap recording.

Section I-Overview of present invention

The present invention incorporates an integrated set of processes and a set of software programs for the transfer of videotaped testimony to a random access storage medium (e.g., CD-ROM), the synchronization of the video testimony with the text of the testimony, and the display of both video and synchronized text on a personal computer screen for the purposes of litigation research and video presentation during trial.

To take advantage of advances in digital video compression and recording technologies, all software programs were developed using Microsoft's standard Windows and associated video interfaces. The present invention also makes use of existing software and hardware developed for Microsoft's Windows platform. This includes software and hardware for the capture, digitization, compression, editing and playback of digital video information.

The disclosed embodiment of the present invention works with current VHS tape systems for recording video depositions and provides a VHS Tape Conversion Process which can convert existing VHS tapes to compressed digital format and then transfer the digital video information to CD-ROM.

The indexing scheme used by attorneys to reference testimony is page and line number of a transcript (e.g., page 45, line 12). ASCII files created by different CAT systems have page and line numbers in different places and insert a variety of extraneous text lines in the footers and headers of the transcript. To have general applicability to current CAT systems and for the synchronization and text viewing software to be able to determine the testimony page and line number of the ASCII text, the present invention provides a process and software program for converting any ASCII file into a Common ASCII File Format. During the conversion, all extraneous text is removed from the ASCII File. A computer program allows for recreation of the correct page and line numbers from the Common ASCII File.

The compressed digital video information on CD-ROM must ultimately be synchronized with the text of testimony. Accordingly, the present invention provides a process and supporting software program for synchronizing testimony text in Common ASCII File Format with digital video files on CD-ROM.

Some currently marketed CAT systems can link to a video camera and stamp time or SMPTE code information on the ASCII data as it is generated. The present invention accommodates this additional time or SMPTE code information in the synchronization process. (A SMPTE code includes time, date and frame information.)

To view both text and synchronized video, the present invention provides a video and text viewing program for displaying on a computer screen the video that is stored on CD-ROM along with the synchronized text. In addition, to have applicability to existing text viewing software, the present invention has an Application Programming Interface (API) for the video viewing portion of the program that allows existing text viewing software to add the video capability. The video viewing API can interface with the most commonly used programs for viewing and researching testimony. For courtroom display of video, the video viewing portion of the program can enlarge the video display on the computer screen or a court room projection system, and uses standard CD-ROM changers and jukeboxes which hold several CD-ROMs at one time. This allows the attorney or program operator to have on-line access to several hours of video.

Section II-Brief description of the software programs

The following three software programs were developed as part of this invention. These programs are used in the processing steps for converting and synchronizing video and are used to display synchronized text and video on a computer screen. The programs were all developed Microsoft's Windows using Microsoft's Visual Basic for Windows and associated Visual Basic controls (VBXs) for audio and video. These controls provide a standard set of video functions such as open video file, play the file, advance to a specific frame, etc. By developing the programs for this invention using standard Microsoft Windows interfaces, the present invention can take advantage of future advances in video compression and display technology, since such new technologies will adhere to the Microsoft Windows standard. The present invention can make use of any compression technology currently available that is compatible with Windows.

1. Transcript Conversion Program (CONVERT)

The CONVERT program converts ASCII files received from a court reporter into a common format that allows a computer program to determine the page and line number of each line of testimony text. The program discards all extraneous text, such as headers and footers inserted by the court reporter. If time or SMPTE code information is available with the text, the program saves such information in a PRESYNC file. The program requires the operator to visually review an ASCII file prior to conversion in order to determine the starting column numbers of transcript text and any time or SMPTE code information.

2. Lip Synchronization Program (LIPSYNC)

The LIPSYNC program is used to synchronize the text and video. The program allows the operator to load a text file and associated video files. Once loaded, the text and video is viewed in two windows on the computer screen. The operator plays the video and listens to the associated audio and, at the same time, reads the testimony text. While listening to the audio and reading the text, the operator presses special keyboard keys to synchronize the video and text. The output of the LIPSYNC program is a SYNC file that links every page and line of the testimony to a frame number in the video.

3. Video and Text Viewer Program (VIDLINK)

The VIDLINK program is used by an operator to view synchronized video and text. The program creates two windows on a computer monitor. One window contains the text and the other window contains the associated video. The operator is given tools to search and scroll through the text and video. Whenever the operator moves to a new location in the text, the video jumps to the same point. Likewise, moving around in the video or playing the video in real time cause the text to move to the same point or to scroll along with the video. The VIDLINK program contains tools for importing a transcript and associated SYNC files and video. It also contains an application programming interface (API) for accessing the video viewer portion of the program. This API provides a standard interface to other transcript viewing programs that run on Windows. It allows such programs to add synchronized video to the respective text viewing functions of the program.

Section III-Brief description of processes

The following three processes are used to create an inventive product.

1. VHS Tape Conversion Process

The Tape Conversion Process uses commercially available hardware and software products for capturing, digitizing and compressing digital video files in a specific format used by the Voice Synchronization Process and text and video display software (VIDLINK) of the invention. The process also uses existing hardware and software for writing digital video files to CD-ROM.

2. ASCII Text Conversion Process

The Text Conversion Process uses the CONVERT program to convert an ASCII disk received from a court reporter into the Common ASCII File Format (CAFF) used by the Voice Synchronization Process and VIDLINK.

3. Voice Synchronization Process

The Voice Synchronization Process uses the LIPSYNC program to link together digital video testimony on CD-ROM and ASCII text in Common ASCII File Format.

Section IV-Detailed description

Referring to FIG. 1, a videographer makes a video recording (first video record) of testimony in a legal proceeding using a video camera 1 and videotape recorder 2. The process generates one or more VHS tapes 3 (first storage medium). Normally, one VHS tape holds up to two hours of video when recorded on its fastest speed, the speed that provides the best resolution. One day of testimony typically generates three or four tapes at the fastest speed. A court reporter (not shown) simultaneously records testimony using a transcription device or stenograph machine 4. The machine 4 normally records the testimony on a paper tape in the form of phonetic characters which are a shorthand, word-for-word record of the testimony. Alternatively, the machine 4 is equipped for Computer-Aided Transcription (CAT). The output of the machine 4 is recorded onto a cassette 4A, diskette 4B or onto a personal computer 5 connected by a serial communications cable 4C to the stenograph machine 4. Regardless of the method of recording, the software in a personal computer 5 creates the ASCII text of the testimony and copies the text onto a diskette 6 (second storage medium). The contents of the diskette 6 is thus an original transcript of the legal proceeding and includes spoken word information and format information. Format information includes page and line numbers, headers and footers. The header typically identifies the party being deposed or testifying and the footer typically identifies the transcript service provider. Some CAT systems may also be connected via a cable 2A to the videotape recorder 2 which generates a continuous time stamp or SMPTE code for insertion into the ASCII text, effectively time stamping each line of text. The same time or SMPTE code is also written to audio channel B of the VHS tape 3.

The VHS tape 3 goes through a Tape Conversion Process 7. The output of the Process 7 is a second video record on one or more CD-ROMs 10 (third storage medium). Each CD-ROM 10 includes sequentially numbered video frames (e.g., 1 to n). The diskette 6 goes through a Text Conversion Process 8 described below. The CD-ROM(s) 10 and diskette 6 are then used together in a Voice Synchronization Process 9, the output of which is a diskette 24 (fourth storage medium) containing synchronization files and converted text. Together, the CD-ROM(s) 10 and diskette 24 constitute the video product 26 created by the system. Video and Text Viewing Software 15 is used to check that the video product 26 was properly made. When it is desired to use the video product 26, the CD-ROM(s) 10 are loaded into a CD-ROM drive or multiple CD-ROM device such as a jukebox or CD-ROM changer 28 which is connected to a multimedia computer 30. The diskette 24 and Video and Text Viewing Software 15 are loaded into the multimedia computer 30, and the software 15 is started. The output of the multimedia computer 30 is displayed on the computer monitor. Alternatively, the output may be displayed on a projection system 32.

Figure 2:
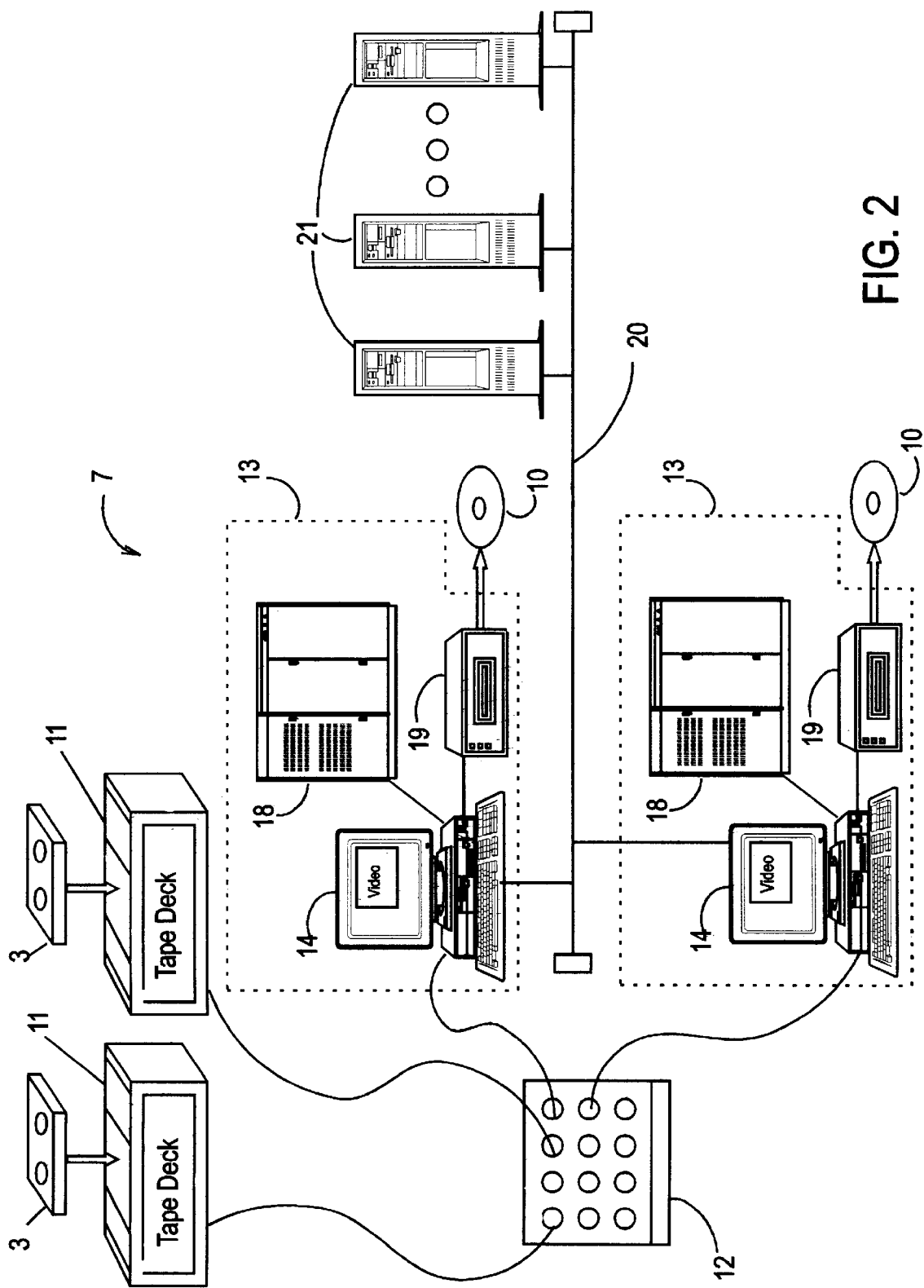
FIG. 2 is a system level schematic diagram showing the physical configuration of equipment used for a VHS Tape Conversion Process in FIG. 1.

FIG. 2 shows the processing system used to transfer video on a VHS tape 3 to a random access storage medium, CD-ROM 10 (VHS Tape Conversion Process 7 shown in FIG. 1). The Processing 7 system includes one or more videotape playback decks 11 and an audio/video switch 12 for switching the deck output (audio, video and time code information) to one or more capture systems 13. Each capture system 13 includes a PC 14 configured with a large mass storage system 18 and a CD-ROM writer 19. The mass storage system 18 can be any high capacity, high volume, magnetic disk storage system. The requirements for the mass storage system 18 are a data transfer speed capable of supporting real-time video capture (this currently requires magnetic disk technology) and a data storage size capable of holding several hours of digital compressed and un-compressed video information. The capture system PC 14 is also configured with a video capture hardware card compatible with Microsoft's Windows, such as an Intel Smart Video Recorder Pro card or an OptiVision MPEG capture card. The CD-ROM writers 19 are any commercially available CD-ROM writer and associated software capable of writing data files to CD recordable (CDR) media.

The capture system PCs 14 are connected via a Local Area Network (LAN) 20. Also attached to the LAN 20 are one or more compression computers 21. The compression computers 21 are high speed Intel Pentium or equivalent processors configured with Windows and digital video editing software compatible with Windows, such as Asymmetric's Digital Video Producer. The compression computers 21 perform digital video processing on video files that have been captured by the capture systems 13 and stored on a respective mass storage system 18. Since digital processing such as compression is very high in CPU utilization but very low in disk utilization, the video files are accessed via the LAN and don't have to be moved to a local drive of a compression computer 21. By keeping all digital video files in one location, it is not necessary to move around such very large files, an extremely time consuming process. Also, there is no capture software currently available that can run on the server of a client/server LAN. For these reasons, the LAN 20 is preferably a peer to peer LAN such as Microsoft's Windows for Workgroups.

Once the digital video files are created by the capture systems 13 and processed by the compression computers 21, they are written directly to CD-ROMs 10 by the CD-ROM writers 19. Again, since a peer to peer LAN is used, it is not necessary to move around such very large files. The files can be written directly to the CD-ROMs 10 from the mass storage systems 18. CD-ROM writers 19 require a very high data transfer rate during the write process. If the digital files were stored on a server in a client/server LAN, the LAN might not be able to maintain the required data transfer rate.

Figure 4:
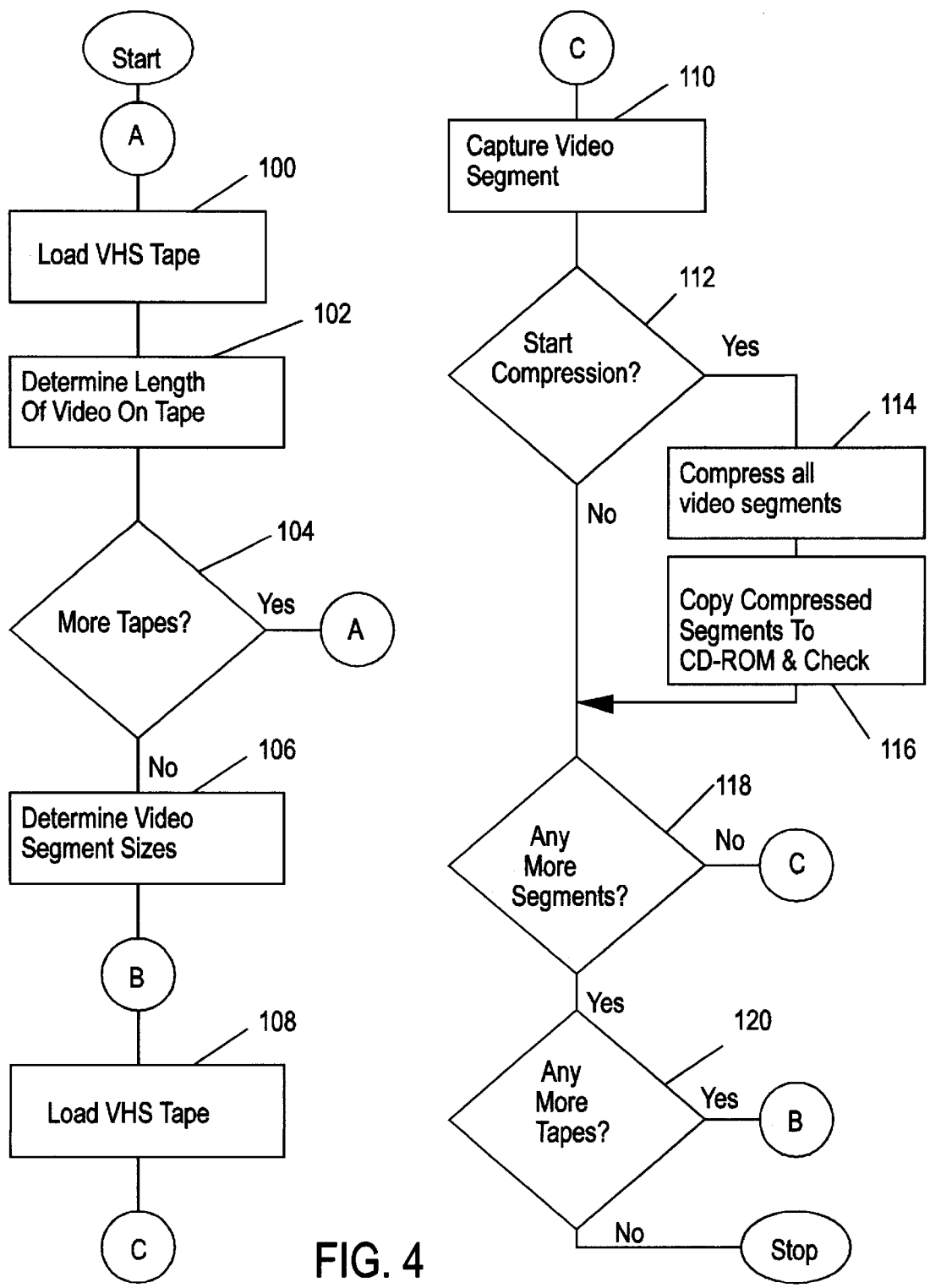
FIG. 4 is an operational flow diagram of the VHS Tape Conversion Process in FIG. 1.

FIG. 4 shows an operational overview of the steps for transferring video from a single deposition having been previously recorded on one or more VHS tapes 3 to a CD-ROM. Video on the tapes 3 is captured, digitized and stored in files on the mass storage system 18. Depending on the type of video capture and digitization hardware used, the files may have to be compressed by the compression computers 21. Compression requires a significant amount of processing time. For example, it can take several seconds to compress one frame of digitized video. Since video frame rates range from 15 to 30 frames per second, compressing one hour of video can take several hours. To reduce the elapsed time needed for compression, the video on each VHS tape is separated into small files, called segments, during the capture process. The segments are then compressed by the compression computers 21 in parallel. Once compressed, the video segments are written to a CD-ROM 10.

One type of CD-ROM commonly used today holds about 640 MBytes. The optimal size of the video file segments needed to fill up each CD-ROM must be determined prior to capture. The size of the segments is also a function of the number of compression computers 21 and the length of video on each tape. For convenience during capture, video segments do not span from one tape to another. To calculate the optimal length of the segments to minimize elapsed processing time, the length of video on each tape must first be determined.

Referring to FIG. 4 (steps 100–104), each VHS tape 3 is loaded into a tape deck and fast forwarded to find the end of the video (step 102). The total time is recorded for each tape. Once the length of the video on each tape is known, the size of each video segment is determined (step 106). For example, one CD-ROM holds about 80 minutes of video when made as follows:

| | |
|---|---|
| capture and compression hardware | Intel's Smart Video Recorder |
| capture and compression software | Intel's Indeo 3.2 compression algorithm |
| frame rate | 15 frames per second |
| frame size | 240 × 180 |
| data rate | 130 KBytes per second |

If four compression computers 21 are available, each compression computer 21 compresses a 20 minute segment. If the VHS tape holds two hours (120 minutes) of video, then the capture process should separate the video into six, 20 minute segments. The first four 20 minute segments of tape 1 go onto a first CD-ROM. The next two 20 minute segments of tape 1 are combined with two 20 minute segments from tape 2 to fill out a second CD-ROM. Normally it is not possible to fill out the last CD-ROM since the total minutes of video on all VHS tapes will not be divisible by 80 minutes. Also, the number of minutes on each VHS tape varies, causing some segments to be less than 20 minutes.

Note that during the actual capture process, described below, the size of the segments change slightly to make clean cut points between each segment. During video testimony, there are many pauses in the audio. It is desirable to have a cut point (end of a segment) at one of the pauses so that the ending frame of one segment does not have to precisely match the beginning frame of the next segment. For example, segment one could end on frame 2300 and segment two could begin on frame 2302. There is no substantive loss of video information. In this manner, the need to have precise, frame level control over the tape deck is eliminated, which reduces the cost and complexity of the tape deck and operating costs.

Once the size of the segments for each VHS tape is determined, the actual capture and compression process begins. Referring again to FIGS. 2 and 4, the first step is to load a VHS tape 3 into the tape deck 11 (step 108). Next, the A/V switch 12 is switched to the appropriate capture system 13. Commercially available capture software compatible with Windows can be used, such as Asymmetric's Digital Video Producer video capture software. Such software is initialized to capture the next video segment (step 110). To perform step 110, a video segment file is established to receive the video as it is digitized and copied into the computer 14 by a video capture card. One suitable video capture card is an Intel Smart Video Recorder card. In addition to the video information, a small time code file is also established if the VHS tape has time code or SMPTE code information on it. The time code file holds the time code or SMPTE code information associated with the corresponding segment. Time code or SMPTE information is usually stored in audio channel B of the VHS tape 3. The tape deck 11 reads the time information and outputs the time information to the capture PC 14 for storage in the PRESYNC file.

When the capture software is ready, the tape deck 11 "play" button is pushed and the start capture command is entered into the capture PC software. Videographers normally have a small amount of blank video at the beginning of a VHS tape. Since there is no audio in the blank area, it doesn't need to be captured. The tape deck thus starts prior to the capture software. Likewise, cut points between segments are done at pauses in the audio, allowing the capture software to be stopped prior to stopping the tape and allowing the tape to be started prior to restarting the capture software. A video processing sheet is used to manually record the start and stop locations for each segment. FIG. 12 (described further below) shows an example of such a sheet.

Referring again to FIGS. 2 and 4, a single mass storage system 18 may not be able to hold all the captured segments for all the VHS tapes 3. When capturing video segments (step 110), the amount of space left on the currently used mass storage system 18 must be monitored. When the mass storage system 18 is full (step 112), the captured segments must be compressed (step 114) and written to CD-ROM 10 (step 116) using the CD-ROM writer 19 and CD-ROM writer software. One suitable CD-ROM writer software is Corel's CD Creator. In step 114, video segments are compressed in parallel by the compression computers 21. The compression computers 21 access the video segments on the mass storage system 18 via the peer to peer LAN 20. Once all of the segments have been compressed using compression software such as Digital Video Producer, the segments are written to CD-ROM 10 and checked for good audio and video playback (step 116) using standard playback software, such as Microsoft's Media Player. If errors are present, the problem segment is either recompressed or possibly recaptured and recompressed depending on the type of error. Once the compressed segments have been moved to CD-ROM 10, the capture files are deleted from the mass storage system 18. Any more segments on the current VHS tape can then be captured (step 118). As the segments on each VHS tape are completed, new VHS tapes are loaded (step 108). The process continues until all tapes have been processed (step 120).

Some types of video capture hardware can compress the video during the actual capture process. That is, the hardware captures, digitizes and compresses all in one step. In this case, it is not necessary to use the compression computers 21. Instead, the captured video segments can be written directly to CD-ROM 10.

Compression algorithms that allow video to be captured and compressed in real time are called symmetrical algorithms. That is, the time needed to capture and compress is the same as the time needed to decompress and display on a computer screen. The Motion Picture Experts Group (MPEG) algorithm is an example. There are a variety of commercially available MPEG capture cards available. Compression algorithms that require more time to compress than to decompress for playback are call asymmetrical algorithms. Intel's Indeo algorithm is an example. The advantage of using capture hardware with symmetrical algorithms is that the lengthy compression step is eliminated. The disadvantage is that playback may require a special hardware card inserted in the playback PC. Asymmetrical algorithms on the other hand allow compressed video to be played without a special hardware card. For example, Intel's Indeo algorithm plays well on a 486 PC without special hardware.

Figure 5:
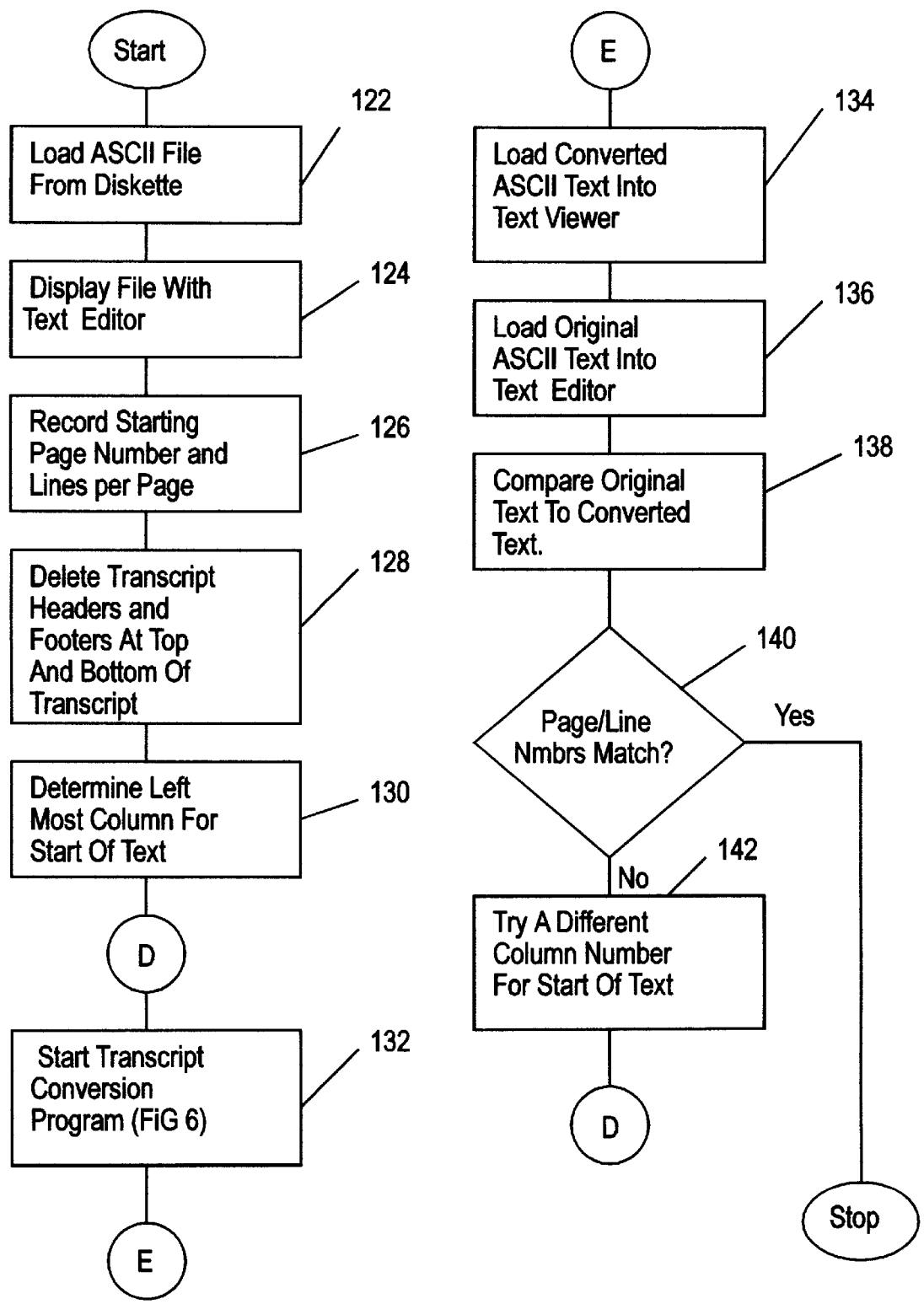
FIG. 5 is an operational flow diagram of the ASCII Text Conversion Process in FIG. 1 which uses a Transcript Conversion Program (CONVERT)

The ASCII text file received from the court reporter must be converted into a format that allows the synchronization and viewing software to know the page and line number of the text. Page and line number characters are inserted into the text by the court reporter's software to be printed out and read by an operator. No computerized page and line number index is provided with the ASCII file. The present invention uses a specially developed software program and process to convert any ASCII file into a Common ASCII File Format (CAFF) that can be accessed by a computer using page and line numbers. FIG. 5 is an overview of the process and FIG. 6 is a flow chart of the program.

Figure 3:
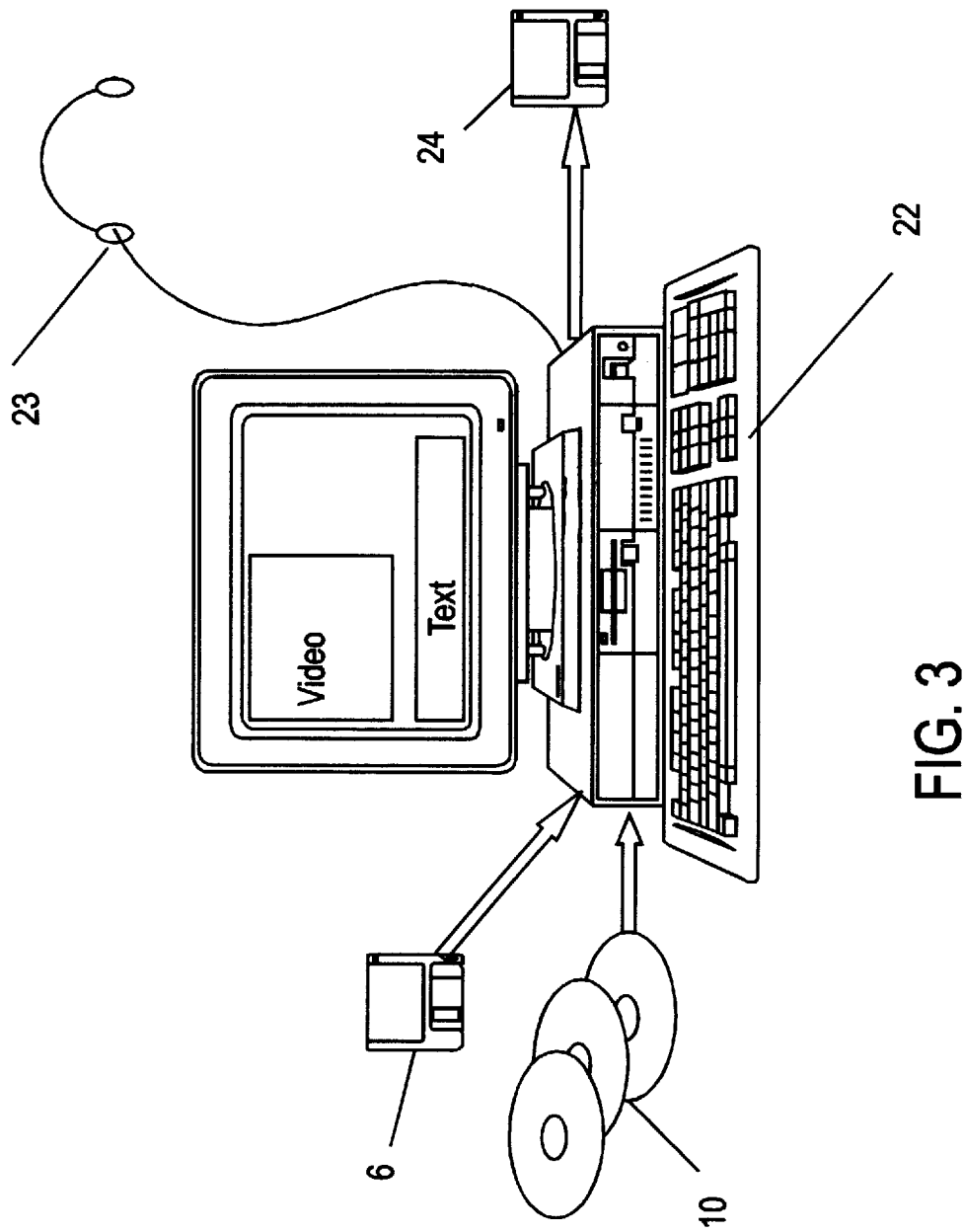
FIG. 3 is a system level diagram showing the physical configuration of computer equipment used for the Text Conversion Process and the Voice Synchronization Process in FIG. 1.

Referring to FIGS. 3 and 5, the first step of the process is to copy the ASCII file on diskette 6 into the hard disk of text/video synchronization computer system 22 (step 122). Using a typical text editor such as Microsoft's Write Editor or a word processor such as WordPerfect, the text of the ASCII file is displayed on the computer screen. The starting page number within the text is read by the operator (step 124). (Some transcripts are continuations of earlier testimony and do not start on page 1.) The number of lines per page can be determined by scrolling down through the text and observing the maximum line number inserted by the court reporter. The starting page and line numbers are recorded on an ASCII Conversion Sheet (step 126). Also, if the ASCII file contains time code or SMPTE code information, the column number location of such data is recorded. FIG. 10 (described further below) shows an example of such a sheet. At the same time, if there is any extraneous information at the beginning or end of the ASCII file, such as court reporter address, such information is deleted using the text editor (step 128). It is important to preserve all text in the body of the file since deleting any text causes page and line numbers to be incorrect. Using the text editor, the left most column for the start of text for each line of testimony is determined by scrolling down through the text (step 130). The text of each line from the court reporter software starts in the same column for the entire transcript. The output of the text editor is saved as a new file, leaving the original ASCII file unaltered.

Figure 6:
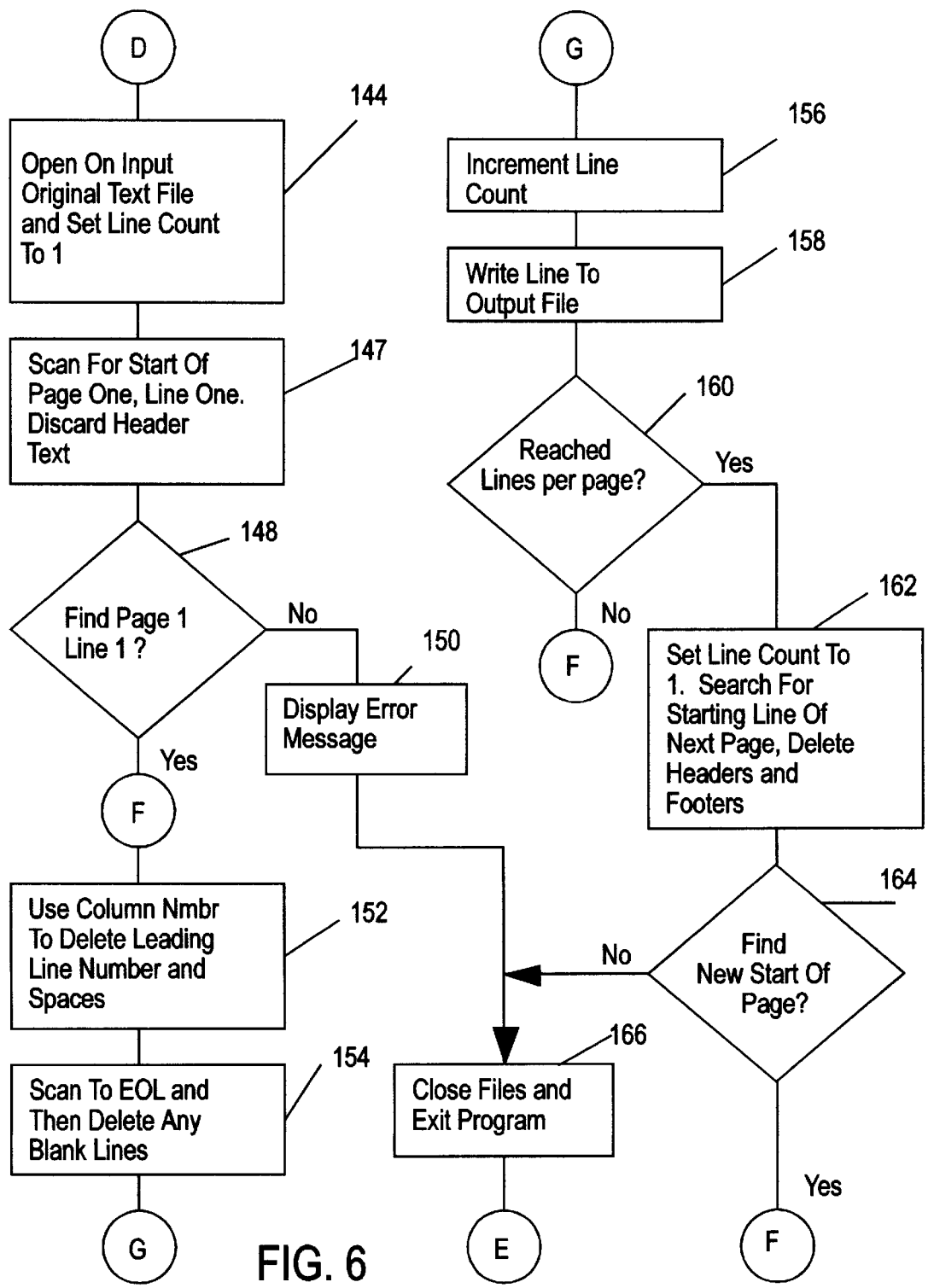
FIG. 6 is a flow diagram of the Transcript Conversion Program.

Referring to FIGS. 5 and 6, the Transcript Conversion Program (CONVERT) is then started (step 132). The name of the file saved by the text editor, the starting page number, the number of lines per page and the starting column number of the text must be entered into the CONVERT program. The logic of CONVERT is shown in FIG. 6. CONVERT creates the CAFF file for the transcript. A CAFF file has distinct lines, each terminated by carriage return and line feed. All extraneous headers, footers, blank lines, line numbers and page numbers, which are not part of the written testimony, are discarded.

When CONVERT starts, line count is set to one and the text file created by the text editor (steps 122-130) is opened on input (step 144). The program then scans to the start of line one on the first page of the transcript file (step 146). The scanning is accomplished by looking for the character "1" followed by spaces then text starting in the column number supplied, i.e. line one (1). If the first line of the first page cannot be found, an error message is printed (steps 148 and 150) and the programs exits (step 166). If the first line can be found, the starting text column number is used to delete extraneous characters and spaces and the line number characters (step 152). Then the program scans the text to find the end of line (EOL) (step 154). Once the EOL is located, the line count is incremented (step 156) and the line is written out to an output file (step 158). If time or SMPTE codes have been inserted, such information is extracted and placed in the PRESYNC file. The process of locating a line, discarding extraneous information and then writing the line to an output file continues until the lines per page limit is reached (step 160). The line count is then set back to one and the program begins searching for line one of the next page, disregarding extraneous header and footer text (step 162). The process continues in the same manner until a "next page" cannot be found indicating that the end of the ASCII text has been reached (step 164). The program then closes all files and exits (step 166).

The output of the CONVERT program is the ASCII text in CAFF format and optionally a PRESYNC file. The PRESYNC file contains an entry for each line of the transcript. Each entry contains the time or SMPTE code information for the line.

Referring to FIG. 5, once the Transcript Conversion Program has converted the ASCII text to a file of distinct lines without extraneous text, the converted text is loaded into the Video and Text Viewer Program (VIDLINK) (step 134) developed as part of the present invention. The VIDLINK program displays the text of the converted file along with calculated page and line numbers which are displayed in the left hand column next to each line of text. The program uses starting page number and number of lines per page to calculate the correct page and line number. It keeps track of the current line number of the file being displayed and divides that number by the lines per page. VIDLINK is a Windows program and its window can be displayed next to other Windows applications. By loading the original text file, using a text editor (step 136) such as Microsoft's Write Editor, the original and converted files can be displayed side by side (step 138). The operator then scans through the original text, reading the page and line numbers (line-by-line), and at the same time scanning through the converted text using the VIDLINK program that computes and displays the page and line numbers. The operator determines if the converted file matches the original file (step 140). If it does, the original ASCII file has been correctly converted. Otherwise, a new column number is used and/or the original text is edited slightly to eliminate extraneous text hindering the conversion program and CONVERT is run again (step 142).

Once the VHS tapes are converted to CD-ROM and once the original ASCII file is converted to CAFF, the text/video synchronization is completed using computer system 22 shown in FIG. 3 and the LIPSYNC program developed as part of the present invention. LIPSYNC is a Windows program developed using the Microsoft's Visual Basic and associated audio and video controls (VBXs). LIPSYNC allows the user to play (view and hear) a video while at the same time reading text of the associated CAFF file. LIPSYNC operates with any compression algorithm, and associated hardware and software, compatible with Microsoft's Windows. LIPSYNC displays video in one window while displaying text in another. Special keystrokes allow the operator to stop, start, forward and reverse the video and allow the operator to scroll up and down in the text. LIPSYNC displays text using the same page and line count logic of the VIDLINK program. That is, text is displayed along with the calculated page and line number information. By pressing the ENTER key, the operator links the current text line highlighted to the current video segment's frame number. The linking information is stored in a SYNC file.

Figure 7:
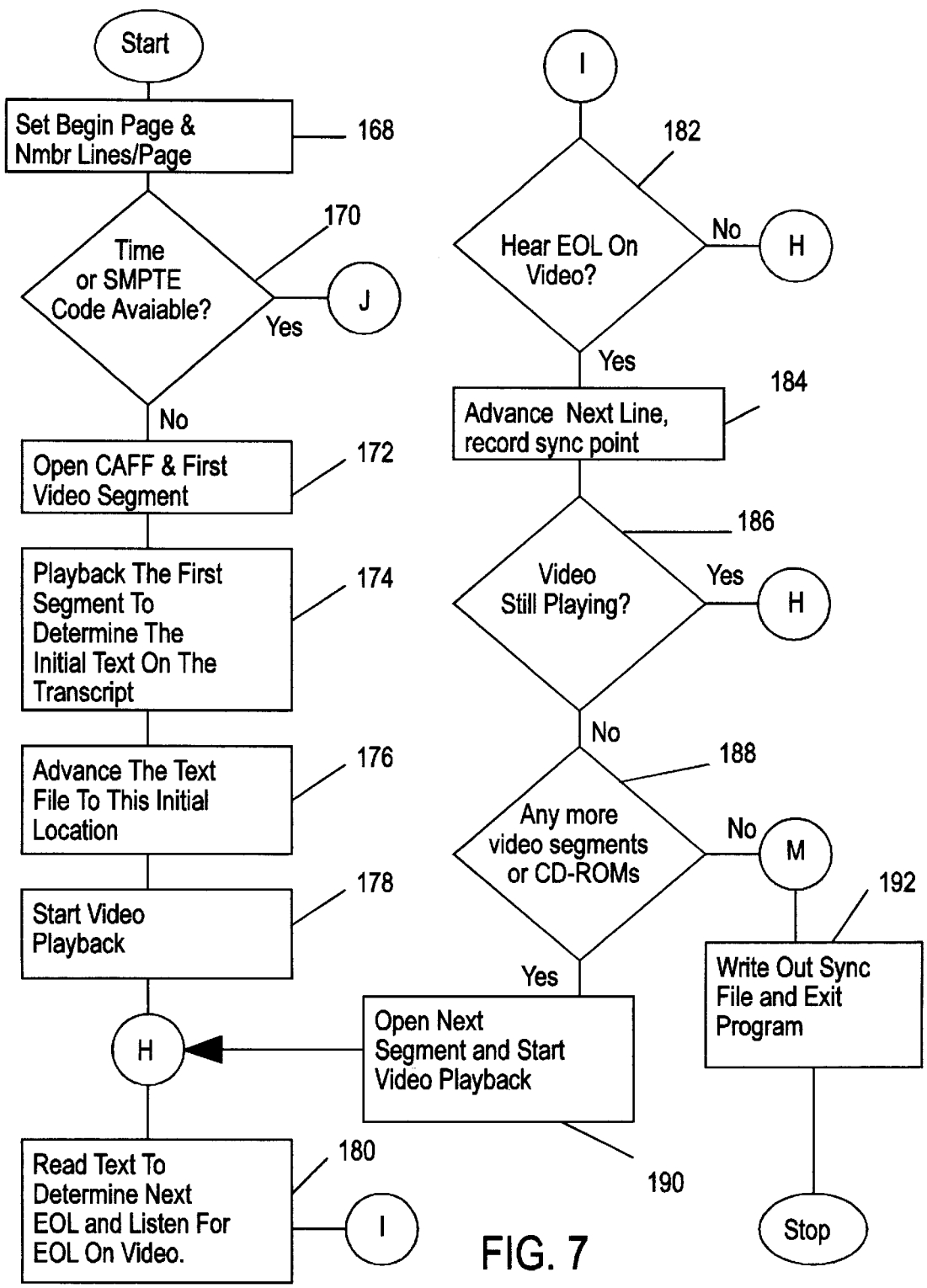
FIG. 7 is an operational flow diagram of the Voice Synchronization Process in FIG. 1 which uses a Lip Synchronization Program (LIPSYNC).

FIG. 7 shows the procedure for using LIPSYNC. Referring to FIGS. 3 and 7, the operator puts on an audio headset 23 to hear the audio portion of the video and starts LIPSYNC by supplying a starting page number and number of lines per page (step 168). The operator then determines if time or SMPTE information is on the original ASCII disk or VHS tapes (step 170). If so, processing goes to the steps shown in FIG. 8 (described below). Otherwise, the operator opens the CAFF file and the first video segment (step 172). The CAFF file is shown in a text window on a computer screen of the computer system 22. The page and line numbers for each line are also shown. The operator's job is to associate each line in the text with a frame number on one of the video segments stored on the CD-ROMs. The operator then starts playback of segment one by pressing the proper key and listens to the audio. Once some audio is heard (step 174), the operator stops the video and then scans the text looking for the words heard on the video, advancing the text using scroll keys until the words on the video can be seen in the text (step 176). There is also a text search function which allows the operator to scan the entire text. The operator establishes the initial synchronization point for the video and the text. The video is at a specific frame number and the text is at a specific page and line number.

The operator then starts the video playback (step 178) and listens to the audio while reading the corresponding text in the text window. The operator reads the words at the end of each line (EOL) and waits for the words to be spoken on the video (step 180). When the operator hears the words at the end of the line (step 182), ENTER is pressed which causes the program to link the text and video by recording the current page and line number and frame number in the SYNC file (step 184). At the same time the program automatically advances to the next line. The process continues until the end of the current video segment file is reached at which point the video stops (step 186). If there are more video segments and/or more CD-ROMs containing video segments (step 188), the operator opens the next video segment and starts the synchronization process again (step 190), synchronizing text with video until all video is complete. When all video files are complete, LIPSYNC writes out the SYNC file to diskette 24, and the process is complete (step 192). The converted text is also written to the diskette 24.

Figure 8:
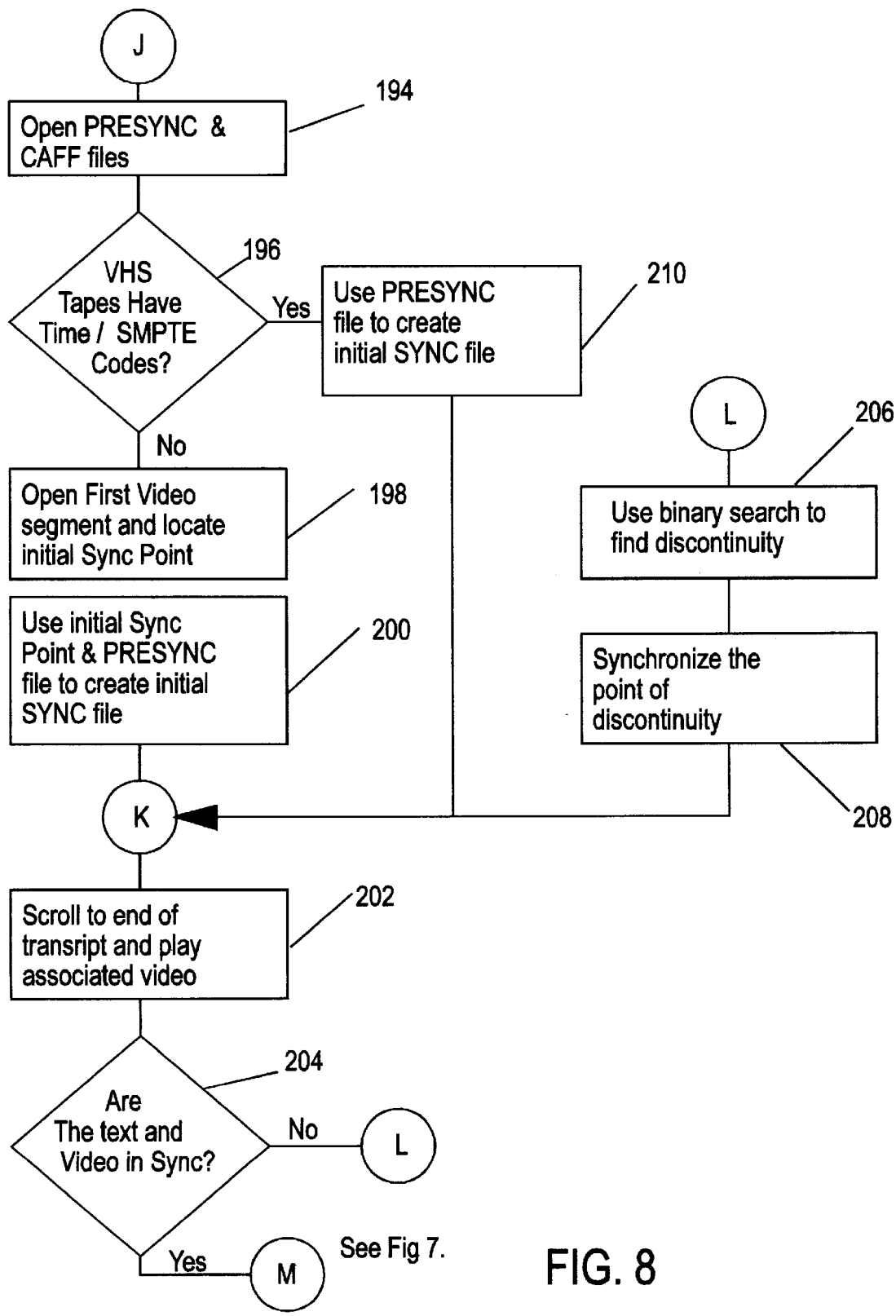
FIG. 8 is an operational flow diagram of the special operational steps used when there is time or SMPTE code information on the ASCII disks or VHS tapes created in FIG. 1.

FIG. 8 shows the processing steps and use of LIPSYNC if there is time or SMPTE code on the ASCII disk 6 and/or the VHS tape 3. This process is different than the process of FIG. 7. Referring to FIG. 8, the first step is to have LIPSYNC open the CAFF file and the PRESYNC file (step 194). At this point, there are two processing options (step 196). The first option ("NO" in step 196) is used when the ASCII text contains time or SMPTE information but the VHS tapes do not have such information (steps 198 and 200). The second option ("YES" in step 196) is used when both the ASCII file and VHS tapes contain time or SMPTE code information (step 210).

For the first option, LIPSYNC is used to open the first video segment and locate the initial sync point (step 198), just like in steps 174 and 176 of FIG. 7. When the operator advances the text file to the initial synchronization location (step 198), the operator presses a special key that causes LIPSYNC to read the PRESYNC file and make an initial version of the SYNC file. The PRESYNC file contains time or SMPTE code information for each line of the text. Since the VHS tape doesn't contain such data, it is necessary to make an initial synchronization of the text and video. Once the initial synchronization is done, LIPSYNC fills in the SYNC file from the initial point forward (step 200) using the time or SMPTE code information from the PRESYNC file. The PRESYNC data is correct up to any point where the videographer turned off the video camera, causing a discontinuity in time in the video. Time or SMPTE code information in the ASCII file beyond such discontinuity point will be out of synchronization. LIPSYNC provides features that allows the operator to locate the discontinuities in the video. After the initial sync point is located and the SYNC file filled in using data from the PRESYNC file, the operator jumps to the end of the testimony and plays the video while reading the synchronized text (step 202). If the text and video is out of sync (step 204), the operator does a binary search looking for the earliest point of discontinuity (step 206). LIPSYNC allows the operator to jump to a specific location in the video or transcript. The operator jumps from the end of the transcript (which was out of sync) to a point half way through the transcript. The video and text are played to see if they are in sync. If they are, the operator jumps half way toward the end of the transcript and checks the synchronization. If the video and text are out of sync, the operator jumps half way toward the beginning. This process continues until the first point of discontinuity in the video is found. The operator then presses a key to synchronize the text and video from that point forward (step 208) using data from the PRESYNC file in the same way that the initial sync point was established. The steps of (a) finding an initial sync point, (b) going to the end of the transcript and (c) locating points of discontinuity, continue until all the points of discontinuity have been located and properly resynchronized at which time the SYNC file is written out.

For the second option, the PRESYNC file is used to automatically generate the SYNC file (step 210) because the VHS tape contains time or SMPTE code information which can be linked directly to the transcript. The data was saved in the PRESYNC file during the capture process. For this option, LIPSYNC generates the SYNC file (step 210) and the operator then checks the results by examining different points in the transcript to make sure they are properly synchronized to the video (step 202). If an out of sync point is found (step 204), the binary search operation used for the first option is performed to find the point of discontinuity (step 206) and to correct it (step 208).

The output of LIPSYNC is a SYNC file that is an index, by page and line number of the video information on CD-ROM 10. There is an entry in the SYNC file for every line in the converted transcript. Associated with every entry is a video file segment name and the frame number offset into the video file (i.e., the frame number that was playing when the operator pressed ENTER for the line).

The SYNC file links together each line of a transcript with specific frame numbers on the video segment files associated with the transcript. To view synchronized video and text, a special Windows program, VIDLINK, developed as part of the present invention, displays both the text and the video in separate windows on a computer screen. Using VIDLINK, the user imports the text and SYNC files from either diskette 6, diskette 24 or CD-ROM 10 into the computer's hard disk. When the user opens the text file for viewing, the text appears in a window on the computer screen. The user can scroll from one location to another using standard text scroll functions. In addition, the user can open a video window for displaying the video segments stored on CD-ROM 10. When the video window is open, the VIDLINK program uses the associated SYNC file to determine the video segment and frame number offset corresponding to the current location (page and line) of the text file. Initially, the still image for the identified frame is displayed. The user then has the option to "play" the video by pressing a "play" button on the computer screen. The video then starts playing and the associated sound comes out of the computer's speakers. As VIDLINK is playing the video, it keeps track of the current video segment file and the current frame number. The software uses the SYNC file to track the current "sync" point in the text and automatically scrolls the text as the video plays. Alternatively, if the user scrolls through the text, VIDLINK uses the SYNC file to determine the current segment and frame number and displays the still image associated with any location in the text. VIDLINK also contains standard text search features for finding specific text strings. When the search function finds a specific string, the program moves the video image to the same location. Any computer with a VGA monitor can display the video. Since courtroom projectors are typically attached to VGA monitors, the video can also be displayed on a courtroom projection system 32 (see FIG. 1). The video files are stored on CD-ROMs which, in turn, can be stored on CD-ROM changers or jukeboxes compatible with Microsoft's standard file I/O system.

The video viewing portion of VIDLINK has an application programming interface (API) that allows other text viewing Windows programs to add the synchronized video capability. The video viewing software runs as a separate Windows application. The API provides communication between the video viewing application and other text viewing applications. Software commands are exchanged between the two applications. Commands from the text viewing software to the video viewer include the following two commands:

OPEN (open the SYNC file associated with the text file currently being displayed)

GO TO (move the still image window to the frame associated with a specific page and line of the text)

Commands from video viewing software, to the text viewing software, include the following command:

GO TO (scroll the text location to the specified page and line number)

Other commands are used to coordinate which text and SYNC files are open, to import SYNC files into the system, and to launch and close the video application.

An example of this API is the interface between VidLink and the transcript viewing software LiveNote.

It is also within the scope of the present invention to create the video product 26 of an event in real-time or from a prerecorded version of the event.

Figure 15:
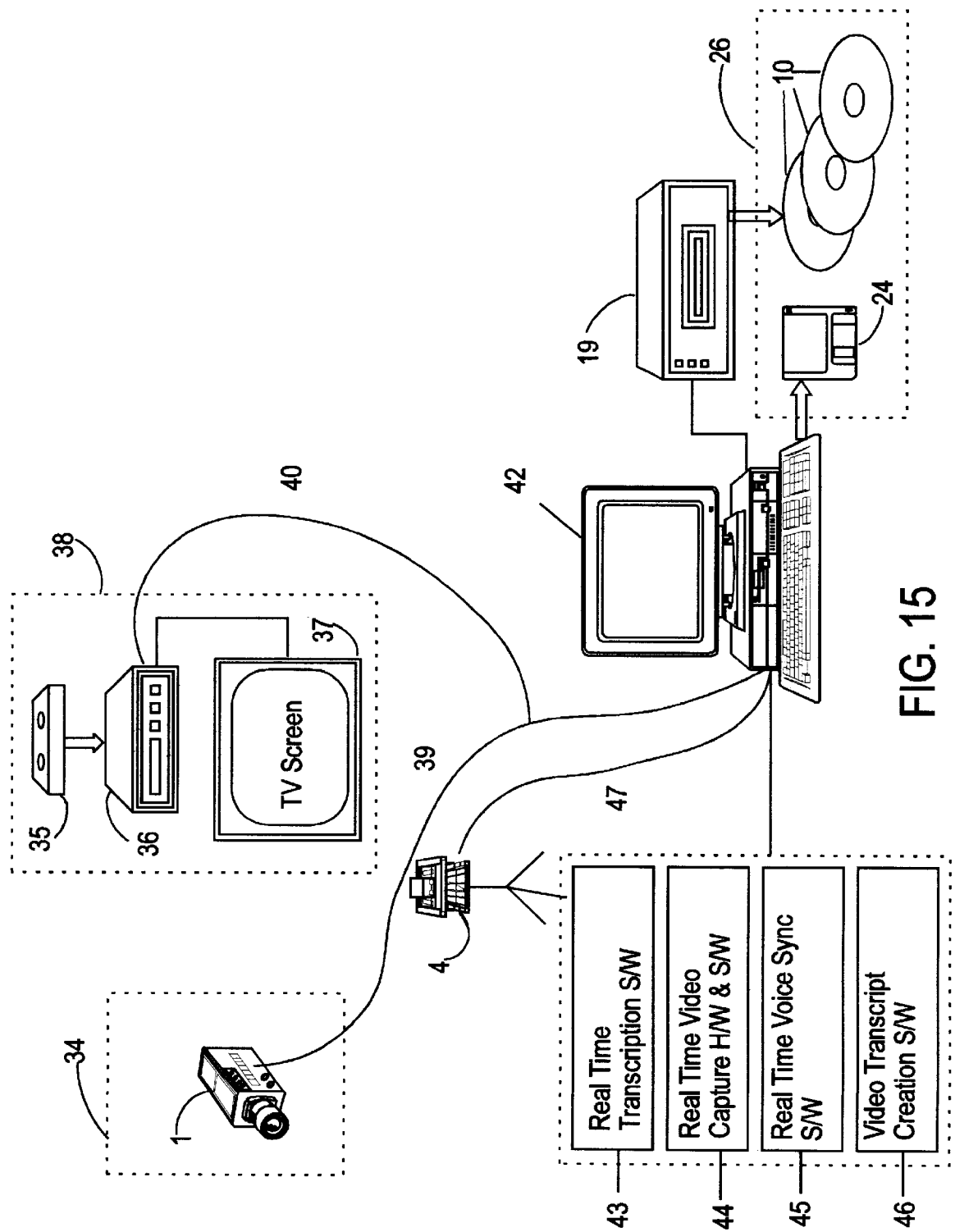
FIG. 15 is a system level diagram showing an alternative embodiment of the present invention wherein the synchronized video product is created from an event in real-time or from a prerecorded version of the event.

FIG. 15 shows a system level diagram of this alternative embodiment. This alternative takes advantage of (a) new CAT software that can generate the equivalent of a CAFF file in real time (for example LiveNote for Windows) (b) video capture hardware and software that can capture, digitize and compress a video signal in real time and (c) advances in SCSI device technology that allow a single computer to be configured with both a CD-ROM recorder and several gigabytes of hard disk space. For this alternative embodiment, a single PC 42 is configured with Real Time Transcription software 43 which of creates the equivalent of a CAFF file in real time, and Real Time Video Capture Hardware and Software 44 for capturing and storing video on the PC's hard drive. An example of this hardware and software is OptiVision's video capture hardware and software. Since the digital information is compressed, a local hard drive has enough room to store the video for one day of testimony. A 6 gigabyte local drive (for example, an internal SCSI drive) can easily hold eight hours of compressed digital video information.

For this alternative, the court reporter uses a stenograph machine 4 to record testimony. The output 47 of the stenograph machine 4 is sent to the PC 42 where it is converted into the equivalent of a CAFF file and stored on the PC's local hard drive by the Real Time Transcription Software 43. The testimony is either live (block 34 in FIG. 15) or is played back from a VHS tape recording 35 of prior testimony using a video tape recorder 36 (block 38 in FIG. 15). For live testimony 34, the court reporter listens to the spoken testimony in real time while a video camera 1 records the testimony. For prerecorded testimony 38, the court reporter watches a TV screen 37 while listening to the prerecorded testimony. In either case, the video information (either the output 39 of the video camera 1 or output 40 of the video recorder 36) is sent to the PC 42 to be captured, digitized, compressed and stored on the PC's 42 local hard drive.

The PC 42 contains Real Time Voice Sync Software 45, similar to the software developed for the Voice Sync Process (element 9 in FIG. 1) which has an interface to the Real Time Video Capture Hardware and Software 44 and an interface to the Real Time Transcription Software 43. The Real Time Voice Sync Software 45 continuously reads the output of the Real Time Transcription Software 43. At the same time, it continuously reads the output of the Real Time Video Capture Hardware and Software 44. This allows the Real Time Voice Sync Software 44 to generate a page and line number index of the video information. This index is generated in real time and is stored as a file on the PC's local drive. At the conclusion of the testimony, Video Transcript Creation Software 46 writes the transcript and associated SYNC file to a diskette 24, and writes the video information to one or more CD-ROMs 10. The transcript and SYNC files are identical in format to the transcript and SYNC files created by the Text Conversion Process (element 8 of FIG. 1) and the Voice Synchronization Process (element 9 of FIG. 1). Together, the diskette 24 and CD-ROMs 10 comprise a video product 26 identical to the video product 26 created in FIG. 1.

Special control functions in the Real Time Voice Sync Software 45 and the Video Transcript Creation Software 46 provide the ability to start and stop the live recording of video, for instance when there is break in testimony. This allows the compressed digital video information to be broken down into several smaller segments in a manner similar to the way the VHS Tape Conversion Process (element 7 in FIG. 1) breaks video into segments. Segments are created whenever there is a break in the testimony, or when the operator of the system determines that a new segment must be started (i.e., the equivalent of changing a VHS tape).

Section V-Operations Manual

The manual presumes that the process of creating the synchronized product is performed by a service company for a particular client wherein the creation of the product is a "Project." There would be no "client" if the process is performed in-house. However, the appropriate identifiers are still used. In the example below, the client's name is "CLIENT".

This manual was written for a specific compression technology, Intel's Indeo 3.2 compression, and associated capture, compression and editing tools. These tools include VIDCAP, a software program for capturing video; VIDEDIT, a software program for editing and compressing video; and Corel CD-Creator, a software program for writing a video file to CD-ROM. The video files for the Indeo 3.2 compression all have the AVI file extension which is Microsoft's audio video interleave file format. Other video file formats and associated extensions compatible with Windows and the audio/video controls of Microsoft's Visual Basic could also be used. A similar manual would be created for other compression technologies such as MPEG compression. In that case, the capture, compression and editing tools would be those associated with MPEG.

The manual was written for an operation wherein no PRESYNC file and associated data is available on the ASCII diskette or VHS tape.

Table Of Contents 1.0 Overview
   1.1 System Configuration
   1.2 Operational Overview
2.0 Tracking projects, tapes, video files and ASCII files
   2.1 Directories and File Naming Conventions
   2.2 Physical Storage Of Project Material
   2.3 Project Log and Processing Sheets
      2.3.1 Project Sheet (FIG. 9)
      2.3.2 ASCII Conversion Sheet (FIG. 10)
      2.3.3 Audio and Video Settings Sheet (FIG. 11)
      2.3.4 Video Processing Sheet (FIG. 12)
      2.3.5 LIPSYNC Processing Sheet (FIG. 13)
      2.3.6 Quality Control Check Off Sheet (FIG. 14)
   2.4 Logging and storing tapes and disks
3.0 Steps For Converting An ASCII File
4.0 Capturing RAW Segments
   4.1 Loading The VHS Tape and Starting VIDCAP
   4.2 Setting Audio and Video Levels For A Tape
      4.2.1 Setting The Audio Levels
      4.2.2 Setting Video Level Steps
   4.3 Capturing Raw Segments
      4.3.1 Set up the capture file
      4.3.2 Setting the proper capture parameters
      4.3.3 Starting the capture. VIDCAP/Capture/Video
      4.3.4 Capturing the next segment
   4.4 Determining The Proper Length Of A Segment
      4.4.1 Segment Lengths For Enhanced Conversion
      4.4.2 Segment Lengths For Direct Conversion
5.0 Compressing each raw segment
6.0 Writing The CD-ROM
   6.1 Creating A Jewel Case Cover
7.0 Doing the Lip Synchronization
   7.1 Overview
   7.2 LIPSYNC Operating Procedures
8.0 Quality Control (Check Off Sheet-FIG. 14)
9.0 The Finished Product
10.0 The VHS Tapes and Diskettes
1.0 Overview The material in this manual is inter-related.

1.1 System Configuration

The video processing system of the present invention includes three or more PCs connected by a local area network (LAN). Each of the PCs runs Microsoft's Windows For Workgroups (WFW) and can access the files on the other PCs.

One of the PCs is a Capture PC. The other PCs are Compression PCs. The Capture PC is configured with a video capture card, a CD-ROM writer and several gigabytes of disk storage. The Compression PCs contain a single hard drive.

The Capture PC contains several 2 gigabyte hard drives. The drives are designated d:, e:, f:, etc. The hard drives are accessed by the Compression PCs via WFW. The drive letters on the Compression PCs may not be the same as the Capture PC. For example, drive e: on the Capture PC may be drive f: on the Compression PC.

In addition to the Capture PC and Compression PCs, there are one or more General Purpose PCs. One of the general purpose PCs has a printer attached. The general purpose PCs are used for: 1) processing deposition text, 2) performing lip synchronization, and 3) printing jewel case (CD box) covers. The Capture and Compression PCs contain very high speed Intel Pentium microprocessors or equivalents. The General Purpose PCs are Intel 386/486 machines or equivalents.

1.2 Operational Overview

The following processing steps are performed to convert VHS tapes to CD-ROMs and to link the video to text of the deposition.

(a) Tapes and disks received are logged in and project files are set up.

(b) The ASCII files are converted to a format that can be read (imported) into LiveNote and can be used by the LIPSYNC program. The conversion is normally accomplished on one of the General Purpose PCs.

(c) Each set of video tapes for a deposition is digitized and read into the Capture PC using the video capture card. Normally, each tape is separated into several 20 minute or less segments, see 4.4 for information on segment size. When first captured, the segments are stored as Raw files in the Capture PC. The raw files are stored on the Capture PC's drives d:, e:, f:, etc.

(d) Each Raw file is compressed down to a smaller compressed file, if desired. This compression is performed by the Compression PCs and the Capture PC. The Compression PCs access the raw files on the Capture PC via the network. Both the raw and compressed files remain on the Capture PC which has a CD writer attached to it.

(e) All of the compressed files for a deposition (this could be from several tapes) are written to one or more CD-ROMs on the Capture PC.

(f) Using the CD-ROMs and the converted ASCII text, LIPSYNC is run on the General Purpose PC to synchronize the text and video.

Due to the limitations of the amount of disk space needed to store all of the files for a deposition, the process of capturing, compressing and writing to CD-ROM is separated into several batches.

2.0 Tracking projects, tapes, video files and ASCII files.

Each job for a client is called a Project. A new Project name is established whenever a new set of tapes and/or disks is received. The name can be up to eight alpha characters long (no numbers are allowed). The first name of a law firm's name is normally used. For instance a project for CLIENT might be "CLIENT." Since there may be several jobs for a client, the project name further includes a number, for example, CLIENT.001, CLIENT.002, etc.

The project name and number is used to create a subdirectory on all disks of the Capture PC and the D: drive of the General Purpose PC. The name of each subdirectory is the project name and number. For example, if drives D:, E: and F: are used for the CLIENT.002 project, then a subdirectory with the name CLIENT.002 would be created on each of the drives. The subdirectory is off the root and the subdirectories are used to store the video files (Raw and Compressed).

An identical project subdirectory is set up on the General Purpose PC D: drive, for example, D:\CLIENT.001. The directory is used to store all ASCII files (*.ASC), Deposition files (*.DEP), text files (*.TXT) and sync files (*.SYN and *.SCD). A subdirectory called LETTERS is used for all correspondence files such as letters and receipt notifications. Depositions within a project are assigned a two digit number starting at 01 and going to 99. If there are more than 99 depositions, the project must be separated into two projects. Each deposition is further separated into several video segments as previously described.

2.1 Directories and File Naming Conventions

Project subdirectories off the root are defined using eight alphas and three digits, for example, CLIENT.001. An example of a project's subdirectory and file organization is as follows:

On The Capture PC

| | |
|---|---|
| D:\CLIENT.001 | Video directory for the project on the capture PC drives. |
| E:\CLIENT.001 | |
| F:\CLIENT.001 | |
| G:\CLIENT.001 | |
|     DnnSmm[RW or CM] .AVI | Video file names. Where nn is the deposition number, mm is the video segment number for the deposition, RW means Raw, CM means compressed and AVI is the file extension for all MS VFW files. |

On The General Purpose PC

| | |
|---|---|
| D:\CLIENT.001 | Holds all ASC, TXT, DEP and SYN files |
|     DnnORIG.ASC | Copy of original ASCII file for the deposition number nn. |
|     DnnORIG.TXT | Copy of original ASCII file after being pre-processed using the text editor and saved as a TXT file. |
|     DnnCNVT.TXT | Output of the Transcript Conversion program (CONVERT) which used DnnORIG.TXT as input. |
|     Dnn.DEP | Copy of the deposition processing file created and used by the LIPSYNC program. |
|     Dnn.SYN | Copy of the sync file created by the LIPSYNC program. |
|     Dnn.SCD | Copy of the Smart CD sync file created by the LIPSYNC program. This file is used by systems that have a CD-ROM changer and Smart CD software. The sync information is identical to the *.SYN file except the path to each video segment contains the volume name of each CD-ROM. This allows all CD-ROMs to be configured as a single disk drive with different paths to each physical CD. |
|     \LETTERS | Holds all correspondence to clients |
|         RNO.DOC | Receipt notification |
|         INV.DOC | Return notification - inventory sheet |
|         LETTERn.DOC | Copies of all letters, n = 1–9 |
|         INVOICEn.DOC | Copes of all invoices, n = 1–9 |

2.2 Physical Storage Of Project Material

A file cabinet drawer or drawers are assigned to each project to hold all the tapes and disks. The name of the project is put on each drawer.

2.3 Project Log and Processing Sheets

A project log is maintained. The log is a three ring binder that contains special processing sheets for each project. The sheets are described below. Blank copies of the sheets are provided on the following pages.

2.3.1 Project Sheet (FIG. 9)

Used to establish a project name (e.g. CLIENT.001) and to establish a number for each deposition in the project. The Project Sheet includes the following information:

Name of Project

Shipment Received-Enter date all tapes and disks received

Receipt sent-Enter date Receipt Notification sent to client

All originals sent-Enter date when all original tapes and diskettes have been sent back to the client.

All CD-ROMs-Enter date all CD-ROM *.TXT, *.SYN and *.SCD files sent and invoice has been issued.

For each deposition in the project enter the following information:

Last name of deponent

Number assigned to this deposition

Number of tapes for the deposition

Name of the ASCII file or files received.

Date the original material was received

Date the original material sent back

Date the CD-ROM TXT, SYN and SCD files sent

Use additional project sheets as required if there are several depositions. Fill in the Page_of_area.

2.3.2 ASCII Conversion Sheet (FIG. 10)

The ASCII conversion sheet is used to record the following information about the conversion of each ASCII file received for a deposition: (In some cases, more than one file must be merged together using the text editor. In this case, use a separate line for each file name.)

Deposition Name-Enter last name of deponent

Nmbr-Enter deposition number

Org ASC-Enter original ASCII file name. (DnnORIG.ASC)

Orig TXT-Enter original TXT file name (output of the text editor process) (DnnORIG.TXT)

Cnvrtd TXT-Enter the converted TXT file name (DnnCNVT.TXT)

Enter the Lines per page, starting page number, column number used when converting, date converted and any comments regarding the conversion.

2.3.3 Audio and Video Settings Sheet (FIG. 11)

The Audio and Video Settings Sheet is used to save the following video/audio settings for each tape.

Audio Settings-For each tape, fill in the Master (M), Treble(T), Bass (B) and Line ln(L) settings. Note: MIDI, WAV and Speaker should normally be set to five.

Video Settings-For each tape, fill in the Contrast(C), Tint(T), Saturation(S), Brightness(B) and Crop (CP) settings.

Note: See section 4.0 for instructions on filling values for audio and video settings.

2.3.4 Video Processing Sheet (FIG. 12)

There are one or more video processing sheets maintained for each deposition. The Video Processing Sheets are used to keep track of the batches of video segments, the individual raw and compressed files and the number and size of files needed to fill out a CD-ROM. Each sheet includes the following information:

Project/Deposition Names-fill in the project and deposition name and number. If more than one sheet is needed, fill in the Sheet of area for each new sheet.

Tape Number (TN)-As each tape is processed, fill in the tape number. Note: For each new tape, an entry must be made in the Audio and Video Settings Sheet.

Segment Number-This is the DnnSmm number for this segment.

Tape Deck-Fill in the tape deck counters for the start and stop of each segment as it is captured. These are used to redo a capture session.

Capture-Fill in the number of minutes captured, the size of the capture file, the number of frames in the capture file and the capture PC drive letter used, e.g. E, F, G or H.

Compression-Fill in the Processing unit that is used to do the compression (ZEOS 1, DELL, etc.) and the final compressed size (in megabytes) of the compressed file. Also fill in the amount of time it took to compress the file.

Writing CD-ROM. Fill in the CD-ROM number (e.g. CLIENT023), the date/time the CD-ROM was written and enter a check mark when each video file has been checked using the media player and purged from the compression PC drive (along with the raw file).

Comments 2.3.5 LIPSYNC Processing Sheet (FIG. 13)

The LIPSYNC Processing Sheet is used to track the progress of the LIPSYNC operation for a deposition. One sheet is used for each deposition. At the top of the sheet is general information about the deposition. This includes:

Project Name-Enter project name and sheet number, if required.

Deposition Name and Number-Entered as each new deposition is started.

.TXT File-Name of the .TXT file used

.DEP File-Name of the DEP file created

SYN File-Name of the SYN file created. Note: the SCD file will be given the same name by the system.

For each video file (segment) on the CD-ROMs for the deposition, the following information is recorded:

CD-ROM Nmbr-The number of each CD-ROM as it is processed

File Nmbr-The file number of each file as it is processed. This file number is assigned by the LIPSYNC program.

Starting page and line number for the file

Ending page and line number for the file

Date and time the synchronization was completed for the file.

2.3.6 Quality Control Check Off Sheet

The Quality Control Check Off Sheet has two functions, First, it is used to track the actual importing of the TXT and .SYN files into VIDLINK and to make several checks of the CD-ROM, the TXT file and the .SYN file. The following information is recorded in the top block:

Project Name-Name of project and sheet number if required.

Date (MM/DD/YY)

Deposition Name and Number

Test Check offs. Check each block when the test is complete:

(a) .TXT-Imported the TXT file into VIDLINK (b) .SYN-Imported the SYN file into VIDLINK (c) Last Lines Compared-Use WRITE to bring up the original ASCII file and then compare the last page/line number in the original with the page and line number of the VIDLINK file.

(d) Random Compares are OK-Compare various page/line numbers of the original with the VIDLINK transcript.

(e) Random Play is OK-Pick random points in the transcript and play the video. Make sure each CD-ROM is loaded.

Then, the next section is used to check the transition points between each video file. The location of each transition point is first determined and then VidNote is used to "play across" each transition point to make sure it is smooth and without errors.

The length, in minutes, of each file (segment) is first entered for each file. The times were display when LIPSYNC was used to create the SYN file. When SYN file was created, the individual times were written on this sheet.

Using the individual file lengths, the cumulative or running time of each transition can be calculated. Each transition can then be examined in VIDLINK by advancing the deposition to a point in time a few seconds before the transition and then playing the video across the transition.

Note that the VIDLINK slide bar is set to seconds instead of percent of tape.

CD-ROM Nmbr-The number of each CD-ROM as it is processed

File Name-The file number of each file as the transition at the end is examined.

File Length-Length of each video file in hours, minutes, and seconds to the hundredths place.

Cumulative Length-Sum the file length columns as VidNote will show the cumulative time into the deposition video. Transition playback check off. Check if the transition appears OK.

2.4 Logging and storing tapes and disks.

If not already done, set up physical files and computer files for the job.

Log in receipt of tapes and ASCII disks on the Project Sheet (FIG. 9). Send back a Receipt Notification, put a copy in the Project Log, and store the file in the \LETTERS area of the general purpose PC.

Assign a deposition number to each deposition in the project. Use the convention D01, D02, etc. There will be a deponent name and date (of the beginning of the deposition) for each deposition number. These are listed on the Project Sheet.

3.0 Steps For Converting An ASCII File

Load the original ASCII file into the project file area of the General Purpose PC, e.g. D:\CLIENT.001 \D01 ORIG.ASC. Use the file extension ASC, the deposition number and ORIG to denote original. For example D01 ORIG.ASC.

Use the text editor to look at the file to determine the number of lines per page, the starting column for the text and the starting and ending page numbers. Some of the beginning pages and ending pages may be deleted if they contain junk. Do not delete any text in the middle of the files, since such deletions causes page/line numbers to be incorrect. Save the new file with the TXT extension, for example, D01 ORIG.TXT. Write the page, line and column numbers in the Processing Log.

Note: Deposition ASCII files normally have page numbers at the top right with line numbers typed along the side. Indented from the line numbers will be the actual text. The Transcript Conversion Program (CONVERT) program strips out all page and line numbers and arranges the text as single, distinct lines, the format required by VIDLINK. CONVERT needs to know the column number of the start of the actual text. Try to determine the column number of the column just to the right of the text. Scan down in the transcript to make sure the column is blank all the way to the bottom of the transcript.

Use the Transcript Conversion Program (CONVERT) to convert the TXT file to CAFF format. Use TXT as the file extension for the output file along with CNVT, for example, D01 CNVT.TXT Once the file has been converted, import the file into VIDLINK and view the original file (.ASC) using WRITE and the converted file using VIDLINK to make sure the page and line numbers are correct. Go to the end of each file to make sure everything is correct. If there are problems, adjust the starting column number and/or delete junk text at the beginning or end. Do not delete text in the middle of the file.

4.0 Capturing RAW Segments

Normally, each raw segment should be about 20 minutes long, see Section 4.4. However, the raw segment needed to "fill out" the end of the 640 MB CD-ROM will be less than 20 minutes. See 4.4 below for details. The raw segments are stored in the project subdirectory on Capture PC disks, e.g. E:CLIENT.001\D01S01RW.AVI.

4.1 Loading The VHS Tape and Starting VIDCAP

Load the VHS tape into the tape deck and start VIDCAP. Play a few minutes to make sure the video looks fairly good. Rewind the tape to the beginning and advance past any junk. When capturing, the video quality (using VIDCAP controls) and audio quality must be adjusted by following the steps described below.

Once the audio and video levels are set, save the settings for the video tape. The settings should be good for the entire tape. There will be a new set of settings for each tape.

4.2 Setting Audio and Video Levels For A Tape

The audio and video levels must be set once for each tape. The levels are recorded in the Audio and Video Settings Sheet (FIG. 11).

4.2.1 Setting The Audio Levels

First, press play on the VCR. Then go into the VidCap program. You should see and hear the video. Follow these four steps to set the audio level:

1. VIDCAP/OPTIONS/AUDIO FORMAT/LEVEL. Move the recording level window over to the side.
2. Bring up the Creative Mixer window using Alt Tab to go into the Program Manager.
3. Adjust Master, Bass, Treble and Line In. Record the settings in the Audio and Video Settings Sheet. Save the settings on exit. The settings will probably be OK for the entire tape. New settings will be required for the next tape. To determine the numeric value of a setting, assume each horizontal line on the slide bar is one unit. When the slider is at the bottom, the setting is zero. When the slider covers the bottom line, the setting is 0.5. When the slider is on top of (sitting on) the bottom line, the setting is 1.0 and so forth up to a maximum value of 7.0.

Adjust Master and Line In so that the audio quality is pleasant and the Record Level (from VIDCAP/OPTIONS/AUDIO FORMAT/LEVEL) indicator never goes further than two thirds of maximum.

Note: Midi and WAV should be set to five. They are not used on input. Also, Speaker output is normally set to 5. The value may be changed during video playback.
4. Press OK on Preferences, Recording Level, Audio Format.

4.2.2 Setting Video Level Steps

1. Reduce the overall size of the VIDCAP window to be tight around the video window. Move VIDCAP (and the video window) to the lower right hand corner.
2. Go to Option/Video Source and move the window to the upper left so that you can see the controls and video at the same time.
3. Play the video, adjust the settings and SAVE the settings in the Audio and Video Settings sheet (FIG. 11). The settings will probably be used for the entire tape.
4. Crop the video, if necessary. If the videographer maintains a close up view of the person providing testimony, crop is not needed. Otherwise, increase the crop level to 5 or 6. Do not delete date/time display. Do not cut off the person's head or other important areas. Also, remember that a good videographer will periodically pan in an out on the person giving the deposition. If you crop the picture tightly when the videographer has panned out, then the head will be cut off when the videographer pans in.
5. Set Brightness, Contrast, Tint and Saturation. Keep Saturation as low as possible.
6. Save the settings. Write the levels on the Audio and Video Settings Sheet (FIG. 11).

4.3 Capturing Raw Segments

Normally several raw segments are captured in a batch of 3 to 4 segments. Capture one segment right after another, pausing only to set up a new capture file. When the batch of captured segments is complete, compress all the raw files in the batch and move them on to CD-ROM to free up disk space so that another batch of raw segments can be captured.

4.3.1 Set up the capture file.

Set up the output file by using VIDCAP/FILE/SET CAPTURE FILE. Use the following file name convention for the raw files. D01S01RW.AVI, D01S02RW.AVI, etc. Make sure the capture file size is greater than 1 0 Mbyte and that there is enough disk space on this drive for the new Raw file. Most of the time it will be. Make sure you have enough disk space for the capture file. See 4.4 below.

4.3.2 Setting the proper capture parameters.

Use the following steps for the captured parameters:

VIDCAP/Options/Audio Format use 8 bit, 22 khz and mono.

VIDCAP/Option/Video Format use Indeo RAW with a size of 24OX180 (note, this should be the default)

Video compression should say No Recompression.

4.3.3 Starting the capture. VIDCAP/Capture/Video

1. Set the proper capture parameters

Frame rate-15 FPS

Disable the capture time limit (use one of the egg timers)

Capture Audio and Capture to disk

Recheck audio, video and compression settings from the menu.
2. Move the video window to the center of the screen
3. Start the capture by clicking on OK. You will receive one additional OK that displays the capture file name. Press Play on the VCR to start the video. The moment you see a clear picture, press Enter on the final OK. The capture should start and frame and second counts will appear.

When the capture has just begun, watch the capture window for a few moments to make sure no frames are being dropped. If any frames are being dropped, the hardware needs to be reset. Stop the tape and rewind it to the same starting point (use the VCR counters). Exit out of VidCap and Windows. Reboot the computer and start all over. If frames are not being dropped, let the capture continue on. Check your watch or set an egg timer. You will normally capture approximately 20 minutes. See 4.4 below. You must try to stop the raw capture at a lull (one or more seconds) in the conversation. To stop the capture, wait for a lull, press ESC (this will stop the capture) and then press stop on the VCR. Press the VCR PAUSE button (not the STOP button) slightly after stopping the capture. Since you are in a lull in the conversation, you are eliminating a small amount of silence.

If you are toward the end of the tape and you hit the end before 20 minutes, press ESC to stop the capture.

Keep and eye (and ear) on the tape when capturing to make sure you stop capturing (by pressing ESC) if you hit the end of tape or the video stops.

No frames should be dropped (zero frames dropped).

When you PAUSE the tape, leave it at the same position for the next raw capture (unless you are at the end of the tape). The VCR will hold the PAUSE position for about 120 seconds, plenty of time to set up the next raw capture. In the final raw capture for the batch, let the VCR go to the STOP position, which it will do automatically after about 120 seconds.

4.3.4 Capturing the next segment

To capture the next segment on the tape, simply select a new capture file by using FILE/SET CAPTURE FILE with a new RAW file name. All the settings remain the same. Normally you can do this quickly, while the tape is PAUSED.

You will capture several segments in a batch and then compress the segments to free up disk space. In the last segment of the batch, STOP the VCR at its current location, which will be the starting point for the next batch.

4.4 Determining The Proper Length Of A Segment

The length of a raw segment is a function of the following factors:

The amount of disk space available. Normally disk space has been freed up by the compression process.

The estimated number and size of the segments needed to fill up the next CD-ROM.

The estimated time left on the current tape. The PC to be used to compress the segment. Some PCs are faster than other.

4.4.1 Segment Lengths For Enhanced Conversion

For enhanced conversion, the CD-ROM can hold about 81 minutes of video. With three fast compression PCs and one slower capture PC (slower for compressing) the ideal mix of segments is three 22 minute segments and one 15 minute segment, which add up to 81 minutes.

For enhanced conversion, 81 minutes will take up about 3.7 GB of disk space for the raw files and about 633 MB of space compressed. The CD-ROM can hold up to 640 MB.

4.4.2 Segment Lengths For Direct Conversion

A CD-ROM can hold about 120 minutes of video. Thus, use four thirty minute segment of video. Segment links for direct conversion should be thirty minutes.

5.0 Compressing each raw segment.

The raw files for a batch will be on the Capture PC's disks. The raw files must be compressed before they are stored on CD-ROM. The Compression PCs and the Capture PC can be used to compress the raw files.

VidEdit is used to compress a raw file. Start VidEdit on each of the Compression PCs and Capture PC. Follow these three steps for each PC.

1. Open the raw file using FILE/OPEN. Make sure to select the proper file. The Compression PCs will compress files physically located on the Capture PC, e.g. drives d:,e:, etc.
2. Do File/Save AS from the VidEdit menu.

Use the DnnSmmCM.AVI name convention, e.g. D01 S01 CM.AVI

Using Compression Options, select Intel Indeo, Video 3.2. Normally this can be done by selecting the "Default".

Under Details use the following

| Category | For Direct | For Enhanced |
|---|---|---|
| Data Rate | 65K | 130K |
| Interleave | Audio1 frame | 1 frame |
| Key frame every | 4 frames | 4 frames |
| Pad frames for CD playback | yes | yes |
| Video Quality | 100 | 100 |

Note: By selecting the Default, most of these setting will be correct. Make sure to set all settings.

3. Start the compression by clicking OK. Check the number of frames being compressed per minute to estimate the length time to compress the raw file.

6.0 Writing The CD-ROM

Once all of the raw files have been compressed for a batch, they are written directly to CD-ROM (if there is enough space to fill out the 640 Mbytes of the CD-ROM).

Start Corel CD Creator on the Capture PC.

Under DISC, create a subdirectory on the CD called VIDEO which holds the compressed video files. Highlight the VIDEO directory to add the files to the directory and not to the root of the CD-ROM.

Use Add Items up to 640 for selecting the video files to be copied.

Mbytes per CD. Try to have around 630 Mbytes. Use Browse to change the drive letter.

Go to FILE/CREATE CD-FROM LAYOUT and select the following settings

Write speed is 2×150K

Write protect on

Single track on

Set a volume name of {project name}nnX where nn is the deposition number and X is the CD-ROM number for the deposition (X=1–9). For example CLIENT018. If there are more than 9 CD-ROMs for this deposition, use letters of the alphabet starting at A after number "9". For example CLIENT01C would be the 12th CD-ROM for deposition number 01.

Set the Disc Title to the deposition name by selecting Disc Properties and then the Disc Title field.

Always use a two digit deposition number even if you have to fill in a leading zero.

Project name is never larger than 8 characters so there are at most 11 characters. Also, project names always contain alpha characters so you will always know where the deposition number begins.

You will normally make one copy.

Click on "create CD-ROM" and watch for any error messages.

When the "writing CD" message comes up, you can leave it alone for about 20 minutes. You can create and print a jewel case cover while you are waiting.

When done, check that there are no error messages.

Insert the jewel case cover into the jewel case.

At this point, it is very important to check the quality of the CD-ROM. Occasionally, the CD-ROM will not operate properly and it should be rewritten before deleting the compressed files. Place the CD-ROM in a CD-ROM drive on the capture PC (not the CD-ROM writer). Use the Media Player to play each video file on the CD-ROM. Play each file at the beginning, middle and end.

Once you are sure that the files on the CD-ROM are OK, delete the compressed files and any remaining raw files.

6.1 Creating A Jewel Case Cover

Use WordPerfect to create a Jewel Case cover. There is a standard form, JEWELBOX.FRM, stored in the D: of the general purpose PC. Bring up the form, modify it for the current CD-ROM and deposition and print it out. Save each WP file for each jewel box cover in the \LETTERS directory for the project. Instructions for cutting the form down to jewel case size are printed on the bottom of the form.

7.0 Doing the Lip Synchronization

The LIPSYNC program is used to link together the video and text. It is the last step in the process of creating synchronized video and text. Prior to running the LIPSYNC program, the following steps must be complete:

Captured and compressed enough of the video to have at least one CD-ROM. You will have created AVI files called DnnSmmCM.AVI, etc.

Written the DnnSmmCM.AVI files to one or more CD-ROMs using the Corel CD Writer.

Converted the ASCII text files to a single DnnCNVT.TXT file for the entire deposition. Make sure you know the starting page number of the DnnCNVT.TXT file and the number of lines per page.

Use the LIPSYNC program to link the compressed video files on the CD-ROMs (one or more CD-ROMs) to the DnnCNVT.TXT file.

7.1 Overview

The LIPSYNC process can be started before all the CD-ROMs have been created. The LIPSYNC program links frame information on the CD-ROMs with page and line number information in the converted ASCII file.

When first starting the LIPSYNC program, you have to tell the program the name of the converted ASCII file and the names of the CD-ROMs that are available. All the information is stored by LIPSYNC in a deposition file or DEP file. The DEP file contains all the LIPSYNC information.

Normally you will perform lip synchronizing in several sessions as CD-ROMs become available. In the first session create the DEP file and start adding LIPSYNC information. At the end of the session, make sure you save the DEP file, since it contains all of your work to date.

To start a new session at a latter time, just load the .DEP file back into LIPSYNC and continue on, doing more of the synchronization. Be sure to save your work in the .DEP file at the end of each session so that you can start your next session at the same point you left off. The LIPSYNC program will warn you to save your work.

After all the lip synchronization is completed, create a special file called a .SYN file. The .SYN file will be IMPORTED into VIDLINK and it contains the actual sync data you created.

7.2 LIPSYNC Operating Procedures

1. Start the LIPSYNC program by double clicking on the LIPSYNC icon. If you are beginning a new deposition, create the new *.DEP file by doing a SAVE AS under the FILE menu. DEPosition file names have the format Dnn.DEP where nn is the deposition number.

If you are continuing your work from an earlier session, load the previously saved .DEP file using FILE/OPEN. Note: When you exit the LIPSYNC program, always store your work by doing a FILE/SAVE. You can also save your work from the Sync Video menu.

2. If a new deposition is being started, you must first load the converted ASCII file.

Click on the Transcript Information icon to enter the name of the DnnCNVT.TXT file you are going to sync to:

Use the BROWSE button to locate the file name

Set the starting page number and lines per page

Click on the "Scan File" button to scan in the file.

If the Scan File says that the number of lines per page and pages doesn't match, go back to check the original DnnORIG.ASC file.

LIPSYNC now knows what DnnCNVT.TXT file to use and the number of lines per page and the starting page number.

Click on DONE

3. The next step is to tell LIPSYNC what video files are going to be used. The files, DnnSmmCM.AVI, etc. are on one or more CD-ROMS. If you are starting a new deposition, provide the names of the files that have already been written to CD-ROM. If you are continuing from an earlier session, add file names to your existing list as new CD-ROMs become available.

Click on the Video Files List icon from the main LIPSYNC menu.

Enter the name of the deposition, normally the deponent's last name.

Use the Add file button to add/create the list of video files. Note: Files are always added directly below the current highlighted file. If you are adding files to the bottom of the list, make sure you first highlight the bottom file name.

Load the CD-ROM into your CD-ROM drive. In the first session, the correct CD-ROM will be CD-ROM number one. In later or continuation sessions, the CD-ROM will be the next CD-ROM compressed.

Highlight the bottom file name (if there is one) and Click on "Add File"

Use the directory and drive letter buttons to locate the file on the CD-ROM drive (normally the D: drive).

Highlight the desired file name and click on OK

Enter CD-ROM number of this CD-ROM in the field provided

Repeat the above procedure until you've added all the files for the CD-ROM.

If you have additional CD-ROMs, insert the next CD-ROM into the CD-ROM drive and add the files for that CD-ROM. Be sure to enter the correct CD-ROM number.

When you have completed adding all video files for all CD-ROMs, click on "OK" to put you back into the main menu.

4. You are now back at the main menu. Save your work by clicking on FILE and select SAVE (this assumes you've already done a SAVE AS to establish your DEP file name). Save your work as a Dnn.DEP file where nn is the deposition number.

5. You are now ready to begin synchronizing the voice to the video.

Click on Sync Video. You will see a LIPSYNC Player window and a LIPSYNC Transcript window.

The LIPSYNC Transcript window will display the first line of the transcript with the correct starting page number. For instance, 1:1 is for page one, line one. If page four is the starting page number, you should see 4:1. The first line of text is highlighted.

In the beginning of the first session, there will be no file and frame numbers on the far left side. In a continuation from a prior session, you will see the file and frame numbers entered earlier.

The LIPSYNC Player should be blank (all black) and the top of the window should say "All Files Closed".

Open one file at a time, sync the voice to the text, and then go to the next file. The list of files was created in step 3. above.

6. Procedure for each file.

If you are continuing from a previous session, locate the point in the transcript where you left off. Clip on Transcript and the Find Next Frame Gap to move you to your last sync point.

Open the list of video files by clicking on the yellow down arrow next to the "All File Closed" line. The list of files and their respective CD-ROM numbers will be shown. Select the next video file to process and make sure the correct CD-ROM is loaded. If this is the beginning, select file 1.

Once you have selected the next video file to process, the first frame of that file will appear in the video window. Sometimes the frame is blank.

Start the video by pressing <Ctrl>P or by clicking on the "Player" button in the LIPSYNC Transcript window and then click on play. The video and sound will start.

Note: CNTRL S will stop the video at any time

You can now start synchronizing by pressing ENTER to move the transcript to the next line.

NOTE: Most transcripts have a lot of text at the beginning that is not contained on the video. Press enter several times to move past such text and to find the first text that can be heard on the video.

Normally someone will swear in the witness and the text/video starts right after that point.

Also, as the deposition proceeds, there may be points where there is a lot of text that is not on the video (e.g., an off the record discussion). Again, press ENTER several time to advance the text.

When you reach the end of the video segment it will stop (freeze) and the scroll bar will be all the way to the right. At this point you should go back to the main menu and Save your work in you Dnn.DEP file. Do a SAVE command and overwrite the previous Dnn.DEP file for this deposition. Update the LIPSYNC Processing Sheet.

Go to the next video file, sync it, save and so forth until you have completed all video files.

At the end of the transcript, there will be several pages that are not on the video. You must press enter several times (using the last file and frame number of the last file) to fill in with sync information. Go all the way to the bottom of the transcript.

7. When you have processed all the files, the final step is to create the Sync file, normally a *.SYN file. The *.SYN file is the file that will be sent back to the client along with the *.TXT-file and the video CD-ROMS.

From the main menu, click on Make SYN File.

The program will verify that you've done everything correctly and will tell you what to do if you have not.

As each file is processed, its length will appear in a table on screen. Fill each length in on the Quality Control Check Off Sheet (FIG. 14).

Save the *.SYN file in a project directory. From there you can copy it to a floppy disk along with the *.TXT file, e.g. the file area created for the project on the general purpose PC. When you save the SYN file, the SCD file is also saved.

8.0 Quality Control

Detailed instructions for filling out the Quality Control Check Off Sheet (FIG. 14) appear in section 2.3.5. Note that each sheet describes only one processed deposition.

9.0 The Finished Product

The diskette that accompanies the CD-ROMs contains three files. They are the converted text file and the SYN and SCD files that correspond to the video files. Note that for identification purposes, the file names on the diskette should be as close as possible to the name of the deponent (DEPONENT). For example, DEPONENT.TXT would be written for D02CNVT.TXT from the CLIENT.001 project. If the name is longer than eight characters, try to abbreviate it. Often the original ASCII file already has a name abbreviation which the client firm uses for file identification.

A diskette file called \LETTERS includes an inventory of materials.

10.0 The VHS Tapes and Diskettes

Each box of materials being returned to a client is accompanied by a return notification sheet which contains an inventory of the contents of the box. This file is also stored in \LETTERS.

SECTION VI
PART 1.
XCON
Form text and graphical representation files FRM
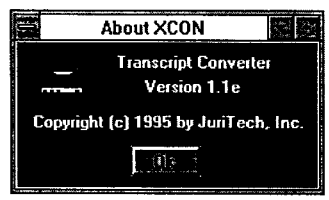
about.bmp

ABOUT.FRM - 1

```
VERSION 2.00
Begin Form About
    BackColor       =   &H00FF0000&
    BorderStyle     =   3  'Fixed Double
    Caption         =   "About XCON"
    ClientHeight    =   1635
    ClientLeft      =   3045
    ClientTop       =   3045
    ClientWidth     =   3420
    ControlBox      =   0  'False
    Height          =   2040
    Left            =   2985
    LinkTopic       =   "Form1"
    MaxButton       =   0  'False
    MinButton       =   0  'False
    ScaleHeight     =   1635
    ScaleWidth      =   3420
    Top             =   2700
    Width           =   3540
    Begin CommandButton btnOk
        Caption     =   "Ok"
        Height      =   345
        Left        =   1305
        TabIndex    =   2
        Top         =   1155
        Width       =   795
    End
    Begin Line Line1
        BorderColor =   &H00FFFFFF&
        Index       =   3
        X1          =   0
        X2          =   3400
        Y1          =   1620
        Y2          =   1620
    End
    Begin Line Line1
        BorderColor =   &H00FFFFFF&
        Index       =   2
        X1          =   0
        X2          =   3400
        Y1          =   0
        Y2          =   0
    End
    Begin Line Line1
        BorderColor =   &H00FFFFFF&
        Index       =   1
        X1          =   3400
        X2          =   3400
        Y1          =   0
        Y2          =   1620
```

```
ABOUT.FRM - 2
      End
      Begin Line Line1
         BorderColor     =   &H00FFFFFF&
         Index           =   0
         X1              =   0
         X2              =   0
         Y1              =   0
         Y2              =   1620
      End
      Begin Label lblVersion
         Alignment       =   2  'Center
         BackColor       =   &H00FF0000&
         Caption         =   "Version 1.1e"
         ForeColor       =   &H0000FFFF&
         Height          =   270
         Left            =   1200
         TabIndex        =   3
         Top             =   405
         Width           =   1620
      End
      Begin Label lblCopyright
         Alignment       =   2  'Center
         BackColor       =   &H00FF0000&
         Caption         =   "Copyright (c) 1995 by JuriTech, Inc."
         ForeColor       =   &H0000FFFF&
         Height          =   285
         Left            =   150
         TabIndex        =   1
         Top             =   795
         Width           =   3165
      End
      Begin Image iconVN
         Height          =   480
         Left            =   285
         Picture         =   (Icon)
         Top             =   105
         Width           =   480
      End
      Begin Label lblName
         Alignment       =   2  'Center
         BackColor       =   &H00FF0000&
         Caption         =   "Transcript Converter"
         ForeColor       =   &H0000FFFF&
         Height          =   300
         Left            =   900
         TabIndex        =   0
         Top             =   135
         Width           =   2250
      End
End
```

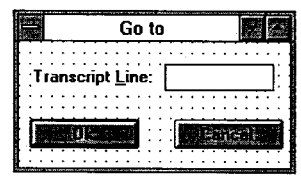
goto.bmp

```
GOTO.FRM - 1

VERSION 2.00
Begin Form GotoLine
   BorderStyle       =   3  'Fixed Double
   Caption           =   "Go to"
   ClientHeight      =   1395
   ClientLeft        =   3615
   ClientTop         =   3210
   ClientWidth       =   3015
   ControlBox        =   0  'False
   Height            =   1800
   Left              =   3555
   LinkTopic         =   "Form2"
   MaxButton         =   0  'False
   MinButton         =   0  'False
   ScaleHeight       =   1395
   ScaleWidth        =   3015
   Top               =   2865
   Width             =   3135
   Begin CommandButton btnCancel
      Cancel            =   -1  'True
      Caption           =   "Cancel"
      Height            =   330
      Left              =   1725
      TabIndex          =   3
      Top               =   855
      Width             =   1215
   End
   Begin CommandButton btnOk
      Caption           =   "Ok"
      Default           =   -1  'True
      Height            =   330
      Left              =   120
      TabIndex          =   2
      Top               =   855
      Width             =   1215
   End
   Begin TextBox txtLine
      Height            =   300
      Left              =   1620
      TabIndex          =   1
      Top               =   240
      Width             =   1215
   End
   Begin Label lblLine
      Caption           =   "Transcript &Line:"
      Height            =   255
      Left              =   150
      TabIndex          =   0
      Top               =   285
      Width             =   1425
```

```
GOTO.FRM - 2
    End
End
```

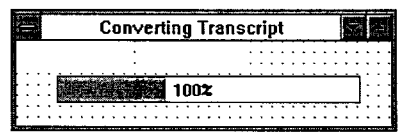
progress.bmp

```
PROGRESS.FRM - 1

VERSION 2.00
Begin Form Progress
   BackColor       =   &H00C0C000&
   BorderStyle     =   1  'Fixed Single
   Caption         =   "Converting Transcript"
   ClientHeight    =   945
   ClientLeft      =   2910
   ClientTop       =   2550
   ClientWidth     =   4230
   ControlBox      =   0  'False
   Height          =   1350
   Left            =   2850
   LinkTopic       =   "Form3"
   MaxButton       =   0  'False
   MinButton       =   0  'False
   ScaleHeight     =   945
   ScaleWidth      =   4230
   Top             =   2205
   Width           =   4350
   Begin PictureBox frmProgress
      Height          =   300
      Left            =   450
      ScaleHeight     =   270
      ScaleWidth      =   3405
      TabIndex        =   1
      Top             =   390
      Width           =   3435
      Begin Label lblPercent
         Alignment       =   2  'Center
         BackStyle       =   0  'Transparent
         Caption         =   "100%"
         Height          =   240
         Left            =   1110
         TabIndex        =   4
         Top             =   45
         Width           =   840
      End
      Begin Label lblTrack
         BackColor       =   &H000000C0&
         Height          =   495
         Left            =   0
         TabIndex        =   3
         Top             =   0
         Width           =   1215
      End
   End
   Begin Label Total
      Height          =   270
      Left            =   0
      TabIndex        =   0
```

```
PROGRESS.FRM - 2
      Top             =   0
      Visible         =   0   'False
      Width           =   1215
   End
   Begin Label Current
      Height          =   270
      Left            =   1380
      TabIndex        =   2
      Top             =   0
      Visible         =   0   'False
      Width           =   1215
   End
End
```

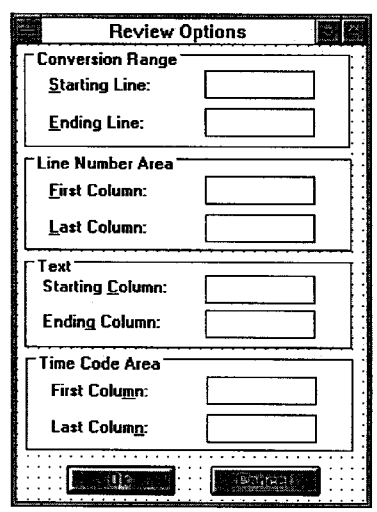
revopt.bmp

REVOPT.FRM - 1

```
VERSION 2.00
Begin Form ReviewOptions
   BorderStyle     =   3  'Fixed Double
   Caption         =   "Review Options"
   ClientHeight    =   5070
   ClientLeft      =   3030
   ClientTop       =   1500
   ClientWidth     =   3885
   ControlBox      =   0  'False
   Height          =   5475
   Left            =   2970
   LinkTopic       =   "Form1"
   MaxButton       =   0  'False
   MinButton       =   0  'False
   ScaleHeight     =   5070
   ScaleWidth      =   3885
   Top             =   1155
   Width           =   4005
   Begin Frame frmTimeCode
      Caption         =   "Time Code Area"
      Height          =   1110
      Left            =   105
      TabIndex        =   15
      Top             =   3390
      Width           =   3630
      Begin TextBox txtTimeCodeCola
         Height          =   315
         Left            =   2010
         TabIndex        =   17
         Top             =   285
         Width           =   1215
      End
      Begin TextBox txtTimeCodeColz
         Height          =   315
         Left            =   2010
         TabIndex        =   19
         Top             =   705
         Width           =   1215
      End
      Begin Label lblTimeCodeCola
         Caption         =   "First Colu&mn:"
         Height          =   240
         Left            =   270
         TabIndex        =   16
         Top             =   345
         Width           =   1650
      End
      Begin Label lblTimeCodeColz
         Caption         =   "Last Colum&n:"
         Height          =   240
```

```
REVOPT.FRM - 2
         Left            =   270
         TabIndex        =   18
         Top             =   750
         Width           =   1650
      End
   End
   Begin Frame frmText
      Caption         =   "Text"
      Height          =   1050
      Left            =   90
      TabIndex        =   10
      Top             =   2310
      Width           =   3630
      Begin TextBox txtTextColz
         Height          =   315
         Left            =   2010
         TabIndex        =   14
         Top             =   630
         Width           =   1215
      End
      Begin TextBox txtTextCola
         Height          =   315
         Left            =   2010
         TabIndex        =   12
         Top             =   240
         Width           =   1215
      End
      Begin Label lblTextColz
         Caption         =   "Endin&g Column:"
         Height          =   240
         Left            =   195
         TabIndex        =   13
         Top             =   660
         Width           =   1395
      End
      Begin Label lblTextCola
         Caption         =   "Starting &Column:"
         Height          =   240
         Left            =   195
         TabIndex        =   11
         Top             =   270
         Width           =   1515
      End
   End
   Begin Frame frmLineNumberArea
      Caption         =   "Line Number Area"
      Height          =   1110
      Left            =   90
      TabIndex        =   5
      Top             =   1170
```

```
REVOPT.FRM - 3
        Width           =   3630
        Begin TextBox txtLineNumColz
           Height          =   315
           Left            =   2010
           TabIndex        =   9
           Top             =   705
           Width           =   1215
        End
        Begin TextBox txtLineNumCola
           Height          =   315
           Left            =   2010
           TabIndex        =   7
           Top             =   285
           Width           =   1215
        End
        Begin Label lblLineNumColz
           Caption         =   "&Last Column:"
           Height          =   240
           Left            =   270
           TabIndex        =   8
           Top             =   750
           Width           =   1650
        End
        Begin Label lblLineNumCola
           Caption         =   "&First Column:"
           Height          =   240
           Left            =   270
           TabIndex        =   6
           Top             =   345
           Width           =   1650
        End
     End
     Begin Frame frmConvRange
        Caption         =   "Conversion Range"
        Height          =   1125
        Left            =   90
        TabIndex        =   0
        Top             =   15
        Width           =   3615
        Begin TextBox txtEndLine
           Height          =   315
           Left            =   2010
           TabIndex        =   4
           Top             =   690
           Width           =   1215
        End
        Begin TextBox txtStartLine
           Height          =   315
           Left            =   2010
           TabIndex        =   2
```

```
REVOPT.FRM - 4
            Top             =   270
            Width           =   1215
         End
         Begin Label lblEndLine
            Caption         =   "&Ending Line:"
            Height          =   240
            Left            =   270
            TabIndex        =   3
            Top             =   750
            Width           =   1650
         End
         Begin Label lblStartLine
            Caption         =   "&Starting Line:"
            Height          =   240
            Left            =   270
            TabIndex        =   1
            Top             =   330
            Width           =   1650
         End
      End
      Begin CommandButton btnCancel
         Cancel          =   -1  'True
         Caption         =   "Cancel"
         Height          =   330
         Left            =   2160
         TabIndex        =   21
         Top             =   4665
         Width           =   1215
      End
      Begin CommandButton btnOk
         Caption         =   "Ok"
         Default         =   -1  'True
         Height          =   330
         Left            =   555
         TabIndex        =   20
         Top             =   4665
         Width           =   1215
      End
   End
```

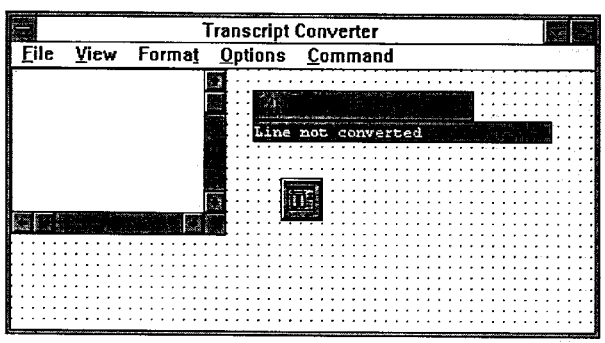
xcon.bmp

```
XCON.FRM - 1

VERSION 2.00
Begin Form Xcon
   Caption          =   "Transcript Converter"
   ClientHeight     =   2880
   ClientLeft       =   1260
   ClientTop        =   2565
   ClientWidth      =   6525
   Height           =   3570
   Icon             =   (Icon)
   Left             =   1200
   LinkTopic        =   "Form1"
   ScaleHeight      =   2880
   ScaleWidth       =   6525
   Top              =   1935
   Width            =   6645
   Begin PictureBox Toolbar
      BackColor        =   &H00C0C0C0&
      Height           =   330
      Left             =   2700
      ScaleHeight      =   300
      ScaleWidth       =   2460
      TabIndex         =   1
      Top              =   225
      Width            =   2490
      Begin Label lblSel
         BackColor        =   &H00C0C0C0&
         Caption          =   "1/1"
         FontBold         =   0   'False
         FontItalic       =   0   'False
         FontName         =   "MS Sans Serif"
         FontSize         =   8.25
         FontStrikethru   =   0   'False
         FontUnderline    =   0   'False
         Height           =   225
         Left             =   45
         TabIndex         =   2
         Top              =   30
         Width            =   2220
      End
   End
   Begin CommonDialog Cdlg
      Left             =   3015
      Top              =   1185
   End
   Begin Editor Transcript
      BottomMargin     =   0
      CaretHeight      =   -1
      CaretWidth       =   -1
      FileConvertOemAnsi=   0   'False
      FileOpen         =   ""
```

```
XCON.FRM - 2
        FileSaveAppend  =   0    'False
        FontBold        =   0    'False
        FontItalic      =   0    'False
        FontName        =   "Courier New"
        FontSize        =   8.25
        FontStrikethru  =   0    'False
        FontUnderline   =   0    'False
        Height          =   1830
        InsertMode      =   -1   'True
        Left            =   0
        LeftMargin      =   0
        Password        =   22886
        ReadOnly        =   -1   'True
        RightMargin     =   0
        ScrollBars      =   3    'Both
        SearchCaseSensitive=   0    'False
        SearchOrigin    =   0    'From Cursor
        SearchReplacement=   ""
        SearchTarget    =   ""
        SearchTo        =   1    'Bottom of text
        Prop82          =   0    'False
        SelBackColor    =   &H00000000&
        SelDefaultType  =   1    'Stream
        SelDragDropEnable=   -1   'True
        SelForeColor    =   &H00FFFFFF&
        TabDefaultWidth =   -1
        TabIndex        =   0
        Top             =   0
        TopMargin       =   0
        UndoLimit       =   255
        Width           =   2400
        WrapAutomatically=   0    'False
        WrapWholeWords  =   -1   'True
        WrapX           =   -1
    End
    Begin Label txtPreview
        BackColor       =   &H00400000&
        BorderStyle     =   1    'Fixed Single
        Caption         =   "Line not converted"
        FontBold        =   0    'False
        FontItalic      =   0    'False
        FontName        =   "Courier New"
        FontSize        =   8.25
        FontStrikethru  =   0    'False
        FontUnderline   =   0    'False
        ForeColor       =   &H00FFFFFF&
        Height          =   240
        Left            =   2700
        TabIndex        =   3
        Top             =   555
```

```
XCON.FRM - 3

Width           =   3360
   End
   Begin Menu IDM_FILE
      Caption         =   "&File"
      Begin Menu IDM_FILE_NEW
         Caption      =   "&New"
      End
      Begin Menu IDM_FILE_OPENTRANSCRIPT
         Caption      =   "&Open Transcript..."
      End
      Begin Menu IDM_FILE_INSERT
         Caption      =   "&Insert Transcript..."
      End
      Begin Menu IDM_FILE_SEP1
         Caption      =   "-"
      End
      Begin Menu IDM_FILE_CONVERT
         Caption      =   "&Convert..."
      End
      Begin Menu IDM_FILE_SAVEAS
         Caption      =   "&Save As..."
      End
      Begin Menu IDM_FILE_SEP2
         Caption      =   "-"
      End
      Begin Menu IDM_FILE_ABOUT
         Caption      =   "A&bout..."
      End
      Begin Menu IDM_FILE_EXIT
         Caption      =   "E&xit"
      End
   End
   Begin Menu IDM_VIEW
      Caption         =   "&View"
      Begin Menu IDM_VIEW_GOTOLINE
         Caption      =   "&Go to Document Line..."
      End
      Begin Menu IDM_VIEW_SEP2
         Caption      =   "-"
      End
      Begin Menu IDM_VIEW_READONLY
         Caption      =   "Transcript &Read-only"
         Checked      =   -1  'True
      End
   End
   Begin Menu IDM_FORMAT
      Caption         =   "Forma&t"
      Begin Menu IDM_FORMAT_NORMAL
         Caption      =   "&Normal"
         Checked      =   -1  'True
```

```
XCON.FRM - 4
        End
        Begin Menu IDM_FORMAT_UNDERSCORE
            Caption         =   "&Underscore/Hard CR"
        End
        Begin Menu IDM_FORMAT_SEP
            Caption         =   "-"
        End
        Begin Menu IDM_FORMAT_UNDERSCORECOLUMN
            Caption         =   "Set Underscore &Column"
            Enabled         =   0   'False
        End
    End
    Begin Menu IDM_OPTIONS
        Caption         =   "&Options"
        Begin Menu IDM_OPTIONS_IGNOREPRETEXT
            Caption         =   "&Ignore Pre-Text Non-Line Area"
        End
    End
    Begin Menu IDM_COMMAND
        Caption         =   "&Command"
        Begin Menu IDM_OPTIONS_STARTINGLINE
            Caption         =   "Set &Starting Line"
        End
        Begin Menu IDM_OPTIONS_ENDINGLINE
            Caption         =   "Set &Ending Line"
        End
        Begin Menu IDM_OPTIONS_SEP1
            Caption         =   "-"
        End
        Begin Menu IDM_OPTIONS_LINENUMBERAREA
            Caption         =   "Set &Line Number Area"
        End
        Begin Menu IDM_OPTIONS_TEXTCOLUMNA
            Caption         =   "Set Starting &Text Column"
        End
        Begin Menu IDM_OPTIONS_TEXTCOLUMNZ
            Caption         =   "Set Ending Te&xt Column"
        End
        Begin Menu IDM_OPTIONS_TIMECODEAREA
            Caption         =   "Set Time &Code Area"
        End
        Begin Menu IDM_OPTIONS_SEP2
            Caption         =   "-"
        End
        Begin Menu IDM_OPTIONS_REVIEW
            Caption         =   "&Review..."
        End
    End
End
```

```
Files from XCON.ZIP (text converter):
                                     # of files:  Pages of      Pages of
                                                  Form Text:    Source Code:

MISC        BAS        607 11-09-95   3:43p          -              1
XCON        BAS      7,087 01-30-96  11:23p   2     -              7

ABOUT       FRM      1,842 01-30-96  11:24p         2              1
GOTO        FRM      1,045 11-13-95   1:43p         2              1
PROGRESS    FRM      1,141 11-10-95   2:54p         2              1
REVOPT      FRM      5,785 01-06-96   2:11p         4              5
XCON        FRM     11,683 01-30-96  11:21p   5     4              7

XCON        MAK        249 01-30-96  11:24p   1

TEST        TXT          0 01-06-96   2:30p   1

11 file(s)        29,439 bytes
```

PART 2.
VIDLINK
Form text and graphical representation files FRM
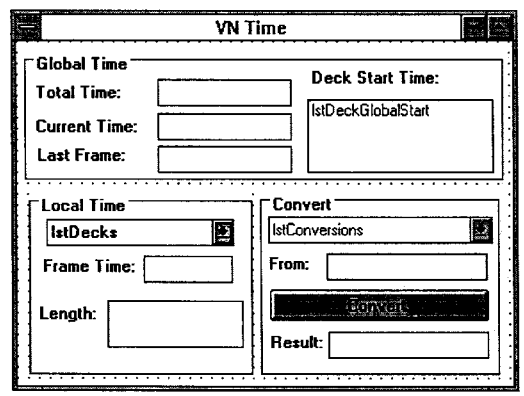
_vntime.bmp

```
_VNTIME.FRM - 1

VERSION 2.00
Begin Form VNTime
    BorderStyle     =   1   'Fixed Single
    Caption         =   "VN Time"
    ClientHeight    =   3810
    ClientLeft      =   1095
    ClientTop       =   1485
    ClientWidth     =   5565
    ControlBox      =   0   'False
    Height          =   4215
    Icon            =   (Icon)
    Left            =   1035
    LinkTopic       =   "Form1"
    MaxButton       =   0   'False
    ScaleHeight.    =   3810
    ScaleWidth      =   5565
    Top             =   1140
    Width           =   5685
    Begin Frame frmConvert
        Caption         =   "Convert"
        Height          =   2040
        Left            =   2730
        TabIndex        =   21
        Top             =   1650
        Width           =   2685
        Begin CommandButton btnConvert
            Caption         =   "Convert"
            Height          =   345
            Left            =   105
            TabIndex        =   0
            Top             =   1095
            Width           =   2460
        End
        Begin ComboBox lstConversions
            FontBold        =   0   'False
            FontItalic      =   0   'False
            FontName        =   "MS Sans Serif"
            FontSize        =   8.25
            FontStrikethru  =   0   'False
            FontUnderline   =   0   'False
            Height          =   300
            Left            =   90
            Style           =   2   'Dropdown List
            TabIndex        =   15

Top             =   285
            Width           =   2520
        End
        Begin Label lblFrom
            BorderStyle     =   1   'Fixed Single
```

```
_VNTIME.FRM - 2
         FontBold         =   0    'False
         FontItalic       =   0    'False
         FontName         =   "MS Sans Serif"
         FontSize         =   8.25
         FontStrikethru   =   0    'False
         FontUnderline    =   0    'False
         Height           =   300
         Left             =   750
         TabIndex         =   1
         Top              =   690
         Width            =   1800
      End
      Begin Label Label10
         Caption          =   "From:"
         Height           =   330
         Left             =   90
         TabIndex         =   17
         Top              =   705
         Width            =   630
      End
      Begin Label lblResult
         BorderStyle      =   1    'Fixed Single
         FontBold         =   0    'False
         FontItalic       =   0    'False
         FontName         =   "MS Sans Serif"
         FontSize         =   8.25
         FontStrikethru   =   0    'False
         FontUnderline    =   0    'False
         Height           =   300
         Left             =   765
         TabIndex         =   18
         Top              =   1560
         Width            =   1800
      End
      Begin Label Label8
         Caption          =   "Result:"
         Height           =   330
         Left             =   105
         TabIndex         =   16
         Top              =   1575
         Width            =   630
      End
   End
   Begin Frame frmLocalTime
      Caption             =   "Local Time"
      Height              =   2025
      Left                =   135
      TabIndex            =   11
      Top                 =   1665
      Width               =   2505
```

```
_VNTIME.FRM - 3

Begin ComboBox lstDecks
         Height          =   300
         Left            =   195
         Style           =   2  'Dropdown List
         TabIndex        =   12

Top             =   300
         Width           =   2100
      End
      Begin Label lblDeckEnd
         BorderStyle     =   1  'Fixed Single
         FontBold        =   0  'False
         FontItalic      =   0  'False
         FontName        =   "MS Sans Serif"
         FontSize        =   8.25
         FontStrikethru  =   0  'False
         FontUnderline   =   0  'False
         Height          =   525
         Left            =   870
         TabIndex        =   20
         Top             =   1200
         Width           =   1530
      End
      Begin Label Label7
         Caption         =   "Length:"
         Height          =   330
         Left            =   105
         TabIndex        =   19
         Top             =   1245
         Width           =   720
      End
      Begin Label lblFrameTime
         BorderStyle     =   1  'Fixed Single
         FontBold        =   0  'False
         FontItalic      =   0  'False
         FontName        =   "MS Sans Serif"
         FontSize        =   8.25
         FontStrikethru  =   0  'False
         FontUnderline   =   0  'False
         Height          =   300
         Left            =   1275
         TabIndex        =   14
         Top             =   705
         Width           =   1005
      End
      Begin Label Label5
         Caption         =   "Frame Time:"
         Height          =   330
         Left            =   150
         TabIndex        =   13
```

_VNTIME.FRM - 4

```
            Top             =   720
            Width           =   1170
         End
      End
      Begin Frame frmGlobalTime
         Caption         =   "Global Time"
         Height          =   1425
         Left            =   90
         TabIndex        =   2
         Top             =   105
         Width           =   5370
         Begin ListBox lstDeckGlobalStart
            FontBold        =   0   'False
            FontItalic      =   0   'False
            FontName        =   "MS Sans Serif"
            FontSize        =   8.25
            FontStrikethru  =   0   'False
            FontUnderline   =   0   'False
            Height          =   810
            Left            =   3180
            TabIndex        =   7
            Top             =   540
            Width           =   2085
         End
         Begin Label Label4
            Caption         =   "Deck Start Time:"
            Height          =   285
            Left            =   3225
            TabIndex        =   10
            Top             =   195
            Width           =   1560
         End
         Begin Label lblLastFrame
            BorderStyle     =   1   'Fixed Single
            FontBold        =   0   'False
            FontItalic      =   0   'False
            FontName        =   "MS Sans Serif"
            FontSize        =   8.25
            FontStrikethru  =   0   'False
            FontUnderline   =   0   'False
            Height          =   300
            Left            =   1485
            TabIndex        =   9
            Top             =   1050
            Width           =   1515
         End
         Begin Label Label3
            Caption         =   "Last Frame:"
            Height          =   285
            Left            =   135
```

_VNTIME.FRM - 5

```
            TabIndex        =   8
            Top             =   1050
            Width           =   1185
         End
         Begin Label lblCurrentTime
            BorderStyle     =   1  'Fixed Single
            FontBold        =   0  'False
            FontItalic      =   0  'False
            FontName        =   "MS Sans Serif"
            FontSize        =   8.25
            FontStrikethru  =   0  'False
            FontUnderline   =   0  'False
            Height          =   300
            Left            =   1485
            TabIndex        =   6
            Top             =   690
            Width           =   1515
         End
         Begin Label Label2
            Caption         =   "Current Time:"
            Height          =   270
            Left            =   120
            TabIndex        =   5
            Top             =   735
            Width           =   1305
         End
         Begin Label lblTotalTime
            BorderStyle     =   1  'Fixed Single
            FontBold        =   0  'False
            FontItalic      =   0  'False
            FontName        =   "MS Sans Serif"
            FontSize        =   8.25
            FontStrikethru  =   0  'False
            FontUnderline   =   0  'False
            Height          =   300
            Left            =   1485
            TabIndex        =   4
            Top             =   315
            Width           =   1515
         End
         Begin Label Label1
            Caption         =   "Total Time:"
            Height          =   255
            Left            =   120
            TabIndex        =   3
            Top             =   360
            Width           =   1155
         End
      End
End
```

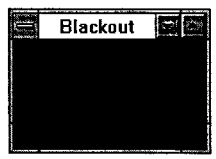
blackout.bmp

```
BLACKOUT.FRM - 1

VERSION 2.00
Begin Form Blackout
    BackColor       =   &H00000000&
    BorderStyle     =   0  'None
    Caption         =   "Blackout"
    ClientHeight    =   1200
    ClientLeft      =   1095
    ClientTop       =   1485
    ClientWidth     =   2160
    Height          =   1605
    Left            =   1035
    LinkTopic       =   "Form1"
    ScaleHeight     =   1200
    ScaleWidth      =   2160
    Top             =   1140
    Width           =   2280
End
```

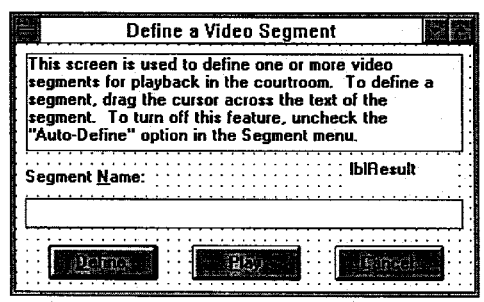
defseg.bmp

```
DEFSEG.FRM - 1

VERSION 2.00
Begin Form DefineSegment
   BorderStyle      =   3  'Fixed Double
   Caption          =   "Define a Video Segment"
   ClientHeight     =   2730
   ClientLeft       =   2265
   ClientTop        =   1995
   ClientWidth      =   5085
   ControlBox       =   0  'False
   Height           =   3135
   Left             =   2205
   LinkTopic        =   "Form1"
   MaxButton        =   0  'False
   MinButton        =   0  'False
   ScaleHeight      =   2730
   ScaleWidth       =   5085
   Top              =   1650
   Width            =   5205
   Begin CommandButton btnPlay
      Caption          =   "&Play"
      Height           =   390
      Left             =   1950
      TabIndex         =   3
      Top              =   2220
      Width            =   1215
   End
   Begin CommandButton btnCancel
      Cancel           =   -1  'True
      Caption          =   "Cancel"
      Height           =   390
      Left             =   3540
      TabIndex         =   4
      Top              =   2220
      Width            =   1215
   End
   Begin CommandButton btnDefine
      Caption          =   "&Define"
      Default          =   -1  'True
      Height           =   390
      Left             =   360
      TabIndex         =   2
      Top              =   2220
      Width            =   1215
   End
   Begin TextBox txtSegmentName
      Height           =   330
      Left             =   105
      TabIndex         =   1
      Top              =   1710
      Width            =   4860
```

```
DEFSEG.FRM - 2
      End
      Begin Label lblInfo
         BorderStyle     =   1  'Fixed Single
         Caption         =   "This screen is used to define one or more video segme
         Height          =   1080
         Left            =   120
         TabIndex        =   6
         Top             =   105
         Width           =   4845
      End
      Begin Label lblResult
         Caption         =   "lblResult"
         Height          =   300
         Left            =   3705
         TabIndex        =   5
         Top             =   1275
         Visible         =   0  'False
         Width           =   1215
      End
      Begin Label lblSegmentName
         Caption         =   "Segment &Name:"
         Height          =   315
         Left            =   105
         TabIndex        =   0
         Top             =   1365
         Width           =   1440
      End
End
```

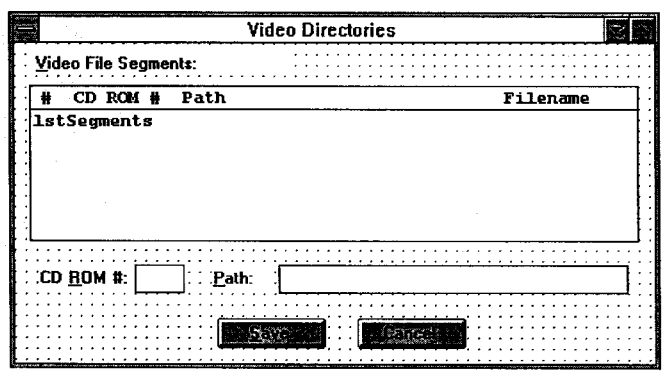
fileopts.bmp

```
FILEOPTS.FRM - 1

VERSION 2.00
Begin Form FileOptions
   BorderStyle     =   3  'Fixed Double
   Caption         =   "Video Directories"
   ClientHeight    =   3525
   ClientLeft      =   1335
   ClientTop       =   1935
   ClientWidth     =   7140
   ControlBox      =   0  'False
   Height          =   3930
   Left            =   1275
   LinkTopic       =   "Form1"
   MaxButton       =   0  'False
   ScaleHeight     =   3525
   ScaleWidth      =   7140
   Top             =   1590
   Width           =   7260
   Begin CommandButton btnCancel
      Cancel          =   -1  'True
      Caption         =   "Cancel"
      Height          =   330
      Left            =   3810
      TabIndex        =   8
      Top             =   3030
      Width           =   1215
   End
   Begin CommandButton btnSave
      Caption         =   "&Save"
      Height          =   330
      Left            =   2235
      TabIndex        =   7
      Top             =   3030
      Width           =   1215
   End
   Begin TextBox txtPath
      Height          =   315
      Left            =   2925
      TabIndex        =   6
      Top             =   2445
      Width           =   3915
   End
   Begin TextBox txtGroup
      Height          =   315
      Left            =   1320
      TabIndex        =   4
      Top             =   2445
      Width           =   555
   End
   Begin ListBox lstSegments
      FontBold        =   -1  'True
```

```
FILEOPTS.FRM - 2
      FontItalic      =   0   'False
      FontName        =   "Courier New"
      FontSize        =   9.75
      FontStrikethru  =   0   'False
      FontUnderline   =   0   'False
      Height          =   1470
      Left            =   165
      TabIndex        =   2
      Top             =   720
      Width           =   6795
   End
   Begin Label lblPath
      Caption         =   "&Path:"
      Height          =   255
      Left            =   2190
      TabIndex        =   5
      Top             =   2490
      Width           =   600
   End
   Begin Label lblGroup
      Caption         =   "CD &ROM #:"
      Height          =   255
      Left            =   270
      TabIndex        =   3
      Top             =   2490
      Width           =   1065
   End
   Begin Label lblSegList
      BorderStyle     =   1   'Fixed Single
      Caption         =   " #   CD ROM #    Path                                      Filename"
      FontBold        =   -1  'True
      FontItalic      =   0   'False
      FontName        =   "Courier New"
      FontSize        =   9.75
      FontStrikethru  =   0   'False
      FontUnderline   =   0   'False
      Height          =   270
      Left            =   165
      TabIndex        =   1
      Top             =   465
      Width           =   6795
   End
   Begin Label lblSegments
      Caption         =   "&Video File Segments:"
      Height          =   225
      Left            =   240
      TabIndex        =   0
      Top             =   120
      Width           =   2880
   End
```

FILEOPTS.FRM - 3

End

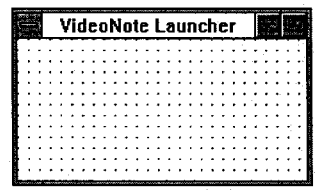
launcher.bmp

```
LAUNCHER.FRM - 1

VERSION 2.00
Begin Form Launcher
    Caption         =   "VideoNote Launcher"
    ClientHeight    =   1560
    ClientLeft      =   2715
    ClientTop       =   2910
    ClientWidth     =   3210
    Height          =   1965
    Left            =   2655
    LinkTopic       =   "Form1"
    ScaleHeight     =   1560
    ScaleWidth      =   3210
    Top             =   2565
    Width           =   3330
End
```

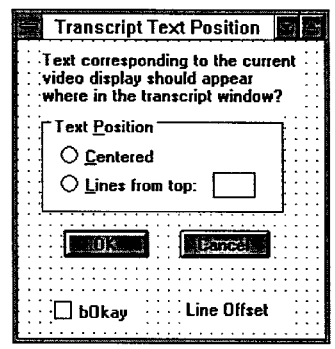
lineoff.bmp

LINEOFF.FRM - 1

```
VERSION 2.00
Begin Form LineOffsetDlg
   BorderStyle     =   3  'Fixed Double
   Caption         =      "Transcript Text Position"
   ClientHeight    =   2550
   ClientLeft      =   2760
   ClientTop       =   2760
   ClientWidth     =   3300
   ControlBox      =   0  'False
   Height          =   2955
   Left            =   2700
   LinkTopic       =      "Form1"
   MaxButton       =   0  'False
   MinButton       =   0  'False
   ScaleHeight     =   2550
   ScaleWidth      =   3300
   Top             =   2415
   Width           =   3420
   Begin Frame Position
      Caption            =   "Text &Position"
      Height             =   1100
      Left               =   270
      TabIndex           =   1
      Top                =   810
      Width              =   2715
      Begin OptionButton btnPosition
         Caption            =   "&Lines from top:"
         Height             =   270
         Index              =   1
         Left               =   210
         TabIndex           =   3
         Top                =   650
         Width              =   1650
      End
      Begin OptionButton btnPosition
         Caption            =   "&Centered"
         Height             =   270
         Index              =   0
         Left               =   210
         TabIndex           =   2
         Top                =   330
         Width              =   1185
      End
      Begin TextBox txtLineOffset
         Height             =   285
         Left               =   1920
         TabIndex           =   4
         Top                =   645
         Width              =   480
      End
```

```
LINEOFF.FRM - 2
      End
      Begin CheckBox bOkay
         Caption         =   "bOkay"
         Height          =   270
         Left            =   405
         TabIndex        =   7
         TabStop         =   0   'False
         Top             =   2865
         Visible         =   0   'False
         Width           =   1020
      End
      Begin CommandButton btnCancel
         Cancel          =   -1  'True
         Caption         =   "Cancel"
         Height          =   315
         Left            =   1815
         TabIndex        =   6
         Top             =   2100
         Width           =   1020
      End
      Begin CommandButton btnOK
         Caption         =   "OK"
         Default         =   -1  'True
         Height          =   315
         Left            =   510
         TabIndex        =   5
         Top             =   2100
         Width           =   960
      End
      Begin Label lblLineOffset
         Caption         =   "Line Offset"
         Height          =   285
         Left            =   1875
         TabIndex        =   8
         Top             =   2880
         Visible         =   0   'False
         Width           =   1200
      End
      Begin Label lblInstructions
         Caption         =   "Text corresponding to the current video display shoul
         Height          =   675
         Left            =   270
         TabIndex        =   0
         Top             =   120
         Width           =   2865
      End
End
```

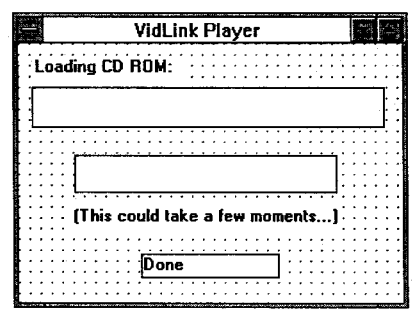
loading.bmp

LOADING.FRM - 1

```
VERSION 2.00
Begin Form LoadingMsg
   BorderStyle     =   1   'Fixed Single
   Caption         =   "VidLink Player"
   ClientHeight    =   2085
   ClientLeft      =   2580
   ClientTop       =   3720
   ClientWidth     =   4215
   ControlBox      =   0   'False
   Height          =   2490
   Left            =   2520
   LinkTopic       =   "Form2"
   MaxButton       =   0   'False
   MinButton       =   0   'False
   ScaleHeight     =   2085
   ScaleWidth      =   4215
   Top             =   3375
   Width           =   4335
   Begin PictureBox tTotal
      Height          =   420
      Left            =   615
      ScaleHeight     =   390
      ScaleWidth      =   2895
      TabIndex        =   0
      Top             =   1230
      Width           =   2925
      Begin Shape tDone
         BackColor       =   &H00FF0000&
         BackStyle       =   1   'Opaque
         BorderColor     =   &H00FF0000&
         BorderStyle     =   0   'Transparent
         Height          =   405
         Left            =   0
         Top             =   0
         Width           =   15
      End
   End
   Begin Label lblDone
      BorderStyle     =   1   'Fixed Single
      Caption         =   "Done"
      Height          =   270
      Left            =   1350
      TabIndex        =   1
      Top             =   2325
      Width           =   1545
   End
   Begin Label lblPleaseInsert
      Caption         =   "Loading CD ROM:"
      Height          =   315
      Left            =   180
```

```
LOADING.FRM - 2
      TabIndex        =   2
      Top             =   150
      Width           =   1680
   End
   Begin Label lblMediaLabel
      Alignment       =   2  'Center
      BorderStyle     =   1  'Fixed Single
      Height          =   450
      Left            =   150
      TabIndex        =   3
      Top             =   480
      Width           =   3915
   End
   Begin Label Label4
      Caption         =   "(This could take a few moments...)"
      Height          =   270
      Left            =   600
      TabIndex        =   4
      Top             =   1800
      Width           =   2985
   End
End
```

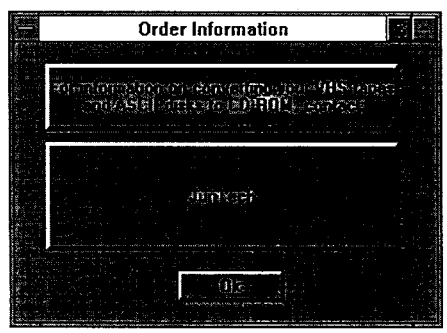
moreinfo.bmp

MOREINFO.FRM - 1

```
VERSION 2.00
Begin Form MoreInfo
    BackColor       =   &H00C0C0C0&
    BorderStyle     =   1  'Fixed Single
    Caption         =   "Order Information"
    ClientHeight    =   3105
    ClientLeft      =   750
    ClientTop       =   1620
    ClientWidth     =   4740
    Height          =   3510
    Left            =   690
    LinkTopic       =   "Form1"
    MaxButton       =   0  'False
    MinButton       =   0  'False
    ScaleHeight     =   3105
    ScaleWidth      =   4740
    Top             =   1275
    Width           =   4860
    Begin SSPanel lblJuriTech
        BackColor   =   &H00C0C0C0&
        BevelWidth  =   3
        Caption     =   "JuriTech"
        Font3D      =   0  'None
        Height      =   1200
        Left        =   345
        TabIndex    =   2
        Top         =   1110
        Width       =   3975
    End
    Begin SSCommand btnOk
        Caption     =   "Ok"
        Font3D      =   0  'None
        Height      =   360
        Left        =   1800
        Picture     =   (none)
        TabIndex    =   1
        Top         =   2520
        Width       =   1215
    End
    Begin SSPanel Panel3D1
        BackColor   =   &H00C0C0C0&
        BevelWidth  =   3
        Caption     =   "For information on converting your VHS tapes and ASCI
        Font3D      =   0  'None
        Height      =   750
        Left        =   345
        TabIndex    =   0
        Top         =   240
        Width       =   3975
    End
```

```
MOREINFO.FRM - 2

End
```

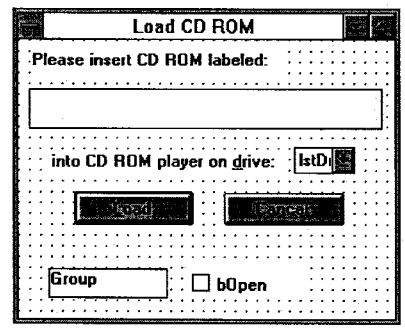
mounter.bmp

```
MOUNTER.FRM - 1

VERSION 2.00
Begin Form Mounter
   BorderStyle      =   3  'Fixed Double
   Caption          =   "Load CD ROM"
   ClientHeight     =   2220
   ClientLeft       =   2505
   ClientTop        =   3075
   ClientWidth      =   4170
   ControlBox       =   0  'False
   Height           =   2625
   Left             =   2445
   LinkTopic        =   "Form1"
   MaxButton        =   0  'False
   MinButton        =   0  'False
   ScaleHeight      =   2220
   ScaleWidth       =   4170
   Top              =   2730
   Width            =   4290
   Begin ComboBox lstDrive
      Height        =   300
      Left          =   3060
      Style         =   2  'Dropdown List
      TabIndex      =   7

Top           =   1185
      Width         =   675
   End
   Begin CheckBox bOpen
      Caption       =   "bOpen"
      Height        =   375
      Left          =   1920
      TabIndex      =   5
      Top           =   2505
      Visible       =   0  'False
      Width         =   1215
   End
   Begin CommandButton btnCancel
      Cancel        =   -1 'True
      Caption       =   "Cancel"
      Height        =   360
      Left          =   2280
      TabIndex      =   4
      Top           =   1695
      Width         =   1335
   End
   Begin CommandButton btnOpen
      Caption       =   "&Load"
      Default       =   -1 'True
      Height        =   375
      Left          =   615
```

MOUNTER.FRM - 2

```
         TabIndex        =    3
         Top             =    1680
         Width           =    1320
      End
      Begin Label lblGroup
         BorderStyle     =    1  'Fixed Single
         Caption         =    "Group"
         Height          =    330
         Left            =    330
         TabIndex        =    6
         Top             =    2535
         Visible         =    0   'False
         Width           =    1320
      End
      Begin Label lblDrive
         Caption         =    "into CD ROM player on &drive:"
         Height          =    270
         Left            =    360
         TabIndex        =    2
         Top             =    1245
         Width           =    2565
      End
      Begin Label lblMediaLabel
         Alignment       =    2  'Center
         BorderStyle     =    1  'Fixed Single
         Height          =    450
         Left            =    120
         TabIndex        =    1
         Top             =    540
         Width           =    3915
      End
      Begin Label lblPleaseInsert
         Caption         =    "Please insert CD ROM labeled:"
         Height          =    315
         Left            =    150
         TabIndex        =    0
         Top             =    120
         Width           =    2790
      End
   End
End
```

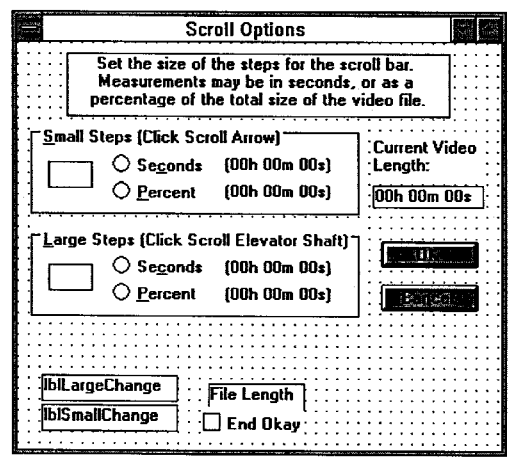
scrllopt.bmp

```
SCRLLOPT.FRM - 1

VERSION 2.00
Begin Form StepSizeDlg
   BorderStyle     =   3  'Fixed Double
   Caption         =   "Scroll Options"
   ClientHeight    =   3165
   ClientLeft      =   1950
   ClientTop       =   2385
   ClientWidth     =   5400
   ControlBox      =   0  'False
   Height          =   3570
   Left            =   1890
   LinkTopic       =   "Form3"
   MaxButton       =   0  'False
   MinButton       =   0  'False
   ScaleHeight     =   3165
   ScaleWidth      =   5400
   Top             =   2040
   Width           =   5520
   Begin CommandButton btnCancel
      Cancel       =   -1 'True
      Caption      =   "Cancel"
      Height       =   300
      Left         =   4095
      TabIndex     =   16
      Top          =   2670
      Width        =   1095
   End
   Begin CommandButton btnOk
      Caption      =   "OK"
      Default      =   -1 'True
      Height       =   300
      Left         =   4095
      TabIndex     =   15
      Top          =   2190
      Width        =   1095
   End
   Begin CheckBox bEndOk
      Caption      =   "End Okay"
      Height       =   345
      Left         =   2085
      TabIndex     =   17
      Top          =   4035
      Visible      =   0  'False
      Width        =   1140
   End
   Begin Frame SmallSteps
      Caption      =   "&Small Steps (Click Scroll Arrow)"
      Height       =   1005
      Left         =   150
      TabIndex     =   3
```

```
SCRLLOPT.FRM - 2

Top             =   900
      Width           =   3700
      Begin OptionButton nSmallUnits
         Caption         =   "&Percent"
         Height          =   255
         Index           =   1
         Left            =   915
         TabIndex        =   7
         Top             =   610
         Width           =   1065
      End
      Begin OptionButton nSmallUnits
         Caption         =   "Se&conds"
         Height          =   255
         Index           =   0
         Left            =   915
         TabIndex        =   5
         Top             =   310
         Width           =   1065
      End
      Begin TextBox SmallSize
         Height          =   300
         Left            =   195
         TabIndex        =   4
         Top             =   420
         Width           =   495
      End
      Begin Label tSmallPercent
         Caption         =   "(00h 00m 00s)"
         Height          =   210
         Left            =   2175
         TabIndex        =   8
         Top             =   650
         Width           =   1275
      End
      Begin Label tSmallSeconds
         Caption         =   "(00h 00m 00s)"
         Height          =   210
         Left            =   2175
         TabIndex        =   6
         Top             =   345
         Width           =   1275
      End
   End
   Begin Frame LargeSteps
      Caption         =   "&Large Steps (Click Scroll Elevator Shaft)"
      Height          =   1005
      Left            =   150
      TabIndex        =   9
      Top             =   2040
```

SCRLLOPT.FRM - 3

```
         Width           =   3700
      Begin TextBox LargeSize
         Height          =   300
         Left            =   195
         TabIndex        =   10
         Top             =   420
         Width           =   495
      End
      Begin OptionButton nLargeUnits
         Caption         =   "Se&conds"
         Height          =   225
         Index           =   0
         Left            =   915
         TabIndex        =   11
         Top             =   310
         Width           =   1215
      End
      Begin OptionButton nLargeUnits
         Caption         =   "&Percent"
         Height          =   240
         Index           =   1
         Left            =   915
         TabIndex        =   13
         Top             =   610
         Width           =   1095
      End
      Begin Label tLargePercent
         Caption         =   "(00h 00m 00s)"
         Height          =   210
         Left            =   2175
         TabIndex        =   14
         Top             =   640
         Width           =   1275
      End
      Begin Label tLargeSeconds
         Caption         =   "(00h 00m 00s)"
         Height          =   255
         Left            =   2175
         TabIndex        =   12
         Top             =   345
         Width           =   1245
      End
   End
   Begin Label lblLargeChange
      BorderStyle        =   1  'Fixed Single
      Caption            =   "lblLargeChange"
      Height             =   300
      Left               =   270
      TabIndex           =   19
      Top                =   3690
```

```
SCRLLOPT.FRM - 4
        Width           =   1530
    End
    Begin Label lblSmallChange
        BorderStyle     =   1  'Fixed Single
        Caption         =   "lblSmallChange"
        Height          =   300
        Left            =   270
        TabIndex        =   18
        Top             =   4020
        Width           =   1530
    End
    Begin Label FileLength
        BorderStyle     =   1  'Fixed Single
        Caption         =   "File Length"
        Height          =   300
        Left            =   2145
        TabIndex        =   20
        Top             =   3780
        Width           =   1095
    End
    Begin Label tVideoFile
        BorderStyle     =   1  'Fixed Single
        Caption         =   "00h 00m 00s"
        Height          =   255
        Left            =   4005
        TabIndex        =   2
        Top             =   1575
        Width           =   1245
    End
    Begin Label lblVideoLength
        Caption         =   "Current Video Length:"
        Height          =   480
        Left            =   4005
        TabIndex        =   1
        Top             =   1050
        Width           =   1230
    End
    Begin Label lblInstructions
        Alignment       =   2  'Center
        BorderStyle     =   1  'Fixed Single
        Caption         =   "Set the size of the steps for the scroll bar. Measure
        Height          =   705
        Left            =   555
        TabIndex        =   0
        Top             =   120
        Width           =   4320
    End
End
```

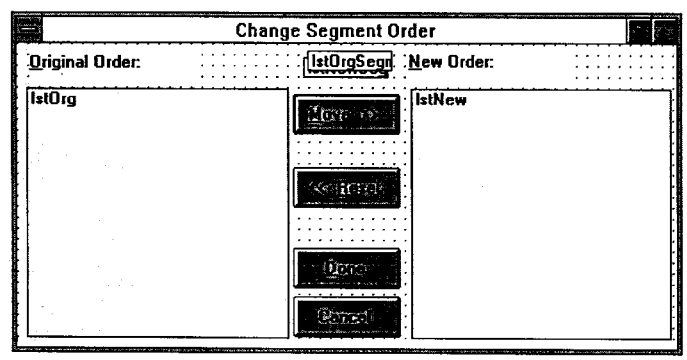
segorder.bmp

```
SEGORDER.FRM - 1

VERSION 2.00
Begin Form SegReorder
   BorderStyle      =   3   'Fixed Double
   Caption          =   "Change Segment Order"
   ClientHeight     =   3360
   ClientLeft       =   1095
   ClientTop        =   1485
   ClientWidth      =   7365
   ControlBox       =   0   'False
   Height           =   3765
   Left             =   1035
   LinkTopic        =   "Form1"
   MaxButton        =   0   'False
   MinButton        =   0   'False
   ScaleHeight      =   3360
   ScaleWidth       =   7365
   Top              =   1140
   Width            =   7485
   Begin ListBox lstNew
      Height           =   2760
      Left             =   4395
      TabIndex         =   9
      Top              =   495
      Width            =   2910
   End
   Begin ListBox lstOrgSegments
      Height           =   225
      Left             =   3225
      TabIndex         =   8
      Top              =   75
      Visible          =   0   'False
      Width            =   960
   End
   Begin ListBox lstNewSegments
      Height           =   225
      Left             =   3180
      TabIndex         =   7
      Top              =   150
      Visible          =   0   'False
      Width            =   960
   End
   Begin CommandButton btnCancel
      Caption          =   "Cancel"
      Height           =   450
      Left             =   3060
      TabIndex         =   6
      Top              =   2790
      Width            =   1215
   End
   Begin CommandButton btnDone
```

SEGORDER.FRM - 2

```
         Caption         =   "&Done"
         Height          =   450
         Left            =   3060
         TabIndex        =   5
         Top             =   2250
         Width           =   1215
      End
      Begin CommandButton btnReset
         Caption         =   "<<- &Reset"
         Height          =   450
         Left            =   3060
         TabIndex        =   4
         Top             =   1365
         Width           =   1215
      End
      Begin CommandButton btnMove
         Caption         =   "&Move ->>"
         Default         =   -1  'True
         Height          =   450
         Left            =   3060
         TabIndex        =   2
         Top             =   555
         Width           =   1215
      End
      Begin ListBox lstOrg
         Height          =   2760
         Left            =   105
         TabIndex        =   1
         Top             =   495
         Width           =   2910
      End
      Begin Label lblNew
         Caption         =   "&New Order:"
         Height          =   285
         Left            =   4365
         TabIndex        =   3
         Top             =   90
         Width           =   1800
      End
      Begin Label lblOriginal
         Caption         =   "&Original Order:"
         Height          =   285
         Left            =   135
         TabIndex        =   0
         Top             =   105
         Width           =   1800
      End
End
```

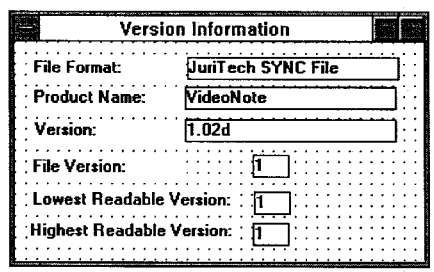
version.bmp

VERSION.FRM - 1

```
VERSION 2.00
Begin Form Version
   Caption          =   "Version Information"
   ClientHeight     =   2430
   ClientLeft       =   1080
   ClientTop        =   1470
   ClientWidth      =   4545
   Height           =   2835
   Left             =   1020
   LinkTopic        =   "Form2"
   ScaleHeight      =   2430
   ScaleWidth       =   4545
   Top              =   1125
   Width            =   4665
   Begin Label nHiVersion
      BorderStyle   =   1  'Fixed Single
      Caption       =   "1"
      Height        =   255
      Left          =   2655
      TabIndex      =   11
      Top           =   1995
      Width         =   405
   End
   Begin Label lblHighestVersion
      Caption       =   "Highest Readable Version:"
      Height        =   240
      Left          =   165
      TabIndex      =   10
      Top           =   1980
      Width         =   2280
   End
   Begin Label nLoVersion
      BorderStyle   =   1  'Fixed Single
      Caption       =   "1"
      Height        =   255
      Left          =   2670
      TabIndex      =   9
      Top           =   1650
      Width         =   405
   End
   Begin Label lblLowestVersion
      Caption       =   "Lowest Readable Version:"
      Height        =   240
      Left          =   195
      TabIndex      =   8
      Top           =   1635
      Width         =   2280
   End
   Begin Label nFileVersion
      BorderStyle   =   1  'Fixed Single
```

VERSION.FRM - 2

```
        Caption         =   "1"
        Height          =   255
        Left            =   2655
        TabIndex        =   7
        Top             =   1245
        Width           =   405
     End
     Begin Label lblFileVersion
        Caption         =   "File Version:"
        Height          =   240
        Left            =   195
        TabIndex        =   6
        Top             =   1275
        Width           =   1650
     End
     Begin Label sVersion
        BorderStyle     =   1  'Fixed Single
        Caption         =   "1.02d"
        Height          =   255
        Left            =   1905
        TabIndex        =   5
        Top             =   855
        Width           =   2340
     End
     Begin Label lblVersion
        Caption         =   "Version:"
        Height          =   240
        Left            =   225
        TabIndex        =   4
        Top             =   870
        Width           =   1650
     End
     Begin Label sFileFormat
        BorderStyle     =   1  'Fixed Single
        Caption         =   "JuriTech SYNC File"
        Height          =   255
        Left            =   1935
        TabIndex        =   3
        Top             =   165
        Width           =   2340
     End
     Begin Label lblFileFormat
        Caption         =   "File Format:"
        Height          =   240
        Left            =   210
        TabIndex        =   2
        Top             =   180
        Width           =   1650
     End
     Begin Label sProductName
```

```
VERSION.FRM - 3

BorderStyle     =   1   'Fixed Single
        Caption         =   "VideoNote"
        Height          =   255
        Left            =   1905
        TabIndex        =   1
        Top             =   495
        Width           =   2340
    End
    Begin Label lblProductName
        Caption         =   "Product Name:"
        Height          =   240
        Left            =   210
        TabIndex        =   0
        Top             =   510
        Width           =   1650
    End
End
```

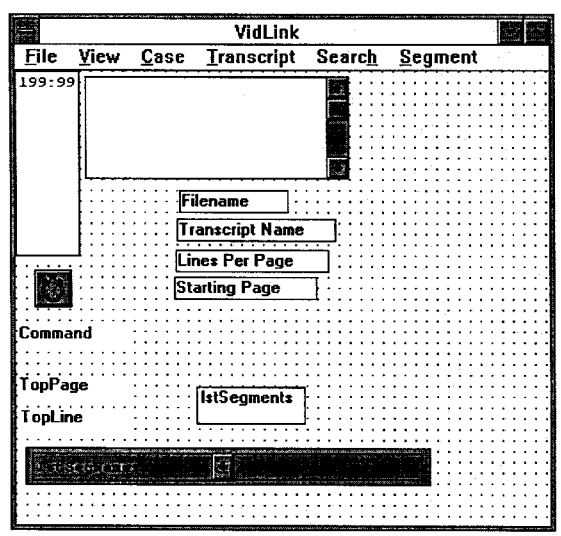
vidlink.bmp

VIDLINK.FRM - 1

```
VERSION 2.00
Begin Form VidLink
    Caption         =   "VidLink"
    ClientHeight    =   5025
    ClientLeft      =   1005
    ClientTop       =   1560
    ClientWidth     =   5925
    Height          =   5715
    Icon            =   (Icon)
    KeyPreview      =   -1  'True
    Left            =   945
    LinkTopic       =   "Form1"
    ScaleHeight     =   5025
    ScaleWidth      =   5925
    Top             =   930
    Width           =   6045
    Begin ListBox lstSegments
        Height          =   420
        Left            =   2010
        TabIndex        =   13
        Top             =   3495
        Visible         =   0   'False
        Width           =   1215
    End
    Begin PictureBox z_frmToolbar
        BackColor       =   &H00C0C0C0&
        Height          =   420
        Left            =   105
        ScaleHeight     =   390
        ScaleWidth      =   4470
        TabIndex        =   10
        Top             =   4170
        Width           =   4500
        Begin ComboBox lstSegNames
            BackColor       =   &H00C0C0C0&
            FontBold        =   0   'False
            FontItalic      =   0   'False
            FontName        =   "Courier New"
            FontSize        =   8.25
            FontStrikethru  =   0   'False
            FontUnderline   =   0   'False
            Height          =   315
            Left            =   60
            Style           =   2   'Dropdown List
            TabIndex        =   11

Top             =   45
            Width           =   2250
        End
        Begin Label lblSel
```

VIDLINK.FRM - 2

```
            BackColor       =   &H00C0C0C0&
            BorderStyle     =   1  'Fixed Single
            FontBold        =   0  'False
            FontItalic      =   0  'False
            FontName        =   "Courier New"
            FontSize        =   8.25
            FontStrikethru  =   0  'False
            FontUnderline   =   0  'False
            Height          =   300
            Left            =   2025
            TabIndex        =   12
            Top             =   45
            Width           =   2370
        End
    End
    Begin Timer VideoUpdate
        Interval        =   250
        Left            =   210
        Top             =   2205
    End
    Begin PictureBox lpFrame
        Height          =   2055
        Left            =   0
        ScaleHeight     =   2025
        ScaleWidth      =   690
        TabIndex        =   6
        Top             =   0
        Width           =   720
        Begin Label LP
            Alignment       =   1  'Right Justify
            Caption         =   "199:99"
            FontBold        =   0  'False
            FontItalic      =   0  'False
            FontName        =   "Courier New"
            FontSize        =   8.25
            FontStrikethru  =   0  'False
            FontUnderline   =   0  'False
            Height          =   4560
            Left            =   0
            TabIndex        =   5
            Top             =   0
            Width           =   660
        End
    End
    Begin Editor Transcript
        BottomMargin    =   0
        CaretHeight     =   -1
        CaretWidth      =   -1
        FileConvertOemAnsi= 0  'False
        FileOpen        =   ""
```

```
VIDLINK.FRM - 3

FileSaveAppend   =   0       'False
        FontBold         =   0       'False
        FontItalic       =   0       'False
        FontName         =   "Courier New"
        FontSize         =   8.25
        FontStrikethru   =   0       'False
        FontUnderline    =   0       'False
        Height           =   1140
        InsertMode       =   -1      'True
        Left             =   780
        LeftMargin       =   0
        Password         =   22886
        ReadOnly         =   -1      'True
        RightMargin      =   0
        ScrollBars       =   2       'Vertical
        SearchCaseSensitive=  0      'False
        SearchOrigin     =   0       'From Cursor
        SearchReplacement=   ""
        SearchTarget     =   ""
        SearchTo         =   1       'Bottom of text
        Prop82           =   0       'False
        SelBackColor     =   &H00000000&
        SelDefaultType   =   1       'Stream
        SelDragDropEnable=   -1      'True
        SelForeColor     =   &H00FFFFFF&
        TabDefaultWidth  =   -1
        TabIndex         =   0
        Top              =   60
        TopMargin        =   0
        UndoLimit        =   255
        Width            =   2940
        WrapAutomatically=   0       'False
        WrapWholeWords   =   -1      'True
        WrapX            =   -1
    End
    Begin Label TopLine
        Caption          =   "TopLine"
        Height           =   255
        Left             =   45
        TabIndex         =   9
        Top              =   3735
        Visible          =   0       'False
        Width            =   1215
    End
    Begin Label TopPage
        Caption          =   "TopPage"
        Height           =   255
        Left             =   30
        TabIndex         =   8
        Top              =   3375
```

```
VIDLINK.FRM - 4
      Visible         =   0    'False
      Width           =   1215
   End
   Begin Label Command
      Caption         =   "Command"
      Height          =   285
      Left            =   30
      TabIndex        =   7
      Top             =   2805
      Visible         =   0    'False
      Width           =   1215
   End
   Begin Label lblStartingPage
      BorderStyle     =   1    'Fixed Single
      Caption         =   "Starting Page"
      Height          =   255
      Left            =   1770
      TabIndex        =   4
      Top             =   2280
      Visible         =   0    'False
      Width           =   1590
   End
   Begin Label lblLinesPerPage
      BorderStyle     =   1    'Fixed Single
      Caption         =   "Lines Per Page"
      Height          =   255
      Left            =   1785
      TabIndex        =   3
      Top             =   1980
      Visible         =   0    'False
      Width           =   1710
   End
   Begin Label lblTranscriptName
      BorderStyle     =   1    'Fixed Single
      Caption         =   "Transcript Name"
      Height          =   255
      Left            =   1800
      TabIndex        =   2
      Top             =   1635
      Visible         =   0    'False
      Width           =   1770
   End
   Begin Label lblFilename
      BorderStyle     =   1    'Fixed Single
      Caption         =   "Filename"
      Height          =   255
      Left            =   1830
      TabIndex        =   1
      Top             =   1320
      Visible         =   0    'False
```

```
VIDLINK.FRM - 5

Width           =   1215
   End
   Begin Menu ZM_FILE
      Caption         =   "&File"
      Begin Menu ZM_FILE_VIEWVIDEO
         Caption      =   "Activate &Video"
         Shortcut     =   ^V
      End
      Begin Menu ZM_FILE_TOOLS
         Caption      =   "&Tools"
         Enabled      =   0   'False
      End
      Begin Menu ZM_FILE_SEP1
         Caption      =   "-"
      End
      Begin Menu ZM_FILE_EXIT
         Caption      =   "E&xit"
      End
   End
   Begin Menu ZM_VIEW
      Caption         =   "&View"
      Begin Menu ZM_VIEW_TOOLBAR
         Caption      =   "&Toolbar"
      End
      Begin Menu ZM_VIEW_PAGELINE
         Caption      =   "&Page:Line Numbers"
      End
      Begin Menu ZM_VIEW_SEP1
         Caption      =   "-"
      End
      Begin Menu ZM_VIEW_TRANSCRIPT
         Caption      =   "Transcript &Only"
      End
      Begin Menu ZM_VIEW_ALL
         Caption      =   "Show &All"
      End
   End
   Begin Menu ZM_CASE
      Caption         =   "&Case"
      Begin Menu ZM_CASE_NEW
         Caption      =   "&New"
         Enabled      =   0   'False
      End
      Begin Menu ZM_CASE_OPEN
         Caption      =   "&Open..."
         Enabled      =   0   'False
      End
      Begin Menu ZM_CASE_DELETE
         Caption      =   "&Delete..."
         Enabled      =   0   'False
```

```
VIDLINK.FRM - 6
         End
      End
      Begin Menu ZM_TRANSCRIPT
         Caption         =   "&Transcript"
         Begin Menu ZM_TRANSCRIPT_IMPORT
            Caption         =   "&Import..."
            Enabled         =   0   'False
         End
         Begin Menu ZM_TRANSCRIPT_EXPORT
            Caption         =   "&Export..."
            Enabled         =   0   'False
         End
         Begin Menu ZM_TRANSCRIPT_ISSUES
            Caption         =   "I&ssues..."
            Enabled         =   0   'False
         End
         Begin Menu ZM_TRANSCRIPT_SEP1
            Caption         =   "-"
         End
         Begin Menu ZM_TRANSCRIPT_UPDATEVIDEO
            Caption         =   "&Update Video"
         End
         Begin Menu ZM_TRANSCRIPT_UPDATE
            Caption         =   "Update &Transcript"
         End
      End
      Begin Menu ZM_FIND
         Caption         =   "Searc&h"
         Begin Menu ZM_FIND_FIND
            Caption         =   "&Find Text..."
            Shortcut        =   ^F
         End
         Begin Menu ZM_FIND_AGAIN
            Caption         =   "Find &Again"
            Shortcut        =   {F3}
         End
         Begin Menu ZM_FIND_SEP1
            Caption         =   "-"
            Visible         =   0   'False
         End
         Begin Menu ZM_FIND_SETUP
            Caption         =   "&Boolean Search Setup..."
            Enabled         =   0   'False
            Visible         =   0   'False
         End
         Begin Menu ZM_FIND_FULLTEXT
            Caption         =   "Fu&ll Text Search"
            Enabled         =   0   'False
            Visible         =   0   'False
         End
```

```
VIDLINK.FRM - 7
    End
    Begin Menu ZM_SEG
        Caption         =   "&Segment"
        Begin Menu ZM_SEG_AUTODEFINE
            Caption         =   "&Auto-Define"
            Checked         =   -1  'True
        End
        Begin Menu ZM_SEG_SEP1
            Caption         =   "-"
        End
        Begin Menu ZM_SEG_DEFINE
            Caption         =   "&Define"
        End
        Begin Menu ZM_SEG_DELETE
            Caption         =   "De&lete"
        End
        Begin Menu ZM_SEG_ORDER
            Caption         =   "Change &Order"
        End
        Begin Menu ZM_SEG_SEP2
            Caption         =   "-"
        End
        Begin Menu ZM_SEG_PLAY
            Caption         =   "&Play"
        End
        Begin Menu ZM_SEG_PLAYSEQUENCE
            Caption         =   "Play &Sequence"
        End
    End
End
```

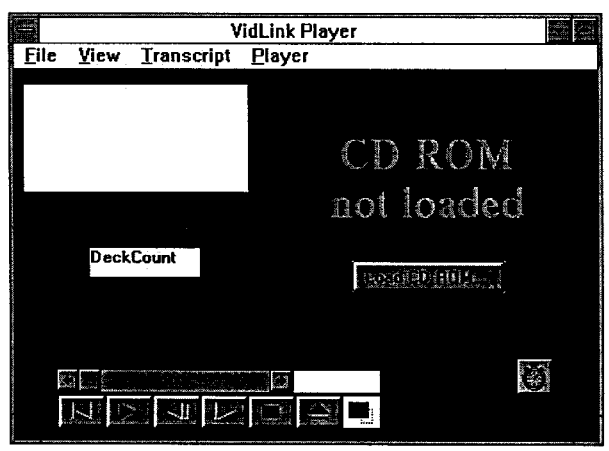
vidplay.bmp

```
VIDPLAY.FRM - 1

VERSION 2.00
Begin Form VidPlay
    BackColor       =   &H00000000&
    BorderStyle     =   1  'Fixed Single
    Caption         =   "VidLink Player"
    ClientHeight    =   4095
    ClientLeft      =   1065
    ClientTop       =   1755
    ClientWidth     =   6480
    Height          =   4785
    Icon            =   (Icon)
    Left            =   1005
    LinkTopic       =   "Form1"
    MaxButton       =   0  'False
    ScaleHeight     =   4095
    ScaleWidth      =   6480
    Top             =   1125
    Width           =   6600
    Begin PictureBox VidPanel
        BackColor       =   &H00000000&
        BorderStyle     =   0  'None
        Height          =   690
        Left            =   450
        ScaleHeight     =   690
        ScaleWidth      =   3600
        TabIndex        =   5
        Top             =   3300
        Width           =   3600
        Begin HScrollBar PlayPosition
            Height          =   270
            Left            =   0
            TabIndex        =   8
            Top             =   15
            Width           =   2610
        End
        Begin MMControl Player
            AutoEnable      =   0  'False
            EjectEnabled    =   -1  'True
            Height          =   405
            Index           =   0
            Left            =   0
            NextVisible     =   0  'False
            PauseVisible    =   0  'False
            PlayEnabled     =   -1  'True
            RecordVisible   =   0  'False
            StopEnabled     =   -1  'True
            TabIndex        =   7
            Top             =   285
            UpdateInterval  =   0
            Width           =   3180
```

```
VIDPLAY.FRM - 2
         End
         Begin PictureBox btnSendToBack
            BackColor       =   &H00FFFFFF&
            BorderStyle     =   0  'None
            Height          =   340
            Left            =   3175
            Picture         =   (Bitmap)
            ScaleHeight     =   345
            ScaleWidth      =   405
            TabIndex        =   6
            Top             =   315
            Width           =   410
         End
         Begin Label PlayTime
            Alignment       =   2  'Center
            BorderStyle     =   1  'Fixed Single
            FontBold        =   0  'False
            FontItalic      =   0  'False
            FontName        =   "Arial"
            FontSize        =   9.75
            FontStrikethru  =   0  'False
            FontUnderline   =   0  'False
            Height          =   270
            Left            =   2610
            TabIndex        =   9
            Top             =   15
            Width           =   990
         End
      End
   End
   Begin PictureBox VidScreen
      BackColor       =   &H00000000&
      BorderStyle     =   0  'None
      Height          =   2985
      Left            =   0
      ScaleHeight     =   2985
      ScaleWidth      =   6405
      TabIndex        =   0
      Top             =   15
      Width           =   6405
      Begin PictureBox MediaOffline
         BackColor       =   &H00808080&
         BorderStyle     =   0  'None
         Height          =   2700
         Left            =   2715
         ScaleHeight     =   2700
         ScaleWidth      =   3600
         TabIndex        =   2
         Top             =   165
         Visible         =   0  'False
         Width           =   3600
```

VIDPLAY.FRM - 3

```
      Begin PictureBox OfflineMessage
         BackColor       =   &H00808080&
         BorderStyle     =   0  'None
         Height          =   1005
         Left            =   705
         Picture         =   (Bitmap)
         ScaleHeight     =   1005
         ScaleWidth      =   2355
         TabIndex        =   4
         Top             =   510
         Width           =   2355
      End
      Begin CommandButton btnLoad
         Caption         =   "Load CD ROM..."
         Height          =   345
         Left            =   1020
         TabIndex        =   3
         Top             =   1935
         Width           =   1710
      End
   End
   Begin MCIWND Video
      AutosizeMovie      =   0      'False
      AutosizeWindow     =   -1     'True
      BorderStyle        =   0      'None
      ErrorDlg           =   0      'False
      Filename           =   ""
      Height             =   1185
      Index              =   0
      Left               =   105
      Menu               =   -1     'True
      Playbar            =   0      'False
      Record             =   0      'False
      Repeat             =   0      'False
      Speed              =   1000
      TimeFormat         =   ""
      TimerFreq          =   500
      Top                =   150
      Visible            =   0      'False
      Volume             =   1000
      WantPosEvent       =   0      'False
      Width              =   2475
      Zoom               =   100
   End
   Begin Label DeckCount
      Caption            =   "DeckCount"
      Height             =   315
      Left               =   825
      TabIndex           =   1
      Top                =   1965
```

VIDPLAY.FRM - 4

```
      Visible         =   0     'False
      Width           =   1215
   End
End
Begin Timer VLTimer
   Left            =   5565
   Top             =   3180
End
Begin Menu IDM_FILE
   Caption         =   "&File"
   Begin Menu IDM_FILE_MOUNT
      Caption         =   "&Load CD ROM..."
   End
   Begin Menu IDM_FILE_EJECT
      Caption         =   "&Unload CD ROM"
   End
   Begin Menu IDM_FILE_SEP1
      Caption         =   "-"
   End
   Begin Menu IDM_FILE_ABOUT
      Caption         =   "A&bout VidLink..."
   End
   Begin Menu IDM_FILE_EXIT
      Caption         =   "E&xit"
   End
End
Begin Menu IDM_VIEW
   Caption         =   "&View"
   Begin Menu IDM_VIEW_REFRESH
      Caption         =   "&Refresh Video"
   End
   Begin Menu IDM_VIEW_SENDTOBACK
      Caption         =   "&Send to Back"
   End
   Begin Menu IDM_VIEW_TRANSCRIPT
      Caption         =   "Activate &Transcript"
   End
   Begin Menu IDM_VIEW_SEP1
      Caption         =   "-"
   End
   Begin Menu IDM_VIEW_DOUBLESIZE
      Caption         =   "&Double Size"
   End
   Begin Menu IDM_VIEW_CLICKMOVE
      Caption         =   "&Click-Move"
   End
   Begin Menu IDM_VIEW_BLACKOUT
      Caption         =   "&Blackout Background"
   End
   Begin Menu IDM_VIEW_ALWAYSONTOP
```

```
VIDPLAY.FRM - 5
            Caption         =   "&Always on Top"
         End
      End
      Begin Menu IDM_TRANSCRIPT
         Caption         =   "&Transcript"
         Begin Menu IDM_TRANSCRIPT_AUTOUPDATE
            Caption         =   "Auto-&Update"
         End
         Begin Menu IDM_TRANSCRIPT_SEP1
            Caption         =   "-"
         End
         Begin Menu IDM_TRANSCRIPT_UPDATETRANSCRIPT
            Caption         =   "Update &Transcript"
         End
         Begin Menu IDM_TRANSCRIPT_UPDATEVIDEO
            Caption         =   "Update &Video"
         End
         Begin Menu IDM_TRANSCRIPT_SEP2
            Caption         =   "-"
         End
         Begin Menu IDM_TRANSCRIPT_TEXTPOSITION
            Caption         =   "Transcript Text &Position..."
         End
      End
      Begin Menu IDM_PLAYER
         Caption         =   "&Player"
         Begin Menu IDM_PLAYER_PLAY
            Caption         =   "&Play"
            Shortcut        =   ^P
         End
         Begin Menu IDM_PLAYER_STOP
            Caption         =   "&Stop"
            Shortcut        =   ^S
         End
         Begin Menu IDM_PLAYER_SEP1
            Caption         =   "-"
         End
         Begin Menu IDM_PLAYER_GOTO
            Caption         =   "&Go to..."
         End
         Begin Menu IDM_PLAYER_SCROLLOPTIONS
            Caption         =   "Scroll &Options..."
         End
      End
      Begin Menu IDM_DEBUG
         Caption         =   "&Debug"
         Visible         =   0   'False
      End
   End
```

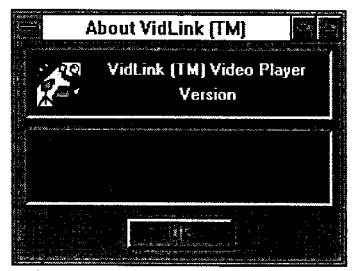
vlabout.bmp

```
VLABOUT.FRM - 1

VERSION 2.00
Begin Form VLAbout
    BorderStyle     =   3  'Fixed Double
    Caption         =   "About VidLink (TM)"
    ClientHeight    =   2430
    ClientLeft      =   2775
    ClientTop       =   2940
    ClientWidth     =   3615
    ControlBox      =   0  'False
    Height          =   2835
    Left            =   2715
    LinkTopic       =   "Form1"
    MaxButton       =   0  'False
    MinButton       =   0  'False
    ScaleHeight     =   2430
    ScaleWidth      =   3615
    Top             =   2595
    Width           =   3735
    Begin SSCommand btnOk
        Caption         =   "Ok"
        Font3D          =   0  'None
        Height          =   360
        Left            =   1200
        Picture         =   (none)
        TabIndex        =   7
        Top             =   1950
        Width           =   1215
    End
    Begin SSPanel pnlFrame
        BackColor       =   &H00C0C0C0&
        BevelOuter      =   1  'Inset
        BevelWidth      =   0
        BorderWidth     =   0
        FloodColor      =   &H00808000&
        Font3D          =   0  'None
        Height          =   2565
        Left            =   0
        TabIndex        =   0
        Top             =   0
        Width           =   3615
        Begin SSPanel pnlNotice
            BackColor       =   &H00808080&
            BevelOuter      =   1  'Inset
            BevelWidth      =   2
            Font3D          =   0  'None
            Height          =   825
            Left            =   105
            ShadowColor     =   1  'Black
            TabIndex        =   4
            Top             =   990
```

VLABOUT.FRM - 2

```
            Width            =   3405
            Begin Label lblCopyright
                Alignment        =   2  'Center
                BackColor        =   &H00808080&
                Caption          =   "Copyright (c) 1996 by JuriTech, Inc."
                FontBold         =   0    'False
                FontItalic       =   0    'False
                FontName         =   "MS Sans Serif"
                FontSize         =   8.25
                FontStrikethru   =   0    'False
                FontUnderline    =   0    'False
                ForeColor        =   &H00000000&
                Height           =   285
                Left             =   135
                TabIndex         =   6
                Top              =   120
                Width            =   3150
            End
            Begin Label lblTrademark
                Alignment        =   2  'Center
                BackColor        =   &H00808080&
                Caption          =   "VidLink(TM) is a Trademark of JuriTech, Inc."
                FontBold         =   0    'False
                FontItalic       =   0    'False
                FontName         =   "MS Sans Serif"
                FontSize         =   8.25
                FontStrikethru   =   0    'False
                FontUnderline    =   0    'False
                ForeColor        =   &H00000000&
                Height           =   315
                Left             =   105
                TabIndex         =   5
                Top              =   420
                Width            =   3165
            End
        End
        Begin SSPanel pnlBanner
            BackColor        =   &H00808080&
            BevelOuter       =   1  'Inset
            BevelWidth       =   2
            Font3D           =   0  'None
            Height           =   750
            Left             =   105
            ShadowColor      =   1  'Black
            TabIndex         =   1
            Top              =   105
            Width            =   3405
            Begin Label lblName
                Alignment        =   2  'Center
                BackColor        =   &H00808080&
```

```
VLABOUT.FRM - 3

Caption         =   "VidLink (TM) Video Player"
                ForeColor       =   &H0000FFFF&
                Height          =   300
                Left            =   750
                TabIndex        =   3
                Top             =   105
                Width           =   2535
            End
            Begin Image iconVN
                BorderStyle     =   1  'Fixed Single
                Height          =   510
                Left            =   105
                Picture         =   (Icon)
                Top             =   120
                Width           =   510
            End
            Begin Label lblVersion
                Alignment       =   2  'Center
                BackColor       =   &H00808080&
                Caption         =   "Version"
                ForeColor       =   &H0000FFFF&
                Height          =   300
                Left            =   750
                TabIndex        =   2
                Top             =   375
                Width           =   2535
            End
        End
    End
End
```

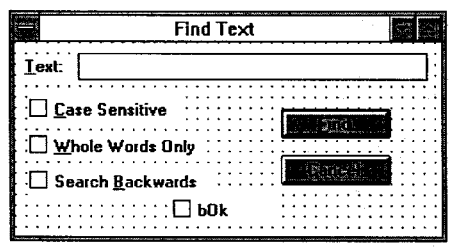
vlfind.bmp

```
VLFIND.FRM - 1

VERSION 2.00
Begin Form FindText
    BorderStyle     =   3   'Fixed Double
    Caption         =   "Find Text"
    ClientHeight    =   1770
    ClientLeft      =   1995
    ClientTop       =   2505
    ClientWidth     =   4755
    ControlBox      =   0   'False
    Height          =   2175
    Left            =   1935
    LinkTopic       =   "Form2"
    MaxButton       =   0   'False
    MinButton       =   0   'False
    ScaleHeight     =   1770
    ScaleWidth      =   4755
    Top             =   2160
    Width           =   4875
    Begin CheckBox bOk
        Caption         =   "bOk"
        Height          =   390
        Left            =   1770
        TabIndex        =   7
        Top             =   1650
        Visible         =   0   'False
        Width           =   1215
    End
    Begin CommandButton btnCancel
        Cancel          =   -1  'True
        Caption         =   "Cancel"
        Height          =   330
        Left            =   2985
        TabIndex        =   6
        Top             =   1245
        Width           =   1215
    End
    Begin CommandButton btnFind
        Caption         =   "&Find"
        Default         =   -1  'True
        Height          =   330
        Left            =   2985
        TabIndex        =   5
        Top             =   735
        Width           =   1215
    End
    Begin CheckBox bBackwards
        Caption         =   "Search &Backwards"
        Height          =   330
        Left            =   165
        TabIndex        =   4
```

VLFIND.FRM - 2

```
         Top             =    1365
         Width           =    2025
      End
      Begin CheckBox bWholeWordsOnly
         Caption         =    "&Whole Words Only"
         Height          =    330
         Left            =    165
         TabIndex        =    3
         Top             =    975
         Width           =    1965
      End
      Begin CheckBox bCaseSensitive
         Caption         =    "&Case Sensitive"
         Height          =    330
         Left            =    160
         TabIndex        =    2
         Top             =    570
         Width           =    1695
      End
      Begin TextBox txtText
         Height          =    300
         Left            =    705
         TabIndex        =    1
         Top             =    120
         Width           =    3900
      End
      Begin Label lblText
         Caption         =    "&Text:"
         Height          =    270
         Left            =    105
         TabIndex        =    0
         Top             =    165
         Width           =    525
      End
   End
End
```

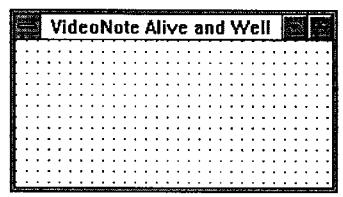
vnalive.bmp

```
VNALIVE.FRM - 1

VERSION 2.00
Begin Form VNAlive
    Caption         =   "VideoNote Alive and Well"
    ClientHeight    =   1620
    ClientLeft      =   2235
    ClientTop       =   2895
    ClientWidth     =   3540
    Height          =   2025
    Left            =   2175
    LinkTopic       =   "Form2"
    ScaleHeight     =   1620
    ScaleWidth      =   3540
    Top             =   2550
    Width           =   3660
End
```

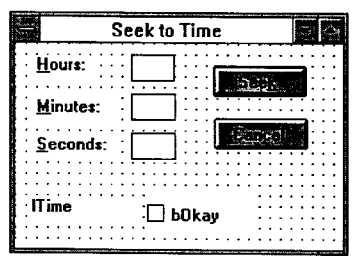
vngoto.bmp

VNGOTO.FRM - 1

```
VERSION 2.00
Begin Form VNGoTo
    BorderStyle     =   3   'Fixed Double
    Caption         =   "Seek to Time"
    ClientHeight    =   1395
    ClientLeft      =   3210
    ClientTop       =   2730
    ClientWidth     =   3705
    ControlBox      =   0   'False
    Height          =   1800
    Left            =   3150
    LinkTopic       =   "Form2"
    MaxButton       =   0   'False
    MinButton       =   0   'False
    ScaleHeight     =   1395
    ScaleWidth      =   3705
    Top             =   2385
    Width           =   3825
    Begin CheckBox bOkay
        Caption         =   "bOkay"
        Height          =   495
        Left            =   1485
        TabIndex        =   8
        Top             =   1635
        Visible         =   0   'False
        Width           =   1215
    End
    Begin CommandButton btnCancel
        Cancel          =   -1  'True
        Caption         =   "Cancel"
        Height          =   345
        Left            =   2250
        TabIndex        =   7
        Top             =   825
        Width           =   1065
    End
    Begin CommandButton btnSeek
        Caption         =   "See&k"
        Default         =   -1  'True
        Height          =   345
        Left            =   2235
        TabIndex        =   6
        Top             =   240
        Width           =   1065
    End
    Begin TextBox txtSeconds
        Height          =   300
        Left            =   1305
        TabIndex        =   5
        Top             =   990
```

```
VNGOTO.FRM - 2
      Width           =   510
   End
   Begin TextBox txtMinutes
      Height          =   300
      Left            =   1305
      TabIndex        =   3
      Top             =   555
      Width           =   510
   End
   Begin TextBox txtHours
      Height          =   300
      Left            =   1305
      TabIndex        =   1
      Top             =   120
      Width           =   495
   End
   Begin Label lTime
      Caption         =   "lTime"
      Height          =   300
      Left            =   180
      TabIndex        =   9
      Top             =   1710
      Width           =   1215
   End
   Begin Label Label3
      Caption         =   "&Seconds:"
      Height          =   270
      Left            =   240
      TabIndex        =   4
      Top             =   1020
      Width           =   945
   End
   Begin Label Label2
      Caption         =   "&Minutes:"
      Height          =   285
      Left            =   240
      TabIndex        =   2
      Top             =   600
      Width           =   855
   End
   Begin Label lblHours
      Caption         =   "&Hours:"
      Height          =   300
      Left            =   240
      TabIndex        =   0
      Top             =   135
      Width           =   645
   End
End
```

| A   | App Event    | M         | Master Event | D           | Deck Event |
|-----|--------------|-----------|--------------|-------------|------------|
| p p | App          | a s t e r | Master       | e c k       | Deck       |
| App State    || Master State            || Deck State               | vnq.bmp

VNQ.FRM - 1

```
VERSION 2.00
Begin Form VNQ
   BorderStyle     =   1   'Fixed Single
   Caption         =   "VidNote Event Queues"
   ClientHeight    =   2115
   ClientLeft      =   960
   ClientTop       =   345
   ClientWidth     =   7965
   ControlBox      =   0   'False
   Height          =   2520
   Icon            =   (Icon)
   Left            =   900
   LinkTopic       =   "Form2"
   MaxButton       =   0   'False
   ScaleHeight     =   2115
   ScaleWidth      =   7965
   Top             =   0
   Width           =   8085
   Begin ListBox Deck
      Height          =   1590
      Left            =   5460
      TabIndex        =   5
      Top             =   270
      Width           =   2505
   End
   Begin ListBox App
      Height          =   1590
      Left            =   225
      TabIndex        =   1
      Top             =   270
      Width           =   2355
   End
   Begin ListBox Master
      Height          =   1590
      Left            =   2760
      TabIndex        =   0
      Top             =   270
      Width           =   2505
   End
   Begin Label lblAppActive
      BorderStyle     =   1   'Fixed Single
      Height          =   255
      Left            =   2220
      TabIndex        =   12
      Top             =   1860
      Width           =   345
   End
   Begin Label lblDeckState
      BorderStyle     =   1   'Fixed Single
      Caption         =   "Deck State"
```

```
VNQ.FRM - 2
      Height          =   255
      Left            =   5260
      TabIndex        =   11
      Top             =   1860
      Width           =   2700
   End
   Begin Label lblMasterState
      BorderStyle     =   1  'Fixed Single
      Caption         =   "Master State"
      Height          =   255
      Left            =   2580
      TabIndex        =   10
      Top             =   1860
      Width           =   2685
   End
   Begin Label lblAppState
      BorderStyle     =   1  'Fixed Single
      Caption         =   "App State"
      Height          =   255
      Left            =   0
      TabIndex        =   9
      Top             =   1860
      Width           =   2235
   End
   Begin Label lblDeckEvent
      BorderStyle     =   1  'Fixed Single
      Caption         =   "Deck Event"
      Height          =   270
      Left            =   5460
      TabIndex        =   8
      Top             =   0
      Width           =   2505
   End
   Begin Label lblMasterEvent
      BorderStyle     =   1  'Fixed Single
      Caption         =   "Master Event"
      Height          =   270
      Left            =   2760
      TabIndex        =   7
      Top             =   0
      Width           =   2505
   End
   Begin Label lblAppEvent
      BorderStyle     =   1  'Fixed Single
      Caption         =   "App Event"
      Height          =   270
      Left            =   225
      TabIndex        =   6
      Top             =   0
      Width           =   2355
```

```
VNQ.FRM - 3
   End
   Begin Label Label3
      BorderStyle     =   1  'Fixed Single
      Caption         =   "D e c k"
      Height          =   1860
      Left            =   5260
      TabIndex        =   4
      Top             =   0
      Width           =   200
      WordWrap        =   -1  'True
   End
   Begin Label Label2
      BorderStyle     =   1  'Fixed Single
      Caption         =   "M a s t e r"
      Height          =   1860
      Left            =   2580
      TabIndex        =   3
      Top             =   0
      Width           =   180
      WordWrap        =   -1  'True
   End
   Begin Label Label1
      BorderStyle     =   1  'Fixed Single
      Caption         =   "A p p"
      Height          =   1860
      Left            =   0
      TabIndex        =   2
      Top             =   0
      Width           =   230
      WordWrap        =   -1  'True
   End
End
```

PART 3.
LIPSYNC
Form text and graphical representation files FRM
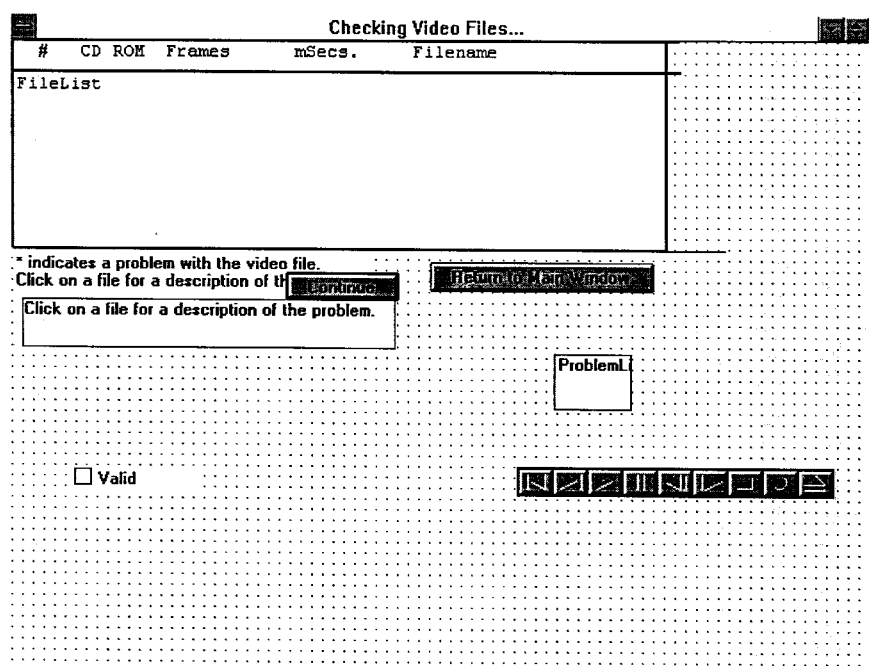
checkfil.bmp

CHECKFIL.FRM - 1

```
VERSION 2.00
Begin Form CheckFiles
    BorderStyle     =   3   'Fixed Double
    Caption         =   "Checking Video Files..."
    ClientHeight    =   2310
    ClientLeft      =   1275
    ClientTop       =   1380
    ClientWidth     =   7365
    ControlBox      =   0   'False
    Height          =   2715
    Left            =   1215
    LinkTopic       =   "Form1"
    MaxButton       =   0   'False
    MinButton       =   0   'False
    ScaleHeight     =   2310
    ScaleWidth      =   7365
    Top             =   1035
    Width           =   7485
    Begin CommandButton btnOk
        Caption     =   "Continue"
        Default     =   -1  'True
        Height      =   315
        Left        =   3075
        TabIndex    =   3
        Top         =   2550
        Width       =   1275
    End
    Begin ListBox ProblemList
        Height      =   615
        Left        =   6090
        TabIndex    =   8
        Top         =   3435
        Visible     =   0   'False
        Width       =   870
    End
    Begin MMControl Player
        Height      =   330
        Left        =   5670
        TabIndex    =   7
        Top         =   4680
        Visible     =   0   'False
        Width       =   3540
    End
    Begin CheckBox bValid
        Caption     =   "Valid"
        Height      =   255
        Left        =   705
        TabIndex    =   6
        TabStop     =   0   'False
        Top         =   4695
```

CHECKFIL.FRM - 2

```
      Visible         =    0     'False
      Width           =    1365
   End
   Begin CommandButton btnCancel
      Cancel          =    -1    'True
      Caption         =    "Return to Main Window"
      Height          =    330
      Left            =    4695
      TabIndex        =    5
      Top             =    2430
      Width           =    2520
   End
   Begin ListBox FileList
      FontBold        =    0     'False
      FontItalic      =    0     'False
      FontName        =    "Courier New"
      FontSize        =    9.75
      FontStrikethru  =    0     'False
      FontUnderline   =    0     'False
      Height          =    1950
      Left            =    15
      TabIndex        =    1
      Top             =    350
      Width           =    7335
   End
   Begin Line Line5
      BorderWidth     =    2
      X1              =    0
      X2              =    7500
      Y1              =    340
      Y2              =    340
   End
   Begin Line Line4
      X1              =    0
      X2              =    7500
      Y1              =    0
      Y2              =    0
   End
   Begin Line Line3
      BorderWidth     =    2
      X1              =    7345
      X2              =    7345
      Y1              =    0
      Y2              =    2280
   End
   Begin Line Line2
      BorderWidth     =    2
      X1              =    15
      X2              =    15
      Y1              =    0
```

```
CHECKFIL.FRM - 3
      Y2              =    2280
   End
   Begin Line Line1
      X1              =    15
      X2              =    8015
      Y1              =    2290
      Y2              =    2290
   End
   Begin Label lblFootnote
      Caption         =    "* indicates a problem with the video file.  Click on
      Height          =    450
      Left            =    45
      TabIndex        =    4
      Top             =    2355
      Width           =    3960
   End
   Begin Label txtProblem
      BorderStyle     =    1  'Fixed Single
      Caption         =    "Click on a file for a description of the problem."
      Height          =    540
      Left            =    120
      TabIndex        =    2
      Top             =    2850
      Width           =    4185
   End
   Begin Label lblHeader
      Caption         =    "  #    CD ROM    Frames       mSecs.      Filename"
      FontBold        =    0   'False
      FontItalic      =    0   'False
      FontName        =    "Courier New"
      FontSize        =    9.75
      FontStrikethru  =    0   'False
      FontUnderline   =    0   'False
      Height          =    345
      Left            =    60
      TabIndex        =    0
      Top             =    0
      Width           =    7365
   End
End
```

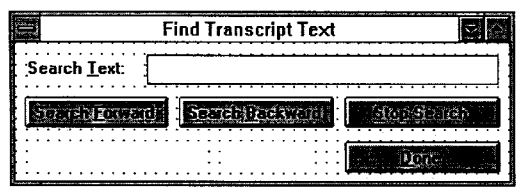
findtext.bmp

FINDTEXT.FRM - 1

```
VERSION 2.00
Begin Form FindText
   BorderStyle     =   3   'Fixed Double
   Caption         =   "Find Transcript Text"
   ClientHeight    =   1530
   ClientLeft      =   2235
   ClientTop       =   1785
   ClientWidth     =   5535
   ControlBox      =   0   'False
   Height          =   1935
   Left            =   2175
   LinkTopic       =   "Form2"
   MaxButton       =   0   'False
   MinButton       =   0   'False
   ScaleHeight     =   1530
   ScaleWidth      =   5535
   Top             =   1440
   Width           =   5655
   Begin CommandButton btnDone
      Caption         =   "&Done"
      Height          =   345
      Left            =   3690
      TabIndex        =   7
      Top             =   1095
      Width           =   1740
   End
   Begin CommandButton btnStop
      Caption         =   "&Stop Search"
      Enabled         =   0   'False
      Height          =   345
      Left            =   3690
      TabIndex        =   6
      Top             =   600
      Width           =   1740
   End
   Begin CommandButton btnBackward
      Caption         =   "Search &Backward"
      Height          =   345
      Left            =   1830
      TabIndex        =   5
      Top             =   600
      Width           =   1740
   End
   Begin CommandButton btnForward
      Caption         =   "Search &Forward"
      Height          =   345
      Left            =   105
      TabIndex        =   4
      Top             =   600
      Width           =   1605
```

FINDTEXT.FRM - 2

```
   End
   Begin TextBox txtSearchText
      FontBold         =   0   'False
      FontItalic       =   0   'False
      FontName         =   "Arial"
      FontSize         =   8.25
      FontStrikethru   =   0   'False
      FontUnderline    =   0   'False
      Height           =   330
      Left             =   1470
      TabIndex         =   1
      Top              =   135
      Width            =   3945
   End
   Begin Label lblSearchLine
      FontBold         =   0   'False
      FontItalic       =   0   'False
      FontName         =   "Arial"
      FontSize         =   9.75
      FontStrikethru   =   0   'False
      FontUnderline    =   0   'False
      Height           =   315
      Left             =   2355
      TabIndex         =   3
      Top              =   1110
      Width            =   945
   End
   Begin Label lblSearching
      FontBold         =   0   'False
      FontItalic       =   0   'False
      FontName         =   "Arial"
      FontSize         =   9.75
      FontStrikethru   =   0   'False
      FontUnderline    =   0   'False
      Height           =   300
      Left             =   135
      TabIndex         =   2
      Top              =   1110
      Width            =   1965
   End
   Begin Label lblSearchText
      Caption          =   "Search &Text:"
      Height           =   285
      Left             =   135
      TabIndex         =   0
      Top              =   180
      Width            =   1230
   End
End
```

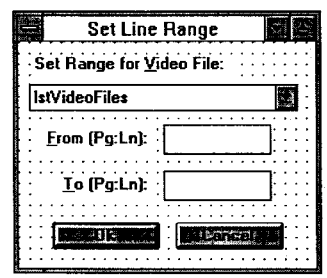
linerang.bmp

LINERANG.FRM - 1

```
VERSION 2.00
Begin Form LineRange
   BorderStyle      =    3    'Fixed Double
   Caption          =    "Set Line Range"
   ClientHeight     =    2505
   ClientLeft       =    2910
   ClientTop        =    1875
   ClientWidth      =    3345
   ControlBox       =    0    'False
   Height           =    2910
   Left             =    2850
   LinkTopic        =    "Form1"
   MaxButton        =    0    'False
   MinButton        =    0    'False
   ScaleHeight      =    2505
   ScaleWidth       =    3345
   Top              =    1530
   Width            =    3465
   Begin CommandButton btnCancel
      Cancel           =    -1   'True
      Caption          =    "Cancel"
      Height           =    300
      Left             =    1770
      TabIndex         =    7
      Top              =    1995
      Width            =    1215
   End
   Begin CommandButton btnOk
      Caption          =    "Ok"
      Default          =    -1   'True
      Height           =    300
      Left             =    375
      TabIndex         =    6
      Top              =    1995
      Width            =    1215
   End
   Begin TextBox txtTo
      Height           =    330
      Left             =    1635
      TabIndex         =    5
      Top              =    1425
      Width            =    1215
   End
   Begin TextBox txtFrom
      Height           =    330
      Left             =    1635
      TabIndex         =    3
      Top              =    915
      Width            =    1215
   End
```

```
LINERANG.FRM - 2

Begin ComboBox lstVideoFiles
        Height       =   300
        Left         =   120
        Style        =   2  'Dropdown List
        TabIndex     =   1

Top          =   465
        Width        =   3030
    End
    Begin Label lblTo
        Alignment    =   1  'Right Justify
        Caption      =   "&To (Pg:Ln):"
        Height       =   255
        Left         =   180
        TabIndex     =   4
        Top          =   1470
        Width        =   1290
    End
    Begin Label lblFrom
        Alignment    =   1  'Right Justify
        Caption      =   "&From (Pg:Ln):"
        Height       =   255
        Left         =   180
        TabIndex     =   2
        Top          =   960
        Width        =   1290
    End
    Begin Label lblVideoFiles
        Caption      =   "Set Range for &Video File:"
        Height       =   255
        Left         =   180
        TabIndex     =   0
        Top          =   135
        Width        =   2265
    End
End
```

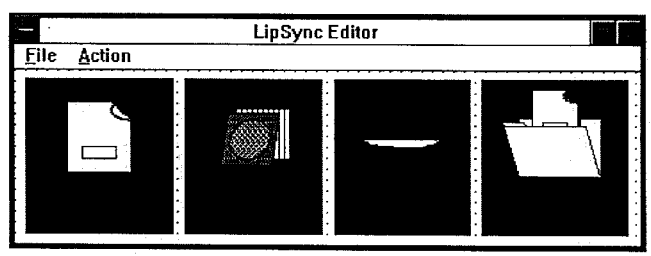
lipsync.bmp

```
LIPSYNC.FRM - 1

VERSION 2.00
Begin Form LS
   BackColor       =   &H0080FF80&
   BorderStyle     =   1  'Fixed Single
   Caption         =   "LipSync Editor"
   ClientHeight    =   1920
   ClientLeft      =   1350
   ClientTop       =   2760
   ClientWidth     =   7020
   Height          =   2610
   Icon            =   (Icon)
   Left            =   1290
   LinkTopic       =   "Form1"
   MaxButton       =   0  'False
   ScaleHeight     =   1920
   ScaleWidth      =   7020
   Top             =   2130
   Width           =   7140
   Begin PictureBox btnMakeSync
      BackColor       =   &H00FFFF00&
      Height          =   1725
      Left            =   5235
      Picture         =   (Bitmap)
      ScaleHeight     =   1695
      ScaleWidth      =   1620
      TabIndex        =   3
      Top             =   90
      Width           =   1650
   End
   Begin PictureBox btnVideoFilesList
      BackColor       =   &H00FFFF00&
      Height          =   1725
      Left            =   1890
      Picture         =   (Bitmap)
      ScaleHeight     =   1695
      ScaleWidth      =   1515
      TabIndex        =   2
      Top             =   90
      Width           =   1545
   End
   Begin PictureBox btnSyncVideo
      BackColor       =   &H00FFFF00&
      Height          =   1725
      Left            =   3570
      Picture         =   (Bitmap)
      ScaleHeight     =   1695
      ScaleWidth      =   1515
      TabIndex        =   1
      Top             =   90
      Width           =   1545
```

LIPSYNC.FRM - 2

```
   End
   Begin PictureBox btnTransInfo
      BackColor       =   &H00FFFF00&
      Height          =   1725
      Left            =   120
      Picture         =   (Bitmap)
      ScaleHeight     =   1695
      ScaleWidth      =   1620
      TabIndex        =   0
      Top             =   90
      Width           =   1650
   End
   Begin Label lblFindText
      Height          =   285
      Left            =   1905
      TabIndex        =   4
      Top             =   4035
      Visible         =   0   'False
      Width           =   1665
   End
   Begin Menu IDM_FILE
      Caption         =   "&File"
      Begin Menu IDM_FILE_NEW
         Caption         =   "&New"
      End
      Begin Menu IDM_FILE_OPEN
         Caption         =   "&Open..."
      End
      Begin Menu IDM_FILE_SAVE
         Caption         =   "&Save"
      End
      Begin Menu IDM_FILE_SAVEAS
         Caption         =   "Save &As..."
      End
      Begin Menu IDM_FILE_SEP1
         Caption         =   "-"
      End
      Begin Menu IDM_FILE_IMPORT
         Caption         =   "&Import SYN File..."
      End
      Begin Menu IDM_FILE_SEP2
         Caption         =   "-"
      End
      Begin Menu IDM_FILE_ABOUT
         Caption         =   "A&bout LipSync..."
      End
      Begin Menu IDM_FILE_EXIT
         Caption         =   "E&xit"
      End
   End
```

```
LIPSYNC.FRM - 3
    Begin Menu IDM_EDIT
        Caption         =   "&Action"
        Begin Menu IDM_ACTION_TRANSCRIPTINFO
            Caption         =   "&Transcript Info..."
        End
        Begin Menu IDM_ACTION_VIDEOFILES
            Caption         =   "&Video Files List..."
        End
        Begin Menu IDM_ACTION_SYNCVIDEO
            Caption         =   "&Sync Video..."
        End
        Begin Menu IDM_ACTION_MAKESYNC
            Caption         =   "&Make SYN File..."
        End
    End
    Begin Menu IDM_DEBUG
        Caption         =   "&Debug"
        Visible         =   0   'False
        Begin Menu IDM_DEBUG_STATE
            Caption         =   "&Internal State"
        End
    End
End
```

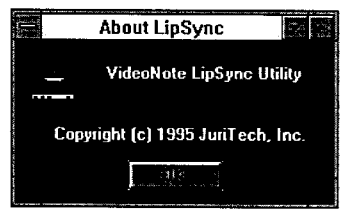
lsabout.bmp

LSABOUT.FRM - 1

```
VERSION 2.00
Begin Form LipSyncAbout
   BackColor       =   &H00000080&
   BorderStyle     =   3  'Fixed Double
   Caption         =   "About LipSync"
   ClientHeight    =   1785
   ClientLeft      =   2475
   ClientTop       =   2760
   ClientWidth     =   3525
   ControlBox      =   0  'False
   Height          =   2190
   Left            =   2415
   LinkTopic       =   "Form1"
   MaxButton       =   0  'False
   MinButton       =   0  'False
   ScaleHeight     =   1785
   ScaleWidth      =   3525
   Top             =   2415
   Width           =   3645
   Begin CommandButton btnOk
      Caption         =   "OK"
      Height          =   330
      Left            =   1245
      TabIndex        =   2
      Top             =   1320
      Width           =   1065
   End
   Begin Label lblVersion
      Alignment       =   2  'Center
      BackColor       =   &H00000080&
      ForeColor       =   &H00FFFFFF&
      Height          =   270
      Left            =   1335
      TabIndex        =   3
      Top             =   540
      Width           =   1470
   End
   Begin Label Label2
      BackColor       =   &H00000080&
      Caption         =   "Copyright (c) 1995 JuriTech, Inc."
      ForeColor       =   &H00FFFFFF&
      Height          =   270
      Left            =   420
      TabIndex        =   1
      Top             =   930
      Width           =   3105
   End
   Begin Label Label1
      BackColor       =   &H00000080&
      Caption         =   "VideoNote LipSync Utility"
```

```
LSABOUT.FRM - 2
      ForeColor           &H00FFFFFF&
      Height          =   270
      Left            =   1005
      TabIndex        =   0
      Top             =   255
      Width           =   2310
   End
   Begin Image Image1
      Height          =   480
      Left            =   165
      Picture         =   (Icon)
      Top             =   180
      Width           =   480
   End
End
```

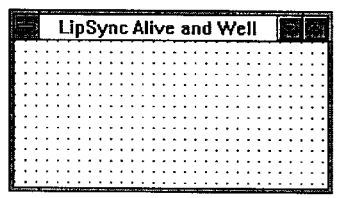
lsalive.bmp

LSALIVE.FRM - 1

```
VERSION 2.00
Begin Form LSAlive
   Caption         =   "LipSync Alive and Well"
   ClientHeight    =   1620
   ClientLeft      =   2805
   ClientTop       =   3270
   ClientWidth     =   3540
   Height          =   2025
   Left            =   2745
   LinkTopic       =   "Form2"
   ScaleHeight     =   1620
   ScaleWidth      =   3540
   Top             =   2925
   Width           =   3660
End
```

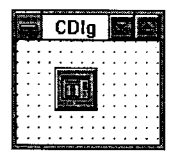
lscd.bmp

```
LSCD.FRM - 1

VERSION 2.00
Begin Form LSCD
   Caption         =   "CDlg"
   ClientHeight    =   1155
   ClientLeft      =   1095
   ClientTop       =   1485
   ClientWidth     =   1590
   Height          =   1560
   Left            =   1035
   LinkTopic       =   "Form1"
   ScaleHeight     =   1155
   ScaleWidth      =   1590
   Top             =   1140
   Width           =   1710
   Begin CommonDialog d
      Left            =   420
      Top             =   300
   End
End
```

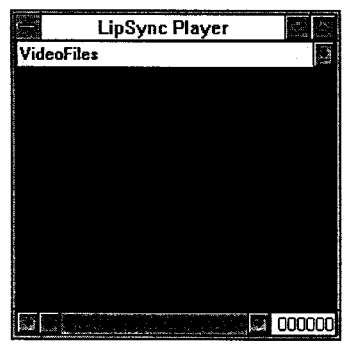
lsviewer.bmp

```
LSVIEWER.FRM - 1

VERSION 2.00
Begin Form LSViewer
   BorderStyle     =   1  'Fixed Single
   Caption         =   "LipSync Player"
   ClientHeight    =   3255
   ClientLeft      =   2835
   ClientTop       =   375
   ClientWidth     =   3585
   ControlBox      =   0  'False
   FontBold        =   0  'False
   FontItalic      =   0  'False
   FontName        =   "MS Sans Serif"
   FontSize        =   8.25
   FontStrikethru  =   0  'False
   FontUnderline   =   0  'False
   Height          =   3660
   Icon            =   (Icon)
   KeyPreview      =   -1 'True
   Left            =   2775
   LinkTopic       =   "Form1"
   MaxButton       =   0  'False
   ScaleHeight     =   3255
   ScaleWidth      =   3585
   Top             =   30
   Width           =   3705
   Begin ComboBox VideoFiles
      Height       =   300
      Left         =   0
      Style        =   2  'Dropdown List
      TabIndex     =   4

Top          =   0
      Width        =   3580
   End
   Begin HScrollBar PlayPosition
      Height       =   270
      Left         =   0
      TabIndex     =   2
      Top          =   3000
      Width        =   2850
   End
   Begin PictureBox PlayWindow
      BackColor    =   &H00000000&
      Height       =   2720
      Left         =   0
      ScaleHeight  =   2685
      ScaleWidth   =   3555
      TabIndex     =   1
      Top          =   285
      Width        =   3590
```

LSVIEWER.FRM - 2

```
      End
      Begin MMControl Player
         EjectVisible    =   0      'False
         Height          =   450
         Left            =   0
         NextVisible     =   0      'False
         RecordVisible   =   0      'False
         TabIndex        =   0
         Top             =   -500
         Width           =   3450
      End
      Begin Label SeekTo
         Caption         =   "Seek To"
         Height          =   495
         Left            =   -1500
         TabIndex        =   5
         Top             =   1380
         Width           =   1215
      End
      Begin Label Counter
         Alignment       =   1      'Right Justify
         BorderStyle     =   1      'Fixed Single
         Caption         =   "000000"
         FontBold        =   0      'False
         FontItalic      =   0      'False
         FontName        =   "Arial"
         FontSize        =   9.75
         FontStrikethru  =   0      'False
         FontUnderline   =   0      'False
         Height          =   270
         Left            =   2850
         TabIndex        =   3
         Top             =   3000
         Width           =   740
      End
   End
End
```

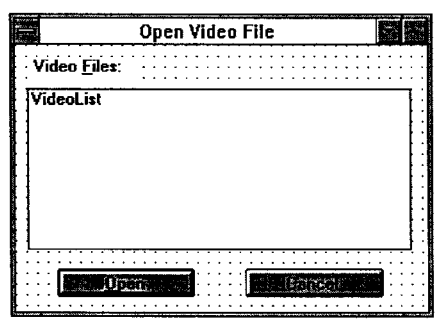
openvide.bmp

```
OPENVIDE.FRM - 1

VERSION 2.00
Begin Form OpenVideo
   BorderStyle       =   3  'Fixed Double
   Caption           =   "Open Video File"
   ClientHeight      =   2955
   ClientLeft        =   2610
   ClientTop         =   2415
   ClientWidth       =   4620
   ControlBox        =   0  'False
   Height            =   3360
   Left              =   2550
   LinkTopic         =   "Form2"
   MaxButton         =   0  'False
   MinButton         =   0  'False
   ScaleHeight       =   2955
   ScaleWidth        =   4620
   Top               =   2070
   Width             =   4740
   Begin CommandButton btnCancel
      Cancel         =   -1  'True
      Caption        =   "Cancel"
      Height         =   315
      Left           =   2580
      TabIndex       =   3
      Top            =   2475
      Width          =   1545
   End
   Begin CommandButton btnOpen
      Caption        =   "&Open"
      Default        =   -1  'True
      Height         =   315
      Left           =   465
      TabIndex       =   2
      Top            =   2475
      Width          =   1545
   End
   Begin ListBox VideoList
      Height         =   1785
      Left           =   135
      TabIndex       =   1
      Top            =   480
      Width          =   4305
   End
   Begin Label lblVideoFiles
      Caption        =   "Video &Files:"
      Height         =   270
      Left           =   210
      TabIndex       =   0
      Top            =   135
      Width          =   1125
```

```
OPENVIDE.FRM - 2
   End
End
```

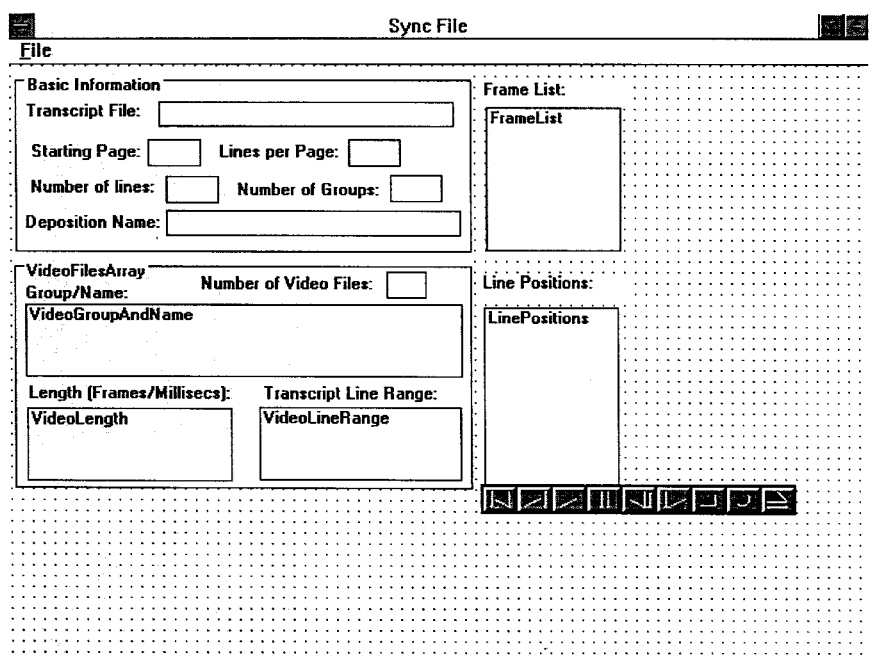
syncfile.bmp

```
SYNCFILE.FRM - 1

VERSION 2.00
Begin Form SyncFile
   BorderStyle     =   1   'Fixed Single
   Caption         =   "Sync File"
   ClientHeight    =   4755
   ClientLeft      =   720
   ClientTop       =   1800
   ClientWidth     =   6915
   ControlBox      =   0   'False
   Height          =   5445
   Left            =   660
   LinkTopic       =   "Form1"
   MaxButton       =   0   'False
   ScaleHeight     =   4755
   ScaleWidth      =   6915
   Top             =   1170
   Width           =   7035
   Begin MMControl Player
      Height       =   330
      Left         =   5220
      TabIndex     =   26
      Top          =   4620
      Visible      =   0   'False
      Width        =   3540
   End
   Begin ListBox LinePositions
      Height       =   1980
      Left         =   5265
      TabIndex     =   0
      Top          =   2670
      Width        =   1515
   End
   Begin ListBox FrameList
      Height       =   1590
      Left         =   5295
      TabIndex     =   1
      Top          =   465
      Width        =   1515
   End
   Begin Frame VideoFilesArray
      Caption      =   "VideoFilesArray"
      Height       =   2550
      Left         =   45
      TabIndex     =   15
      Top          =   2130
      Width        =   5085
      Begin ListBox VideoLineRange
         Height    =   810
         Left      =   2700
         TabIndex  =   21
```

```
SYNCFILE.FRM - 2
         Top             =   1650
         Width           =   2265
      End
      Begin ListBox VideoLength
         Height          =   810
         Left            =   135
         TabIndex        =   19
         Top             =   1665
         Width           =   2265
      End
      Begin ListBox VideoGroupAndName
         Height          =   810
         Left            =   120
         TabIndex        =   18
         Top             =   510
         Width           =   4860
      End
      Begin Label lblVideoFiles
         Caption         =   "Number of Video Files:"
         Height          =   285
         Left            =   2055
         TabIndex        =   7
         Top             =   180
         Width           =   1950
      End
      Begin Label txtVideoFiles
         BorderStyle     =   1  'Fixed Single
         Height          =   300
         Left            =   4125
         TabIndex        =   10
         Top             =   150
         Width           =   450
      End
      Begin Label lblLineRange
         Caption         =   "Transcript Line Range:"
         Height          =   210
         Left            =   2745
         TabIndex        =   22
         Top             =   1395
         Width           =   2040
      End
      Begin Label lblVideoLength
         Caption         =   "Length (Frames/Millisecs):"
         Height          =   210
         Left            =   150
         TabIndex        =   20
         Top             =   1395
         Width           =   2355
      End
      Begin Label lblVideoGroupAndName
```

```
SYNCFILE.FRM - 3
            Caption         =   "Group/Name:"
            Height          =   240
            Left            =   120
            TabIndex        =   17
            Top             =   285
            Width           =   1380
        End
    End
    Begin Frame BasicInfo
        Caption         =   "Basic Information"
        Height          =   1995
        Left            =   60
        TabIndex        =   2
        Top             =   75
        Width           =   5070
        Begin Label lblNumGroups
            Caption         =   "Number of Groups:"
            Height          =   285
            Left            =   2445
            TabIndex        =   16
            Top             =   1200
            Width           =   1605
        End
        Begin Label txtNumGroups
            BorderStyle     =   1  'Fixed Single
            Height          =   300
            Left            =   4155
            TabIndex        =   23
            Top             =   1140
            Width           =   585
        End
        Begin Label txtNumLines
            BorderStyle     =   1  'Fixed Single
            Height          =   300
            Left            =   1665
            TabIndex        =   14
            Top             =   1155
            Width           =   585
        End
        Begin Label lblTotalLines
            Caption         =   "Number of lines:"
            Height          =   285
            Left            =   165
            TabIndex        =   13
            Top             =   1170
            Width           =   1455
        End
        Begin Label txtDeposition
            BorderStyle     =   1  'Fixed Single
            Height          =   285
```

```
SYNCFILE.FRM - 4
        Left            =   1665
        TabIndex        =   12
        Top             =   1530
        Width           =   3285
     End
     Begin Label lblDeposition
        Caption         =   "Deposition Name:"
        Height          =   270
        Left            =   105
        TabIndex        =   11
        Top             =   1560
        Width           =   1515
     End
     Begin Label txtLinesPerPage
        BorderStyle     =   1  'Fixed Single
        Height          =   300
        Left            =   3690
        TabIndex        =   9
        Top             =   750
        Width           =   585
     End
     Begin Label lblLinesPerPage
        Caption         =   "Lines per Page:"
        Height          =   285
        Left            =   2250
        TabIndex        =   8
        Top             =   780
        Width           =   1350
     End
     Begin Label txtStartingPage
        BorderStyle     =   1  'Fixed Single
        Height          =   300
        Left            =   1470
        TabIndex        =   6
        Top             =   750
        Width           =   585
     End
     Begin Label lblStartingPage
        Caption         =   "Starting Page:"
        Height          =   285
        Left            =   180
        TabIndex        =   5
        Top             =   780
        Width           =   1290
     End
     Begin Label txtTransFile
        BorderStyle     =   1  'Fixed Single
        Height          =   285
        Left            =   1590
        TabIndex        =   4
```

```
SYNCFILE.FRM - 5

Top             =   330
            Width           =   3285
        End
        Begin Label lblTransFile
            Caption         =   "Transcript File:"
            Height          =   270
            Left            =   120
            TabIndex        =   3
            Top             =   330
            Width           =   1395
        End
    End
    Begin Label Label1
        Caption             =   "Line Positions:"
        Height              =   270
        Left                =   5250
        TabIndex            =   24
        Top                 =   2295
        Width               =   1620
    End
    Begin Label lblFrameList
        Caption             =   "Frame List:"
        Height              =   270
        Left                =   5265
        TabIndex            =   25
        Top                 =   165
        Width               =   1620
    End
    Begin Menu IDM_FILE
        Caption             =   "&File"
        Begin Menu IDM_FILE_GETDATA
            Caption         =   "&Get Data"
        End
        Begin Menu IDM_FILE_SEP3
            Caption         =   "-"
        End
        Begin Menu IDM_FILE_READTVI
            Caption         =   "Read &TVI"
        End
        Begin Menu IDM_FILE_UPDATEDEPO
            Caption         =   "&Update Deposition"
        End
        Begin Menu IDM_FILE_SEP1
            Caption         =   "-"
        End
        Begin Menu IDM_FILE_EXIT
            Caption         =   "E&xit"
        End
    End
End
```

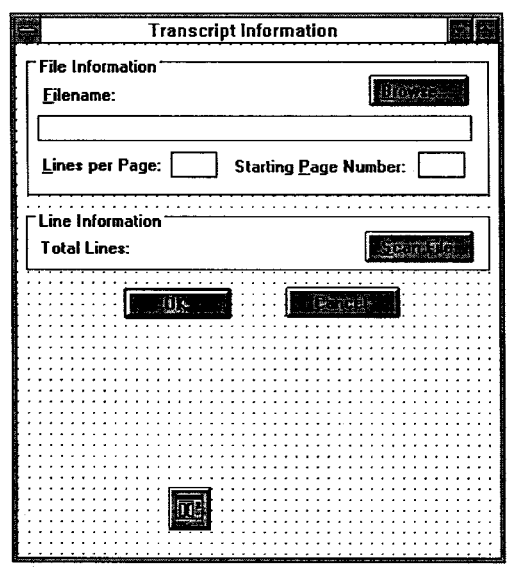
transinf.bmp

TRANSINF.FRM - 1

```
VERSION 2.00
Begin Form TranscriptInfo
   BorderStyle     =   3  'Fixed Double
   Caption         =   "Transcript Information"
   ClientHeight    =   3180
   ClientLeft      =   1110
   ClientTop       =   1635
   ClientWidth     =   5400
   ControlBox      =   0  'False
   Height          =   3585
   Left            =   1050
   LinkTopic       =   "Form2"
   MaxButton       =   0  'False
   MinButton       =   0  'False
   ScaleHeight     =   3180
   ScaleWidth      =   5400
   Top             =   1290
   Width           =   5520
   Begin Frame FileInfo
      Caption         =   "File Information"
      Height          =   1575
      Left            =   120
      TabIndex        =   0
      Top             =   105
      Width           =   5175
      Begin TextBox txtFilename
         Height          =   285
         Left            =   120
         TabIndex        =   3
         Top             =   690
         Width           =   4860
      End
      Begin CommandButton btnBrowse
         Caption         =   "&Browse..."
         Height          =   350
         Left            =   3840
         TabIndex        =   2
         Top             =   240
         Width           =   1110
      End
      Begin TextBox txtStartingPage
         Height          =   285
         Left            =   4380
         TabIndex        =   7
         Top             =   1095
         Width           =   525
      End
      Begin TextBox txtLinesPerPage
         Height          =   285
         Left            =   1610
```

TRANSINF.FRM - 2

```
      TabIndex        =   5
      Top             =   1095
      Width           =   525
   End
   Begin Label lblStartingPage
      Caption         =   "Starting &Page Number:"
      Height          =   195
      Left            =   2325
      TabIndex        =   6
      Top             =   1155
      Width           =   1995
   End
   Begin Label lblLinesPerPage
      Caption         =   "&Lines per Page:"
      Height          =   255
      Left            =   165
      TabIndex        =   4
      Top             =   1140
      Width           =   1410
   End
   Begin Label lblFilename
      Caption         =   "&Filename:"
      Height          =   225
      Left            =   180
      TabIndex        =   1
      Top             =   360
      Width           =   960
   End
End
Begin Frame LineInfo
   Caption            =   "Line Information"
   Height             =   690
   Left               =   105
   TabIndex           =   8
   Top                =   1815
   Width              =   5190
   Begin CommandButton btnScan
      Caption         =   "&Scan File"
      Height          =   350
      Left            =   3795
      TabIndex        =   11
      Top             =   255
      Width           =   1215
   End
   Begin Label txtNumLines
      Height          =   255
      Left            =   1260
      TabIndex        =   10
      Top             =   345
      Width           =   2415
```

TRANSINF.FRM - 3

```
      End
      Begin Label lblNumLines
         Caption        =   "Total Lines:"
         Height         =   255
         Left           =   150
         TabIndex       =   9
         Top            =   345
         Width          =   1140
      End
   End
   Begin CommonDialog Cdlg
      Left           =   1680
      Top            =   4905
   End
   Begin CommandButton btnCancel
      Cancel         =   -1  'True
      Caption        =   "Cancel"
      Height         =   350
      Left           =   3015
      TabIndex       =   13
      Top            =   2685
      Width          =   1275
   End
   Begin CommandButton btnOk
      Caption        =   "OK"
      Default        =   -1  'True
      Height         =   350
      Left           =   1185
      TabIndex       =   12
      Top            =   2700
      Width          =   1215
   End
End
```

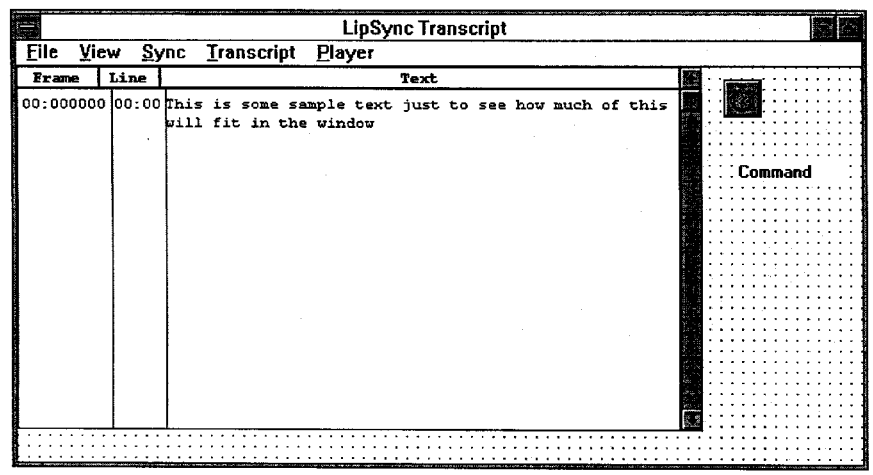
trnscrpt.bmp

```
TRNSCRPT.FRM - 1

VERSION 2.00
Begin Form Transcript
   Caption         =   "LipSync Transcript"
   ClientHeight    =   2595
   ClientLeft      =   45
   ClientTop       =   4530
   ClientWidth     =   9495
   ControlBox      =   0   'False
   Height          =   3285
   Icon            =   (Icon)
   KeyPreview      =   -1  'True
   Left            =   -15
   LinkTopic       =   "Form2"
   ScaleHeight     =   2595
   ScaleWidth      =   9495
   Top             =   3900
   Width           =   9615
   Begin Timer LinkTimer
      Left         =   7845
      Top          =   135
   End
   Begin TextBox txtFrame
      FontBold        =   0   'False
      FontItalic      =   0   'False
      FontName        =   "Courier New"
      FontSize        =   8.25
      FontStrikethru  =   0   'False
      FontUnderline   =   0   'False
      Height          =   3775
      Left            =   0
      MultiLine       =   -1  'True
      TabIndex        =   3
      TabStop         =   0   'False
      Text            =   "00:000000"
      Top             =   240
      Width           =   1075
   End
   Begin TextBox txtLine
      FontBold        =   0   'False
      FontItalic      =   0   'False
      FontName        =   "Courier New"
      FontSize        =   8.25
      FontStrikethru  =   0   'False
      FontUnderline   =   0   'False
      Height          =   3775
      Left            =   925
      MultiLine       =   -1  'True
      TabIndex        =   0
      TabStop         =   0   'False
      Text            =   "000:00"
```

TRNSCRPT.FRM - 2

```
      Top             =   240
      Width           =   750
   End
   Begin VScrollBar TransPos
      Height          =   4020
      Left            =   7365
      TabIndex        =   6
      Top             =   0
      Width           =   240
   End
   Begin TextBox txtText
      FontBold        =   0   'False
      FontItalic      =   0   'False
      FontName        =   "Courier New"
      FontSize        =   8.25
      FontStrikethru  =   0   'False
      FontUnderline   =   0   'False
      Height          =   3775
      HideSelection   =   0   'False
      Left            =   1600
      MultiLine       =   -1  'True
      TabIndex        =   5
      TabStop         =   0   'False
      Text            =   "This is some sample text just to see how much of this
      Top             =   240
      Width           =   5755
   End
   Begin Label txtCommand
      Caption         =   "Command"
      Height          =   240
      Left            =   7995
      TabIndex        =   8
      Top             =   1050
      Visible         =   0   'False
      Width           =   1215
   End
   Begin Label lblText
      Alignment       =   2   'Center
      BorderStyle     =   1   'Fixed Single
      Caption         =   "Text"
      FontBold        =   -1  'True
      FontItalic      =   0   'False
      FontName        =   "Courier New"
      FontSize        =   8.25
      FontStrikethru  =   0   'False
      FontUnderline   =   0   'False
      Height          =   240
      Left            =   1600
      TabIndex        =   4
      Top             =   0
```

TRNSCRPT.FRM - 3

```
      Width           =   5755
   End
   Begin Label lblFrame
      Alignment       =   2  'Center
      BorderStyle     =   1  'Fixed Single
      Caption         =   "Frame"
      FontBold        =   -1 'True
      FontItalic      =   0  'False
      FontName        =   "Courier New"
      FontSize        =   8.25
      FontStrikethru  =   0  'False
      FontUnderline   =   0  'False
      Height          =   240
      Left            =   0
      TabIndex        =   2
      Top             =   0
      Width           =   925
   End
   Begin Label lblLine
      Alignment       =   2  'Center
      BorderStyle     =   1  'Fixed Single
      Caption         =   "Line"
      FontBold        =   -1 'True
      FontItalic      =   0  'False
      FontName        =   "Courier New"
      FontSize        =   8.25
      FontStrikethru  =   0  'False
      FontUnderline   =   0  'False
      Height          =   240
      Left            =   925
      TabIndex        =   1
      Top             =   0
      Width           =   675
   End
   Begin Label nCurLine
      Height          =   405
      Left            =   0
      TabIndex        =   7
      Top             =   0
      Visible         =   0  'False
      Width           =   1035
   End
   Begin Menu IDM_FILE
      Caption         =   "&File"
      Begin Menu IDM_FILE_VALIDATE
         Caption      =   "&Validate"
      End
      Begin Menu IDM_FILE_SEP1
         Caption      =   "-"
      End
```

TRNSCRPT.FRM - 4    FILE

```
    Begin Menu IDM_FILE_SAVE
        Caption         =   "&Save"
    End
    Begin Menu IDM_FILE_SAVEAS
        Caption         =   "Save &As..."
    End
    Begin Menu IDM_FILE_SEP2
        Caption         =   "-"
    End
    Begin Menu IDM_FILE_DONE
        Caption         =   "&Return to Main Window"
    End
End
Begin Menu IDM_VIEW
    Caption         =   "&View"
    Begin Menu IDM_VIEW_ALL
        Caption         =   "&All"
    End
    Begin Menu IDM_VIEW_TEXTONLY
        Caption         =   "&Text Only"
    End
    Begin Menu IDM_SEP1
        Caption         =   "-"
    End
    Begin Menu IDM_VIEW_LINE
        Caption         =   "Transcript &Line"
    End
    Begin Menu IDM_VIEW_FRAME
        Caption         =   "&Video Frame"
    End
End
Begin Menu IDM_SYNC
    Caption         =   "&Sync"
    Begin Menu IDM_SYNC_SYNC
        Caption         =   "&Sync Current Line (Enter)"
    End
    Begin Menu IDM_SYNC_UNSYNC
        Caption         =   "&Unsync (Backspace)"
    End
    Begin Menu IDM_SYNC_SEP1
        Caption         =   "-"
    End
    Begin Menu IDM_SYNC_SETLINERANGE
        Caption         =   "Set Line &Range..."
    End
    Begin Menu IDM_SYNC_SEP2
        Caption         =   "-"
    End
    Begin Menu IDM_SYNC_LINK
        Caption         =   "Simulate &Link"
```

TRNSCRPT.FRM - 5

```
        End
    End
    Begin Menu IDM_TRANS
        Caption         =   "&Transcript"
        Begin Menu IDM_TRANS_GOTOLINE
            Caption         =   "Go to &Line..."
        End
        Begin Menu IDM_TRANS_MATCHVIDEO
            Caption         =   "&Match Transcript to Video Frame"
        End
        Begin Menu IDM_TRANS_SEP1
            Caption         =   "-"
        End
        Begin Menu IDM_TRANS_FIND
            Caption         =   "&Find Text..."
        End
        Begin Menu IDM_TRANS_SEP2
            Caption         =   "-"
        End
        Begin Menu IDM_TRANS_FINDGAP
            Caption         =   "Find Next Frame &Gap"
        End
        Begin Menu IDM_TRANS_NEXTBOUND
            Caption         =   "Find &Next File Boundary"
        End
        Begin Menu IDM_TRANS_PREVBOUND
            Caption         =   "Find &Previous File Boundary"
        End
    End
    Begin Menu IDM_PLAYER
        Caption         =   "&Player"
        Begin Menu IDM_PLAYER_SHOW
            Caption         =   "&Hide"
        End
        Begin Menu IDM_PLAYER_SEP1
            Caption         =   "-"
        End
        Begin Menu IDM_PLAYER_OPEN
            Caption         =   "&Open..."
        End
        Begin Menu IDM_PLAYER_CLOSE
            Caption         =   "&Close"
        End
        Begin Menu IDM_PLAYER_SEP2
            Caption         =   "-"
        End
        Begin Menu IDM_PLAYER_PLAY
            Caption         =   "&Play"
            Shortcut        =   ^P
        End
```

```
TRNSCRPT.FRM - 6
                            LAY
      Begin Menu IDM_P   ER_STOP
          Caption        =    "&Stop"
          Shortcut       =    ^S
      End
      Begin Menu IDM_PLAYER_REFRESH
          Caption        =    "&Refresh"
          Shortcut       =    ^R
      End
      Begin Menu IDM_PLAYER_SEP3
          Caption        =    "-"
      End
      Begin Menu IDM_PLAYER_GOTOFRAME
          Caption        =    "Go to &Frame..."
      End
      Begin Menu IDM_PLAYER_MATCH
          Caption        =    "&Match Video to Current Line"
      End
   End
End
```

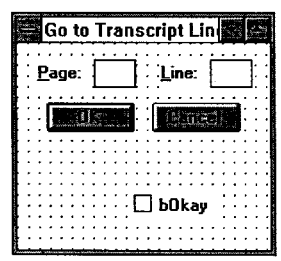
trnsgoto.bmp

TRNSGOTO.FRM - 1

```
VERSION 2.00
Begin Form TransGoto
    BorderStyle     =   3   'Fixed Double
    Caption         =   "Go to Transcript Line"
    ClientHeight    =   1110
    ClientLeft      =   2820
    ClientTop       =   4800
    ClientWidth     =   2805
    ClipControls    =   0   'False
    ControlBox      =   0   'False
    Height          =   1515
    Left            =   2760
    LinkTopic       =   "Form1"
    MaxButton       =   0   'False
    MinButton       =   0   'False
    ScaleHeight     =   1110
    ScaleWidth      =   2805
    Top             =   4455
    Width           =   2925
    Begin TextBox txtLine
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   315
        Left            =   2145
        TabIndex        =   3
        Top             =   180
        Width           =   465
    End
    Begin CheckBox bOkay
        Caption         =   "bOkay"
        Height          =   315
        Left            =   1290
        TabIndex        =   6
        Top             =   1620
        Visible         =   0   'False
        Width           =   975
    End
    Begin CommandButton btnCancel
        Cancel          =   -1  'True
        Caption         =   "Cancel"
        Height          =   330
        Left            =   1500
        TabIndex        =   5
        Top             =   660
        Width           =   975
    End
```

TRNSGOTO.FRM - 2      btnOK

```
      Begin CommandButton    ~~nOK~~
         Caption          =   "OK"
         Default          =   -1   'True
         Height           =   330
         Left             =   330
         TabIndex         =   4
         Top              =   660
         Width            =   975
      End
      Begin TextBox txtPage
         FontBold         =   0    'False
         FontItalic       =   0    'False
         FontName         =   "Arial"
         FontSize         =   8.25
         FontStrikethru   =   0    'False
         FontUnderline    =   0    'False
         Height           =   315
         Left             =   855
         TabIndex         =   1
         Top              =   180
         Width            =   465
      End
      Begin Label lblLine
         Caption          =   "&Line:"
         Height           =   300
         Left             =   1590
         TabIndex         =   2
         Top              =   225
         Width            =   495
      End
      Begin Label lblPage
         Caption          =   "&Page:"
         Height           =   300
         Left             =   225
         TabIndex         =   0
         Top              =   225
         Width            =   570
      End
   End
End
```

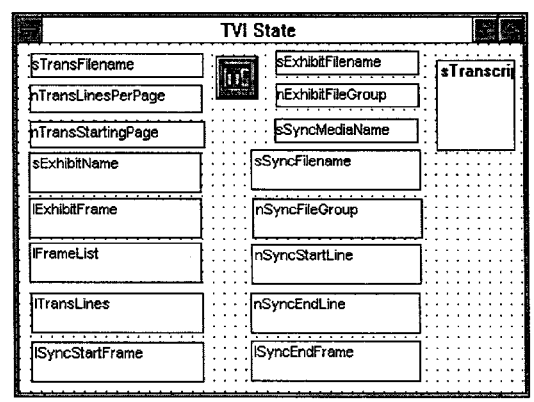
tvistate.bmp

TVISTATE.FRM - 1

```
VERSION 2.00
Begin Form TVI
    BorderStyle     =   1   'Fixed Single
    Caption         =   "TVI State"
    ClientHeight    =   3855
    ClientLeft      =   1740
    ClientTop       =   1965
    ClientWidth     =   5670
    ControlBox      =   0   'False
    Height          =   4260
    Icon            =   (Icon)
    Left            =   1680
    LinkTopic       =   "Form1"
    MaxButton       =   0   'False
    ScaleHeight     =   3855
    ScaleWidth      =   5670
    Top             =   1620
    Visible         =   0   'False
    Width           =   5790
    Begin ListBox sTranscripts
        Height      =   1005
        Left        =   4695
        TabIndex    =   16
        Top         =   180
        Width       =   885
    End
    Begin ListBox lSyncEndFrame
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   450
        Left            =   2580
        TabIndex        =   15
        Top             =   3285
        Width           =   1920
    End
    Begin ListBox lSyncStartFrame
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   450
        Left            =   135
        TabIndex        =   14
        Top             =   3300
```

```
TVISTATE.FRM - 2

Width            =   1920
   End
   Begin ListBox lTransLines
      FontBold         =   0   'False
      FontItalic       =   0   'False
      FontName         =   "Arial"
      FontSize         =   8.25
      FontStrikethru   =   0   'False
      FontUnderline    =   0   'False
      Height           =   450
      Left             =   135
      TabIndex         =   1
      Top              =   2760
      Width            =   1920
   End
   Begin ListBox lFrameList
      FontBold         =   0   'False
      FontItalic       =   0   'False
      FontName         =   "Arial"
      FontSize         =   8.25
      FontStrikethru   =   0   'False
      FontUnderline    =   0   'False
      Height           =   450
      Left             =   120
      TabIndex         =   4
      Top              =   2205
      Width            =   1920
   End
   Begin ListBox nSyncEndLine
      FontBold         =   0   'False
      FontItalic       =   0   'False
      FontName         =   "Arial"
      FontSize         =   8.25
      FontStrikethru   =   0   'False
      FontUnderline    =   0   'False
      Height           =   450
      Left             =   2580
      TabIndex         =   9
      Top              =   2760
      Width            =   1920
   End
   Begin ListBox nSyncStartLine
      FontBold         =   0   'False
      FontItalic       =   0   'False
      FontName         =   "Arial"
      FontSize         =   8.25
      FontStrikethru   =   0   'False
      FontUnderline    =   0   'False
      Height           =   450
      Left             =   2595
```

TVISTATE.FRM - 3

```
        TabIndex        =   13
        Top             =   2220
        Width           =   1920
    End
    Begin ListBox nSyncFileGroup
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   450
        Left            =   2610
        TabIndex        =   12
        Top             =   1710
        Width           =   1920
    End
    Begin ListBox sSyncFilename
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   450
        Left            =   2595
        TabIndex        =   11
        Top             =   1170
        Width           =   1920
    End
    Begin ListBox lExhibitFrame
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   450
        Left            =   120
        TabIndex        =   8
        Top             =   1710
        Width           =   1920
    End
    Begin ListBox sExhibitName
        FontBold        =   0   'False
        FontItalic      =   0   'False
        FontName        =   "Arial"
        FontSize        =   8.25
        FontStrikethru  =   0   'False
        FontUnderline   =   0   'False
```

TVISTATE.FRM - 4

```
        Height          =    450
        Left            =    120
        TabIndex        =    7
        Top             =    1200
        Width           =    1920
    End
    Begin CommonDialog Cdlg
        Left            =    2205
        Top             =    135
    End
    Begin Label sSyncMediaName
        BorderStyle     =    1  'Fixed Single
        Caption         =    "sSyncMediaName"
        FontBold        =    0  'False
        FontItalic      =    0  'False
        FontName        =    "Arial"
        FontSize        =    8.25
        FontStrikethru  =    0  'False
        FontUnderline   =    0  'False
        Height          =    270
        Left            =    2865
        TabIndex        =    10
        Top             =    825
        Width           =    1620
    End
    Begin Label nExhibitFileGroup
        BorderStyle     =    1  'Fixed Single
        Caption         =    "nExhibitFileGroup"
        FontBold        =    0  'False
        FontItalic      =    0  'False
        FontName        =    "Arial"
        FontSize        =    8.25
        FontStrikethru  =    0  'False
        FontUnderline   =    0  'False
        Height          =    270
        Left            =    2880
        TabIndex        =    6
        Top             =    435
        Width           =    1620
    End
    Begin Label sExhibitFilename
        BorderStyle     =    1  'Fixed Single
        Caption         =    "sExhibitFilename"
        FontBold        =    0  'False
        FontItalic      =    0  'False
        FontName        =    "Arial"
        FontSize        =    8.25
        FontStrikethru  =    0  'False
        FontUnderline   =    0  'False
        Height          =    270
```

TVISTATE.FRM - 5

```
      Left            =    2880
      TabIndex        =    5
      Top             =    75
      Width           =    1620
   End
   Begin Label nTransStartingPage
      BorderStyle     =    1  'Fixed Single
      Caption         =    "nTransStartingPage"
      FontBold        =    0     'False
      FontItalic      =    0     'False
      FontName        =    "Arial"
      FontSize        =    8.25
      FontStrikethru  =    0     'False
      FontUnderline   =    0     'False
      Height          =    300
      Left            =    135
      TabIndex        =    3
      Top             =    855
      Width           =    1950
   End
   Begin Label nTransLinesPerPage
      BorderStyle     =    1  'Fixed Single
      Caption         =    "nTransLinesPerPage"
      FontBold        =    0     'False
      FontItalic      =    0     'False
      FontName        =    "Arial"
      FontSize        =    8.25
      FontStrikethru  =    0     'False
      FontUnderline   =    0     'False
      Height          =    315
      Left            =    135
      TabIndex        =    2
      Top             =    450
      Width           =    1920
   End
   Begin Label sTransFilename
      BorderStyle     =    1  'Fixed Single
      Caption         =    "sTransFilename"
      FontBold        =    0     'False
      FontItalic      =    0     'False
      FontName        =    "Arial"
      FontSize        =    8.25
      FontStrikethru  =    0     'False
      FontUnderline   =    0     'False
      Height          =    270
      Left            =    150
      TabIndex        =    0
      Top             =    105
      Width           =    1920
   End
```

TVISTATE.FRM - 6

End

| Verifying Sync Information... | | |
|---|---|---|
| Type of Validation | Pass/Fail | Remedy |
| Transcript Information is Complete | ☐ ☐ | Transcript Information: Fill in all information and scan the transcript file. |
| Video File Lengths are Set | ☐ ☐ | Sync Video: Open all video files. (Length is determined when a file is opened.) |
| Transcript has no Sync Frame Gaps | ☐ ☐ | Sync Video: Find gaps and sync those transcript lines. |
| Sync Frames are in Ascending Order within each Video File | ☐ ☐ | Sync Video: Validate to find frames that are out of order and re-sync those frames. |
| Video File Line Ranges do not Overlap | ☐ ☐ | Sync Video: Validate to find frames that are out of order and re-sync those frames. |
| Video File Line Ranges are in Ascending Order | ☐ ☐ | Video Files List: Use Move Up and Move Down buttons to change the file order. Check the Line Range field to ensure that transcript lines are in ascending order. |
| CD ROM Numbers have No Gaps and are in Ascending Order | ☐ ☐ | Video Files List: Change CD ROM Numbers so that there are no gaps and they go in ascending order. |

✓ ☐ ☐ ✗   ☐ Valid verify.bmp

VERIFY.FRM - 1

```
VERSION 2.00
Begin Form Verify
   BorderStyle     =   3  'Fixed Double
   Caption         =   "Verifying Sync Information..."
   ClientHeight    =   5895
   ClientLeft      =   240
   ClientTop       =   570
   ClientWidth     =   9030
   ControlBox      =   0  'False
   Height          =   6300
   Left            =   180
   LinkTopic       =   "Form1"
   MaxButton       =   0  'False
   MinButton       =   0  'False
   ScaleHeight     =   5895
   ScaleWidth      =   9030
   Top             =   225
   Width           =   9150
   Begin CommandButton btnCancel
      Caption         =   "Return to Main Window"
      Enabled         =   0  'False
      Height          =   315
      Left            =   1305
      TabIndex        =   29
      Top             =   6030
      Width           =   2655
   End
   Begin PictureBox P
      BorderStyle     =   0  'None
      Height          =   480
      Index           =   6
      Left            =   5205
      Picture         =   (Bitmap)
      ScaleHeight     =   480
      ScaleWidth      =   975
      TabIndex        =   24
      TabStop         =   0  'False
      Top             =   5040
      Width           =   975
   End
   Begin PictureBox P
      BorderStyle     =   0  'None
      Height          =   480
      Index           =   5
      Left            =   5205
      Picture         =   (Bitmap)
      ScaleHeight     =   480
      ScaleWidth      =   975
      TabIndex        =   23
      TabStop         =   0  'False
```

```
VERIFY.FRM - 2
      Top                3765
      Width        =     975
   End
   Begin PictureBox PX
      BorderStyle  =     0  'None
      Height       =     480
      Left         =     1920
      Picture      =     (Bitmap)
      ScaleHeight  =     480
      ScaleWidth   =     975
      TabIndex     =     2
      TabStop      =     0  'False
      Top          =     6225
      Visible      =     0  'False
      Width        =     975
   End
   Begin PictureBox POK
      BorderStyle  =     0  'None
      Height       =     480
      Left         =     615
      Picture      =     (Bitmap)
      ScaleHeight  =     480
      ScaleWidth   =     975
      TabIndex     =     8
      TabStop      =     0  'False
      Top          =     6195
      Visible      =     0  'False
      Width        =     975
   End
   Begin PictureBox P
      BorderStyle  =     0  'None
      Height       =     480
      Index        =     4
      Left         =     5205
      Picture      =     (Bitmap)
      ScaleHeight  =     480
      ScaleWidth   =     975
      TabIndex     =     12
      TabStop      =     0  'False
      Top          =     2925
      Width        =     975
   End
   Begin PictureBox P
      BorderStyle  =     0  'None
      Height       =     480
      Index        =     3
      Left         =     5205
      Picture      =     (Bitmap)
      ScaleHeight  =     480
      ScaleWidth   =     975
```

VERIFY.FRM - 3

```
         TabIndex          =   16
         TabStop           =   0    'False
         Top               =   2190
         Width             =   975
      End
      Begin PictureBox P
         BorderStyle       =   0    'None
         Height            =   480
         Index             =   1
         Left              =   5205
         Picture           =   (Bitmap)
         ScaleHeight       =   480
         ScaleWidth        =   975
         TabIndex          =   19
         TabStop           =   0    'False
         Top               =   990
         Width             =   975
      End
      Begin Timer WaitTimer
         Left              =   3915
         Top               =   -1000
      End
      Begin CheckBox bValid
         Caption           =   "Valid"
         Height            =   285
         Left              =   6645
         TabIndex          =   22
         TabStop           =   0    'False
         Top               =   6225
         Visible           =   0    'False
         Width             =   1560
      End
      Begin CommandButton btnOk
         Cancel            =   -1   'True
         Caption           =   "Continue"
         Default           =   -1   'True
         Height            =   330
         Left              =   5625
         TabIndex          =   0
         Top               =   6030
         Width             =   1800
      End
      Begin PictureBox P
         BorderStyle       =   0    'None
         Height            =   480
         Index             =   0
         Left              =   5205
         Picture           =   (Bitmap)
         ScaleHeight       =   480
         ScaleWidth        =   975
```

VERIFY.FRM - 4

```
      TabIndex        =   14
      TabStop         =   0   'False
      Top             =   375
      Width           =   975
   End
   Begin PictureBox P
      BorderStyle     =   0   'None
      Height          =   435
      Index           =   2
      Left            =   5205
      Picture         =   (Bitmap)
      ScaleHeight     =   435
      ScaleWidth      =   975
      TabIndex        =   18
      TabStop         =   0   'False
      Top             =   1635
      Width           =   975
   End
   Begin Label R
      Caption         =   "Sync Video: Validate to find frames that are out of o
      Height          =   675
      Index           =   4
      Left            =   6300
      TabIndex        =   28
      Top             =   2940
      Width           =   2670
   End
   Begin Label R
      Caption         =   "Sync Video: Validate to find frames that are out of o
      Height          =   675
      Index           =   3
      Left            =   6300
      TabIndex        =   27
      Top             =   2175
      Width           =   2670
   End
   Begin Label V
      Caption         =   "Video File Line Ranges do not Overlap"
      FontBold        =   -1  'True
      FontItalic      =   0   'False
      FontName        =   "MS Sans Serif"
      FontSize        =   13.5
      FontStrikethru  =   0   'False
      FontUnderline   =   0   'False
      Height          =   735
      Index           =   4
      Left            =   45
      TabIndex        =   26
      Top             =   2940
      Width           =   4710
```

```
VERIFY.FRM - 5
   End
   Begin Label V
      Caption         =   "Sync Frames are in Ascending Order within each Video
      FontBold        =   -1   'True
      FontItalic      =   0    'False
      FontName        =   "MS Sans Serif"
      FontSize        =   13.5
      FontStrikethru  =   0    'False
      FontUnderline   =   0    'False
      Height          =   735
      Index           =   3
      Left            =   60
      TabIndex        =   25
      Top             =   2145
      Width           =   4710
   End
   Begin Line LH
      BorderWidth     =   2
      Index           =   2
      X1              =   30
      X2              =   9030
      Y1              =   1620
      Y2              =   1620
   End
   Begin Line LH
      BorderWidth     =   2
      Index           =   7
      X1              =   15
      X2              =   9045
      Y1              =   5895
      Y2              =   5895
   End
   Begin Line LH
      BorderWidth     =   2
      Index           =   6
      X1              =   0
      X2              =   9030
      Y1              =   4980
      Y2              =   4980
   End
   Begin Line LH
      BorderWidth     =   2
      Index           =   5
      X1              =   30
      X2              =   9060
      Y1              =   3720
      Y2              =   3720
   End
   Begin Label R
      Caption         =   "Video Files List: Change CD ROM Numbers so that there
```

```
VERIFY.FRM - 6

Height          =   810
         Index           =   6
         Left            =   6300
         TabIndex        =   21
         Top             =   5025
         Width           =   2670
      End
      Begin Line LH
         BorderWidth     =   2
         Index           =   4
         X1              =   0
         X2              =   9015
         Y1              =   2880
         Y2              =   2895
      End
      Begin Label R
         Caption         =   "Video Files List: Use Move Up and Move Down buttons t
         Height          =   1260
         Index           =   5
         Left            =   6300
         TabIndex        =   20
         Top             =   3765
         Width           =   2670
      End
      Begin Line LH
         BorderWidth     =   2
         Index           =   3
         X1              =   15
         X2              =   9015
         Y1              =   2115
         Y2              =   2115
      End
      Begin Label R
         Caption         =   "Sync Video: Find gaps and sync those transcript lines
         Height          =   435
         Index           =   2
         Left            =   6285
         TabIndex        =   17
         Top             =   1650
         Width           =   2550
      End
      Begin Label R
         Caption         =   "Sync Video: Open all video files. (Length is determin
         Height          =   585
         Index           =   1
         Left            =   6315
         TabIndex        =   1
         Top             =   990
         Width           =   2670
      End
```

```
VERIFY.FRM - 7

Begin Label V
      Caption         =   "Video File Lengths are Set"
      FontBold        =   -1  'True
      FontItalic      =   0   'False
      FontName        =   "MS Sans Serif"
      FontSize        =   13.5
      FontStrikethru  =   0   'False
      FontUnderline   =   0   'False
      Height          =   450
      Index           =   1
      Left            =   60
      TabIndex        =   13
      Top             =   1035
      Width           =   4710
   End
   Begin Line LH
      BorderWidth     =   2
      Index           =   1
      X1              =   30
      X2              =   9030
      Y1              =   960
      Y2              =   960
   End
   Begin Label R
      Caption         =   "Transcript Information: Fill in all information and s
      Height          =   600
      Index           =   0
      Left            =   6300
      TabIndex        =   15
      Top             =   345
      Width           =   2670
   End
   Begin Line LV2
      BorderWidth     =   2
      X1              =   6255
      X2              =   6255
      Y1              =   0
      Y2              =   5880
   End
   Begin Line LV1
      BorderWidth     =   2
      X1              =   5175
      X2              =   5175
      Y1              =   0
      Y2              =   5880
   End
   Begin Label V
      Caption         =   "Transcript has no Sync Frame Gaps"
      FontBold        =   -1  'True
      FontItalic      =   0   'False
```

```
VERIFY.FRM - 8

FontName            =   "MS Sans Serif"
         FontSize            =   13.5
         FontStrikethru      =   0     'False
         FontUnderline       =   0     'False
         Height              =   405
         Index               =   2
         Left                =   30
         TabIndex            =   11
         Top                 =   1680
         Width               =   5115
      End
      Begin Label V
         Caption             =   "CD ROM Numbers have No Gaps and are in Ascending Orde
         FontBold            =   -1    'True
         FontItalic          =   0     'False
         FontName            =   "MS Sans Serif"
         FontSize            =   13.5
         FontStrikethru      =   0     'False
         FontUnderline       =   0     'False
         Height              =   750
         Index               =   6
         Left                =   45
         TabIndex            =   10
         Top                 =   5055
         Width               =   4965
      End
      Begin Label V
         Caption             =   "Video File Line Ranges are in Ascending Order"
         FontBold            =   -1    'True
         FontItalic          =   0     'False
         FontName            =   "MS Sans Serif"
         FontSize            =   13.5
         FontStrikethru      =   0     'False
         FontUnderline       =   0     'False
         Height              =   735
         Index               =   5
         Left                =   75
         TabIndex            =   9
         Top                 =   3780
         Width               =   4710
      End
      Begin Label V
         Caption             =   "Transcript Information is Complete"
         FontBold            =   -1    'True
         FontItalic          =   0     'False
         FontName            =   "MS Sans Serif"
         FontSize            =   13.5
         FontStrikethru      =   0     'False
         FontUnderline       =   0     'False
         Height              =   405
```

```
VERIFY.FRM - 9

Index               =   0
            Left                =   60
            TabIndex            =   7
            Top                 =   405
            Width               =   4950
         End
         Begin Line LH
            BorderWidth         =   2
            Index               =   0
            X1                  =   0
            X2                  =   9030
            Y1                  =   300
            Y2                  =   300
         End
         Begin Label lblRemedy
            Caption             =   "Remedy"
            Height              =   195
            Left                =   7275
            TabIndex            =   5
            Top                 =   45
            Width               =   1215
         End
         Begin Label lblPassFail
            Caption             =   "Pass/Fail"
            Height              =   195
            Left                =   5310
            TabIndex            =   4
            Top                 =   60
            Width               =   855
         End
         Begin Label lblValidate
            Caption             =   "Type of Validation"
            Height              =   195
            Left                =   1680
            TabIndex            =   3
            Top                 =   45
            Width               =   1680
         End
         Begin Label lblBorder
            BorderStyle         =   1  'Fixed Single
            Height              =   5910
            Left                =   0
            TabIndex            =   6
            Top                 =   0
            Width               =   9030
         End
      End
End
```

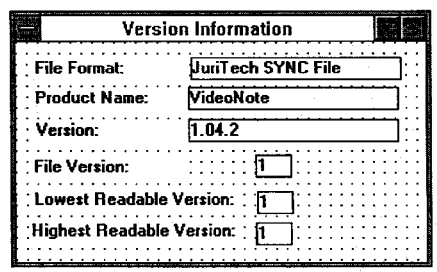
version.bmp

VERSION.FRM - 1

```
VERSION 2.00
Begin Form Version
   Caption          =   "Version Information"
   ClientHeight     =   2430
   ClientLeft       =   1080
   ClientTop        =   1470
   ClientWidth      =   4545
   Height           =   2835
   Left             =   1020
   LinkTopic        =   "Form2"
   ScaleHeight      =   2430
   ScaleWidth       =   4545
   Top              =   1125
   Width            =   4665
   Begin Label nHiVersion
      BorderStyle   =   1  'Fixed Single
      Caption       =   "1"
      Height        =   255
      Left          =   2655
      TabIndex      =   11
      Top           =   1995
      Width         =   405
   End
   Begin Label lblHighestVersion
      Caption       =   "Highest Readable Version:"
      Height        =   240
      Left          =   165
      TabIndex      =   10
      Top           =   1980
      Width         =   2280
   End
   Begin Label nLoVersion
      BorderStyle   =   1  'Fixed Single
      Caption       =   "1"
      Height        =   255
      Left          =   2670
      TabIndex      =   9
      Top           =   1650
      Width         =   405
   End
   Begin Label lblLowestVersion
      Caption       =   "Lowest Readable Version:"
      Height        =   240
      Left          =   195
      TabIndex      =   8
      Top           =   1635
      Width         =   2280
   End
   Begin Label nFileVersion
      BorderStyle   =   1  'Fixed Single
```

```
VERSION.FRM - 2
        Caption         =   "1"
        Height          =   255
        Left            =   2655
        TabIndex        =   7
        Top             =   1245
        Width           =   405
    End
    Begin Label lblFileVersion
        Caption         =   "File Version:"
        Height          =   240
        Left            =   195
        TabIndex        =   6
        Top             =   1275
        Width           =   1650
    End
    Begin Label sVersion
        BorderStyle     =   1  'Fixed Single
        Caption         =   "1.04.2"
        Height          =   255
        Left            =   1905
        TabIndex        =   5
        Top             =   855
        Width           =   2340
    End
    Begin Label lblVersion
        Caption         =   "Version:"
        Height          =   240
        Left            =   225
        TabIndex        =   4
        Top             =   870
        Width           =   1650
    End
    Begin Label sFileFormat
        BorderStyle     =   1  'Fixed Single
        Caption         =   "JuriTech SYNC File"
        Height          =   255
        Left            =   1935
        TabIndex        =   3
        Top             =   165
        Width           =   2340
    End
    Begin Label lblFileFormat
        Caption         =   "File Format:"
        Height          =   240
        Left            =   210
        TabIndex        =   2
        Top             =   180
        Width           =   1650
    End
    Begin Label sProductName
```

```
VERSION.FRM - 3
      BorderStyle     =    1   'Fixed Single
      Caption         =    "VideoNote"
      Height          =    255
      Left            =    1905
      TabIndex        =    1
      Top             =    495
      Width           =    2340
   End
   Begin Label lblProductName
      Caption         =    "Product Name:"
      Height          =    240
      Left            =    210
      TabIndex        =    0
      Top             =    510
      Width           =    1650
   End
End
```

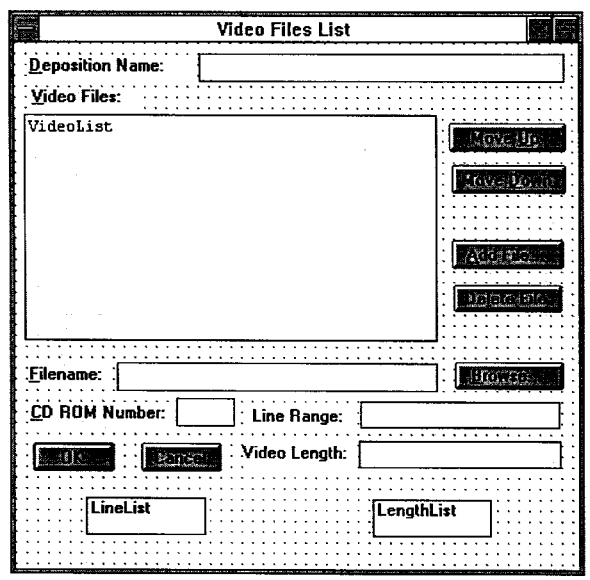
vidfiles.bmp

```
VIDFILES.FRM - 1

VERSION 2.00
Begin Form VideoFiles
   BorderStyle       =   3  'Fixed Double
   Caption           =   "Video Files List"
   ClientHeight      =   4830
   ClientLeft        =   1440
   ClientTop         =   1800
   ClientWidth       =   6315
   ControlBox        =   0  'False
   Height            =   5235
   Icon              =   (Icon)
   Left              =   1380
   LinkTopic         =   "Form1"
   MaxButton         =   0  'False
   MinButton         =   0  'False
   ScaleHeight       =   4830
   ScaleWidth        =   6315
   Top               =   1455
   Width             =   6435
   Begin ListBox LengthList
      Height            =   420
      Left              =   4005
      TabIndex          =   20
      Top               =   5040
      Visible           =   0  'False
      Width             =   1335
   End
   Begin ListBox LineList
      Height            =   420
      Left              =   780
      TabIndex          =   17
      Top               =   5025
      Visible           =   0  'False
      Width             =   1335
   End
   Begin TextBox txtGroup
      FontBold          =   0  'False
      FontItalic        =   0  'False
      FontName          =   "Arial"
      FontSize          =   8.25
      FontStrikethru    =   0  'False
      FontUnderline     =   0  'False
      Height            =   315
      Left              =   1785
      TabIndex          =   12
      Top               =   3930
      Width             =   660
   End
   Begin CommandButton btnCancel
      Cancel            =   -1 'True
```

```
VIDFILES.FRM - 2
      Caption         =   "Cancel"
      Height          =   315
      Left            =   1395
      TabIndex        =   14
      Top             =   4425
      Width           =   900
   End
   Begin CommandButton btnOk
      Caption         =   "OK"
      Default         =   -1  'True
      Height          =   315
      Left            =   195
      TabIndex        =   13
      Top             =   4425
      Width           =   900
   End
   Begin CommandButton btnBrowse
      Caption         =   "&Browse..."
      Height          =   300
      Left            =   4935
      TabIndex        =   10
      Top             =   3525
      Width           =   1215
   End
   Begin CommandButton btnDelete
      Caption         =   "De&lete File"
      Height          =   300
      Left            =   4920
      TabIndex        =   7
      Top             =   2670
      Width           =   1215
   End
   Begin CommandButton btnAdd
      Caption         =   "&Add File..."
      Height          =   315
      Left            =   4905
      TabIndex        =   6
      Top             =   2175
      Width           =   1245
   End
   Begin CommandButton btnMoveDown
      Caption         =   "Move &Down"
      Height          =   315
      Left            =   4905
      TabIndex        =   5
      Top             =   1350
      Width           =   1275
   End
   Begin CommandButton btnMoveUp
      Caption         =   "Move &Up"
```

```
VIDFILES.FRM - 3
      Height          =    315
      Left            =    4875
      TabIndex        =    4
      Top             =    885
      Width           =    1305
   End
   Begin TextBox txtFilename
      FontBold        =    0   'False
      FontItalic      =    0   'False
      FontName        =    "Arial"
      FontSize        =    8.25
      FontStrikethru  =    0   'False
      FontUnderline   =    0   'False
      Height          =    315
      Left            =    1125
      TabIndex        =    9
      Top             =    3540
      Width           =    3615
   End
   Begin ListBox VideoList
      FontBold        =    0   'False
      FontItalic      =    0   'False
      FontName        =    "Courier New"
      FontSize        =    9
      FontStrikethru  =    0   'False
      FontUnderline   =    0   'False
      Height          =    2505
      Left            =    105
      TabIndex        =    3
      Top             =    795
      Width           =    4635
   End
   Begin TextBox txtDepositionName
      FontBold        =    0   'False
      FontItalic      =    0   'False
      FontName        =    "Arial"
      FontSize        =    8.25
      FontStrikethru  =    0   'False
      FontUnderline   =    0   'False
      Height          =    315
      Left            =    2055
      TabIndex        =    1
      Top             =    120
      Width           =    4110
   End
   Begin Label txtLength
      BorderStyle     =    1   'Fixed Single
      FontBold        =    0   'False
      FontItalic      =    0   'False
      FontName        =    "Arial"
```

```
VIDFILES.FRM - 4
      FontSize        =   8.25
      FontStrikethru  =   0   'False
      FontUnderline   =   0   'False
      Height          =   300
      Left            =   3855
      TabIndex        =   19
      Top             =   4395
      Width           =   2265
   End
   Begin Label lblLength
      Caption         =   "Video Length:"
      Height          =   270
      Left            =   2535
      TabIndex        =   18
      Top             =   4425
      Width           =   1215
   End
   Begin Label txtTranscriptLines
      BorderStyle     =   1   'Fixed Single
      FontBold        =   0   'False
      FontItalic      =   0   'False
      FontName        =   "Arial"
      FontSize        =   8.25
      FontStrikethru  =   0   'False
      FontUnderline   =   0   'False
      Height          =   300
      Left            =   3870
      TabIndex        =   16
      Top             =   3960
      Width           =   2235
   End
   Begin Label lblTranscriptLines
      Caption         =   "Line Range:"
      Height          =   300
      Left            =   2640
      TabIndex        =   15
      Top             =   4020
      Width           =   1095
   End
   Begin Label lblGroup
      Caption         =   "&CD ROM Number:"
      Height          =   255
      Left            =   165
      TabIndex        =   11
      Top             =   3990
      Width           =   1545
   End
   Begin Label lblFilename
      Caption         =   "&Filename:"
      Height          =   225
```

```
VIDFILES.FRM - 5
      Left            =   150
      TabIndex        =   8
      Top             =   3570
      Width           =   915
   End
   Begin Label lblVideoFiles
      Caption         =   "&Video Files:"
      Height          =   255
      Left            =   195
      TabIndex        =   2
      Top             =   495
      Width           =   1170
   End
   Begin Label lblDepositionName
      Caption         =   "&Deposition Name:"
      Height          =   255
      Left            =   165
      TabIndex        =   0
      Top             =   150
      Width           =   1800
   End
End
```

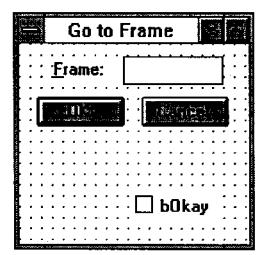
viewgoto.bmp

```
VIEWGOTO.FRM - 1

VERSION 2.00
Begin Form ViewGoto
   BorderStyle     =   3  'Fixed Double
   Caption         =   "Go to Frame"
   ClientHeight    =   1110
   ClientLeft      =   3090
   ClientTop       =   4950
   ClientWidth     =   2565
   ClipControls    =   0  'False
   ControlBox      =   0  'False
   Height          =   1515
   Left            =   3030
   LinkTopic       =   "Form1"
   MaxButton       =   0  'False
   MinButton       =   0  'False
   ScaleHeight     =   1110
   ScaleWidth      =   2565
   Top             =   4605
   Width           =   2685
   Begin CheckBox bOkay
      Caption      =   "bOkay"
      Height       =   315
      Left         =   1290
      TabIndex     =   4
      Top          =   1620
      Visible      =   0  'False
      Width        =   975
   End
   Begin CommandButton btnCancel
      Cancel       =   -1 'True
      Caption      =   "Cancel"
      Height       =   330
      Left         =   1365
      TabIndex     =   3
      Top          =   585
      Width        =   975
   End
   Begin CommandButton btnOK
      Caption      =   "OK"
      Default      =   -1 'True
      Height       =   330
      Left         =   195
      TabIndex     =   2
      Top          =   585
      Width        =   975
   End
   Begin TextBox txtGoto
      FontBold     =   0  'False
      FontItalic   =   0  'False
      FontName     =   "Arial"
```

```
VIEWGOTO.FRM - 2

FontSize        =   8.25
        FontStrikethru  =   0   'False
        FontUnderline   =   0   'False
        Height          =   315
        Left            =   1155
        TabIndex        =   1
        Top             =   135
        Width           =   1125
    End
    Begin Label lblGoto
        Caption         =   "&Frame:"
        Height          =   300
        Left            =   375
        TabIndex        =   0
        Top             =   180
        Width           =   750
    End
End
``` check0.bmp

check1.bmp

check2.bmp

CD ROM
not loaded offline.bmp

* * * END OF SECTION VI * * *

While the resultant product made by the process described above is output onto a diskette and one or more CD-ROMS, it is within the scope of the invention to output the entire product onto one or more CD-ROMs. Since ASCII transcripts and the SYNC and optional PRESYNC files are relatively small in comparison to the video files, a small amount of space on the CD-ROM may be reserved for the information and data normally stored on the diskette. It is also within the scope of the invention to store the video product on other forms of random access storage media of suitable capacity and retrieval speed. CD-ROMs are the currently preferred storage medium. While the embodiment of the invention described above stores the converted text and index information (SYNC and PRESYNC files) on a different diskette than the diskette holding the original transcript, the converted text and index information may also be stored on the diskette holding the original transcript, if sufficient space exists on the original transcript diskette.

The process of the present invention is also adaptable to digital video camera systems. These systems capture video in digital form on a randomly accessible digital storage medium, instead of on a linear tape. When such a system is used, it may not be necessary to make a second video recording because the original recording is already on a random access storage medium and most likely already includes sequentially numbered video frames. In this instance, the original video record may be used as the CD-ROM 10 in the present invention. Alternatively, the original video record may not be in the exact format usable by the present invention. In this case, the original video record is processed to place it in suitable form, and then copied onto a second random access video storage medium (CD-ROM 10) for use in the remaining steps of the present invention.

The present invention may be used for synchronizing a videotaped event that has not been transcribed. The transcript can be created while simultaneously creating the SYNC file. The present invention may also be used for synchronizing events where no video picture may even exist for the event, such as an untranscribed wiretap recording. Furthermore, the present invention may also be used for synchronizing a videotaped event that may have already been transcribed, such as a speech, a commercial, a television show, or a closed caption program.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of creating a video product with synchronized video and text of an event, a first video record of the event having been made on a first storage medium and an original transcript of the event having been made on a second storage medium, the second storage medium being a random access medium, the original transcript containing spoken word information and format information, the format information including page and line numbers, the method comprising the steps of:

(a) generating a converted transcript which includes only the spoken word information, but which maintains the same lines of spoken word information as in the original transcript, the lines of the converted transcript being sequentially numbered and having a predetermined relationship to the page and line numbers of the original transcript;

(b) making a second video record on a third storage medium from the first video record, the second video record having sequentially numbered video frames, the third storage medium being a random access storage medium;

(c) displaying the converted transcript on a computer while playing the second video record on the same computer;

(d) signalling to the computer at each line of the converted transcript when the second video record matches the current line of text of the converted transcript;

(e) creating an index of the page and line numbers of the original transcript to the video frames of the second video record from the signals in step (d) and the video frame information, the page and line numbers being recreated from the converted transcript lines and the predetermined relationship therebetween; and (f) storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

2. A method according to claim 1 wherein the signalling in step (d) is performed by an operator.

3. A method according to claim 2 wherein the operator signals at the end of each line.

4. A method according to claim 1 wherein the format information further includes party identifying information or transcript service identifying information.

5. A method according to claim 1 wherein step (c) includes displaying the converted transcript while listening to the second video record, or while viewing and listening to the second video record.

6. A method according to claim 1 wherein step (d) further includes locating an initial synchronization point of the converted transcript and the second video record, scrolling line-by-line through the converted transcript and signalling to the computer at each line of the converted transcript when the second video record matches the current line of text of the converted transcript.

7. A method according to claim 1 wherein step (c) includes displaying the page and line numbers of the original transcript, the page and line numbers being recreated from the converted transcript lines and the predetermined relationship therebetween.

8. A method according to claim 1 wherein the third storage medium is a CD-ROM.

9. A method according to claim 1 wherein the fourth storage medium is a diskette.

10. A method according to claim 1 wherein the event is a legal proceeding.

11. A method according to claim 1 wherein the first storage medium is an analog, serially recorded storage medium.

12. A method according to claim 1 wherein the lines of the converted transcript are sequentially numbered from 1 to n.

13. A method according to claim 1 wherein the third and fourth media are the same.

14. A method of creating a video product with synchronized video and text of an event, a first video record of the event having been made on a first storage medium, the first video record including time or SMPTE information, an original transcript of the event having been made on a second storage medium, the second storage medium being a random access medium, the original transcript containing spoken word information, time or SMPTE information per line, and format information, the time or SMPTE information of the original transcript being identical to the time or SMPTE information of the first video record, the format information including page and line numbers, the method comprising the steps of:

(a) generating a converted transcript which includes only the spoken word information, but which maintains the same lines of spoken word information as in the original transcript, the lines of the converted transcript being sequentially numbered and having a predetermined relationship to the page and line numbers of the original transcript;

(b) generating a first file containing the time or SMPTE code information for each line of the original transcript;

(c) making a second video record on a third storage medium from the first video record, the second video record having sequentially numbered video frames, the third storage medium being a random access storage medium;

(d) generating a second file containing the time or SMPTE code information for each numbered frame of the second video record;

(e) automatically creating an index of the page and line numbers of the original transcript to the video frames of the second video record from the first and second files of time or SMPTE information, the page and line numbers being recreated from the converted transcript lines and the predetermined relationship therebetween; and (f) storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

15. A method according to claim 14 wherein the format information further includes party identifying information or transcript service identifying information.

16. A method according to claim 14 wherein the third storage medium is a CD-ROM.

17. A method according to claim 14 wherein the fourth storage medium is a diskette.

18. A method according to claim 14 wherein the event is a legal proceeding.

19. A method according to claim 14 wherein the first storage medium is an analog, serially recorded storage medium.

20. A method according to claim 14 wherein the lines of the converted transcript are sequentially numbered from 1 to n.

21. A method according to claim 14 wherein the third and fourth media are the same.

22. A method according to claim 14 wherein the first and second files are part of a single file structure.

23. A method of creating a video product with synchronized video and text of an event, a first video record of the event having been made on a first storage medium and an original transcript of the event having been made on a second storage medium, the second storage medium being a random access medium, the original transcript containing spoken word information, time or SMPTE information per line, and format information, the format information including page and line numbers, the method comprising the steps of:

(a) generating a converted transcript which includes only the spoken word information, but which maintains the same lines of spoken word information as in the original transcript, the lines of the converted transcript being sequentially numbered and having a predetermined relationship to the page and line numbers of the original transcript;

(b) generating a file containing the time or SMPTE code information for each line of the original transcript;

(c) making a second video record on a third storage medium from the first video record, the second video record having sequentially numbered video frames, the third storage medium being a random access storage medium;

(d) locating an initial synchronization point of the converted transcript and the second video record;

(e) automatically creating an index of the page and line numbers of the original transcript to the video frames of the second video record from the file of time or SMPTE information, the second video record and the initial synchronization point, the page and line numbers being recreated from the converted transcript lines and the predetermined relationship therebetween; and (f) storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

24. A method according to claim 23 wherein the format information further includes party identifying information or transcript service identifying information.

25. A method according to claim 23 wherein the third storage medium is a CD-ROM.

26. A method according to claim 23 wherein the fourth storage medium is a diskette.

27. A method according to claim 23 wherein the event is a legal proceeding.

28. A method according to claim 23 wherein the first storage medium is an analog, serially recorded storage medium.

29. A method according to claim 23 wherein the lines of the converted transcript are sequentially numbered from 1 to n.

30. A method according to claim 23 wherein the third and fourth media are the same.

31. A method according to claim 23 wherein the index created in step (g) is an initial index, the method further comprising the step of:

(g) viewing the video product to detect any discontinuity between the video and corresponding transcript and if a discontinuity is detected, (h) locating a subsequent synchronization point of the converted transcript and the second audio-visual record, and (i) repeating steps (g) and (h) to automatically create a modified index, the modified index being stored in place of the initial index.

32. A method of creating a video product with synchronized video and text from an event, (a) receiving in a computer
   (i) a video output of a video capturing device, and
   (ii) an output of a computer-aided transcription device, the output including lines of spoken word information, page and line numbers corresponding to the lines of spoken word information and end of line signals;

(b) automatically creating in the computer an index of the page and line numbers to sequentially numbered video frames, the sequentially numbered video frames representing the video output which occurs at the same instance of time as the end of each line from the device;

(c) storing the video output on a first random access storage medium; and (d) storing the index and the output of the device on a second random access storage medium, the first and second storage media together being the video product and being usable together to simultaneously play back a video of the event, the corresponding transcript, and the original page and line numbers by using the index on the second storage medium.

33. A method according to claim 32 wherein the event is a live event and steps (a)–(d) occur while the live event proceeds.

34. A method according to claim 32 wherein the event is a past event captured on a video storage medium, and steps (a)–(d) occur while playing back the past event from the video storage medium.

35. A method according to claim 32 wherein the first random access storage medium is a CD-ROM.

36. A method according to claim 32 wherein the second random access storage medium is a diskette.

37. A method according to claim 32 wherein the event is a legal proceeding.

38. An apparatus for creating a video product with synchronized video and text of an event, a first video record of the event having been made on a first storage medium and an original transcript of the event having been made on a second storage medium, the second storage medium being a random access medium, the original transcript containing spoken word information and format information, the format information including page and line numbers, the apparatus comprising:

(a) means for generating a converted transcript which includes only the spoken word information, but which maintains the same lines of spoken word information as in the original transcript, the lines of the converted transcript being sequentially numbered and having a predetermined relationship to the page and line numbers of the original transcript;

(b) means for making a second video record on a third storage medium from the first video record, the second video record having sequentially numbered video frames, the third storage medium being a random access storage medium;

(c) a computer for displaying the converted transcript and simultaneously playing the second video record;

(d) a signalling device for outputting signals to the computer at each line of the converted transcript when the second video record matches the current line of text of the converted transcript;

(e) means for creating an index of the page and line numbers of the original transcript to the video frames of the second video record from the output signals and the video frame information, the page and line numbers being recreated from the converted transcript lines and the predetermined relationship therebetween; and (f) means for storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

39. An apparatus according to claim 38 wherein the third storage medium is a CD-ROM.

40. An apparatus according to claim 38 wherein the fourth storage medium is a diskette.

41. An apparatus according to claim 38 wherein the event is a legal proceeding.

42. An apparatus according to claim 38 wherein the first storage medium is an analog, serially recorded storage medium.

43. An apparatus according to claim 38 wherein the lines of the converted transcript are sequentially numbered from 1 to n.

44. An apparatus according to claim 38 wherein the third and fourth media are the same.

45. An apparatus for creating a video product with synchronized text and video of an event, a first video record of the event having been made on a first storage medium, the first video record including time or SMPTE information, an original transcript of the event having been made on a second storage medium, the second storage medium being a random access medium, the original transcript containing spoken word information, time or SMPTE information per line, and format information, the time or SMPTE information of the original transcript being identical to the time or SMPTE information of the first video record, the format information including page and line numbers, the apparatus comprising:

(a) means for generating a converted transcript which includes only the spoken word information, but which maintains the same lines of spoken word information as in the original transcript, the lines of the converted transcript being sequentially numbered and having a predetermined relationship to the page and line numbers of the original transcript;

(b) means for generating a first file containing the time or SMPTE code information for each line of the original transcript;

(c) means for making a second video record on a third storage medium from the first video record, the second video record having sequentially numbered video frames, the third storage medium being a random access storage medium;

(d) means for generating a second file containing the time or SMPTE code information for each numbered frame of the second video record;

(e) means for automatically creating an index of the page and line numbers of the original transcript to the video frames of the second video record from the first and second files of time or SMPTE information, the page and line numbers being recreated from the converted transcript lines and the predetermined relationship therebetween; and (f) means for storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

46. An apparatus according to claim 45 wherein the third storage medium is a CD-ROM.

47. An apparatus according to claim 45 wherein the fourth storage medium is a diskette.

48. An apparatus according to claim 45 wherein the event is a legal proceeding.

49. An apparatus according to claim 45 wherein the first storage medium is an analog, serially recorded storage medium.

50. An apparatus according to claim 45 wherein the lines of the converted transcript are sequentially numbered from 1 to n.

51. An apparatus according to claim 45 wherein the third and fourth media are the same.

52. An apparatus according to claim 45 wherein the first and second files are part of a single file structure.

53. An apparatus for creating a video product with synchronized video and text of an event, a first video record of the event having been made on a first storage medium and an original transcript of the event having been made on a second storage medium, the second storage medium being a random access medium, the original transcript containing spoken word information, time or SMPTE information per line, and format information, the format information including page and line numbers, the apparatus comprising:

(a) means for generating a converted transcript which includes only the spoken word information, but which maintains the same lines of spoken word information as in the original transcript, the lines of the converted transcript being sequentially numbered and having a predetermined relationship to the page and line numbers of the original transcript;

(b) means for generating a file containing the time or SMPTE code information for each line of the original transcript;

(c) means for making a second video record on a third storage medium from the first video record, the second video record having sequentially numbered video frames, the third storage medium being a random access storage medium;

(d) means for locating an initial synchronization point of the converted transcript and the second video record;

(e) means for automatically creating an index of the page and line numbers of the original transcript to the video frames of the second video record from the file of time or SMPTE information, the second video record and the initial synchronization point, the page and line numbers being recreated from the converted transcript lines and the predetermined relationship therebetween; and (f) means for storing the index and the converted transcript on a fourth storage medium, the fourth storage medium being a random access medium, the third and fourth storage media together being the video product and being usable together to simultaneously play back the second video record, the corresponding transcript, and the original page and line numbers by using the index on the fourth storage medium.

54. An apparatus according to claim 53 wherein the third storage medium is a CD-ROM.

55. An apparatus according to claim 53 wherein the fourth storage medium is a diskette.

56. An apparatus according to claim 53 wherein the event is a legal proceeding.

57. An apparatus according to claim 53 wherein the first storage medium is an analog, serially recorded storage medium.

58. An apparatus according to claim 53 wherein the lines of the converted transcript are sequentially numbered from 1 to n.

59. An apparatus according to claim 53 wherein the third and fourth media are the same.

60. An apparatus according to claim 53 wherein the index is an initial index, the apparatus further comprising:

(g) means for viewing the video product to detect any discontinuity between the video and corresponding transcript and if a discontinuity is detected, locating a subsequent synchronization point of the converted transcript and the second audio-visual record, and (h) means for automatically creating a modified index if a discontinuity is detected, the modified index being stored in place of the initial index.

61. An apparatus for creating a video product with synchronized video and text from an event, the apparatus comprising:

(a) a computer for receiving a video output of a video capturing device, and an output of a computer-aided transcription device, the output including lines of spoken word information and page and line numbers corresponding to the lines of spoken word information;

(b) means for creating an index of the page and line numbers to sequentially numbered video frames, the sequentially numbered video frames representing the video output which occurs at the same instance of time as the end of each line from the device;

(c) means for storing the video output on a first random access storage medium; and (d) means for storing the index and the output of the device on a second random access storage medium, the first and second storage media together being the video product and being usable together to simultaneously play back a video of the event, the corresponding transcript, and the original page and line numbers by using the index on the second storage medium.

62. An apparatus according to claim 61 wherein the event is a live event and the video product is created while the live event proceeds, the video capturing device being a video camera at the live event.

63. An apparatus according to claim 61 wherein the event is a past event captured on a video storage medium, and the video product is created while playing back the past event from the video storage medium, the video capturing device being a video recorder which plays back the video storage medium.

64. An apparatus according to claim 61 wherein the first random access storage medium is a CD-ROM.

65. An apparatus according to claim 61 wherein the second random access storage medium is a diskette.

66. An apparatus according to claim 61 wherein the event is a legal proceeding.

* * * * *